United States Patent
Yonebayashi

(10) Patent No.: US 11,852,939 B2
(45) Date of Patent: Dec. 26, 2023

(54) DISPLAY DEVICE AND ELECTRONIC DEVICE

(71) Applicant: Sharp Display Technology Corporation, Kameyama (JP)

(72) Inventor: Ryo Yonebayashi, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/093,167

(22) Filed: Jan. 4, 2023

(65) Prior Publication Data

US 2023/0236464 A1    Jul. 27, 2023

(30) Foreign Application Priority Data

Jan. 21, 2022   (JP) ................................ 2022-007968
Sep. 30, 2022   (JP) ................................ 2022-158126

(51) Int. Cl.
    *G02F 1/1362*      (2006.01)
    *G02F 1/1345*      (2006.01)
    *G02F 1/1339*      (2006.01)

(52) U.S. Cl.
    CPC ...... *G02F 1/136286* (2013.01); *G02F 1/1339* (2013.01); *G02F 1/1345* (2013.01); *G02F 1/13452* (2013.01)

(58) Field of Classification Search
None
See application file for complete search history.

(56) References Cited

U.S. PATENT DOCUMENTS

| | | | |
|---|---|---|---|
| 7,554,637 B2* | 6/2009 | Kim | G02F 1/1337 349/123 |
| 8,988,623 B2 | 3/2015 | Koyama et al. | |
| 9,488,890 B2 | 11/2016 | Koyama et al. | |
| 2011/0102697 A1 | 5/2011 | Koyama et al. | |
| 2015/0177544 A1 | 6/2015 | Koyama et al. | |
| 2017/0059909 A1 | 3/2017 | Koyama et al. | |
| 2020/0124906 A1* | 4/2020 | Waka | G02F 1/1337 |

FOREIGN PATENT DOCUMENTS

JP      2021152671 A      9/2021

* cited by examiner

*Primary Examiner* — Dung T Nguyen
(74) *Attorney, Agent, or Firm* — ScienBiziP, P.C.

(57) ABSTRACT

A display device includes a first substrate, a second substrate, a first electrically conductive portion and a second electrically conductive portion disposed between the first substrate and the second substrates. The first substrate includes a first line, a second line, a first connection electrode projecting from the first line toward the second line, and a second connection electrode projecting from the second line toward the first line. The second substrate includes a first electrode, a third connection electrode electrically connected to the first electrode and disposed to overlap the first connection electrode, a second electrode, and a fourth connection electrode electrically connected to the second electrode and disposed to overlap the second connection electrode. The first electrically conductive portion overlaps and contacts the first connection electrode and the third connection electrode. The second electrically conductive portion overlaps and contacts the second connection electrode and the fourth connection electrode.

12 Claims, 32 Drawing Sheets

US 11,852,939 B2

DISPLAY DEVICE AND ELECTRONIC DEVICE

CROSS REFERENCE TO RELATED APPLICATION

This application claims priority from Japanese Patent Application No. 2022-7968 filed on Jan. 21, 2022 and Japanese Patent Application No. 2022-158126 filed on Sep. 30, 2022. The entire contents of the priority applications are incorporated herein by reference.

TECHNICAL FIELD

The present technology described herein relates to a display device and an electronic device.

BACKGROUND

A liquid crystal display device has been known as one example of a display device. Such a liquid crystal display device includes a liquid crystal layer between two substrates. Pixel electrodes and a driving circuit are disposed on one of the two substrates. Another one of the two substrates is an opposed substrate and two opposed electrode layers having different potentials are disposed on the opposed substrate. One of the two opposed electrode layers overlaps the pixel electrodes via the liquid crystal layer and another one of the two opposed electrode layer overlaps the driving circuit via the liquid crystal layer.

In such a liquid crystal display device, the two opposed electrode layers include a first opposed electrode layer that is disposed above the pixel section and a second opposed electrode layer that is disposed above the driving circuit section. The first opposed electrode layer and the second opposed electrode layer are electrically connected to the connection lines having different potentials, respectively, adjacent to an edge portion of the substrate. To suppress potential fluctuation in the first opposed electrode layer and the second opposed electrode layer, the number of connection portions of each of the first opposed electrode layer and the second opposed electrode layer and the connection lines may be increased. However, with such a configuration, a short circuit may be likely to be caused between the first opposed electrode layer and the second opposed electrode layer.

SUMMARY

The technology described herein was made in view of the above circumstances. An object is to improve connection reliability.

A display device according to the technology described herein includes a first substrate, a second substrate disposed opposite the first substrate, a first electrically conductive portion, and a second electrically conductive portion. The first substrate includes a first line, a second line disposed at a distance from the first line and extending in an extending direction and parallel to the first line, a first connection electrode projecting from the first line toward the second line, and a second connection electrode projecting from the second line toward the first line and being disposed such that the second connection electrode and the first connection electrode are arranged in the extending direction. The second substrate includes a first electrode, a third connection electrode that is electrically connected to the first electrode and disposed to overlap the first connection electrode, a second electrode, and a fourth connection electrode that is electrically connected to the second electrode and disposed to overlap the second connection electrode and disposed such that the fourth connection electrode and the third connection electrode are arranged in the extending direction. The first electrically conductive portion is disposed between the first substrate and the second substrate to overlap the first connection electrode and the third connection electrode such that the first electrically conductive portion is contacted with the first connection electrode and the third connection electrode. The second electrically conductive portion is disposed between the first substrate and the second substrate to overlap the second connection electrode and the fourth connection electrode such that the second electrically conductive portion is contacted with the second connection electrode and the fourth connection electrode.

DETAILED DESCRIPTION

First Embodiment

Figure 1:
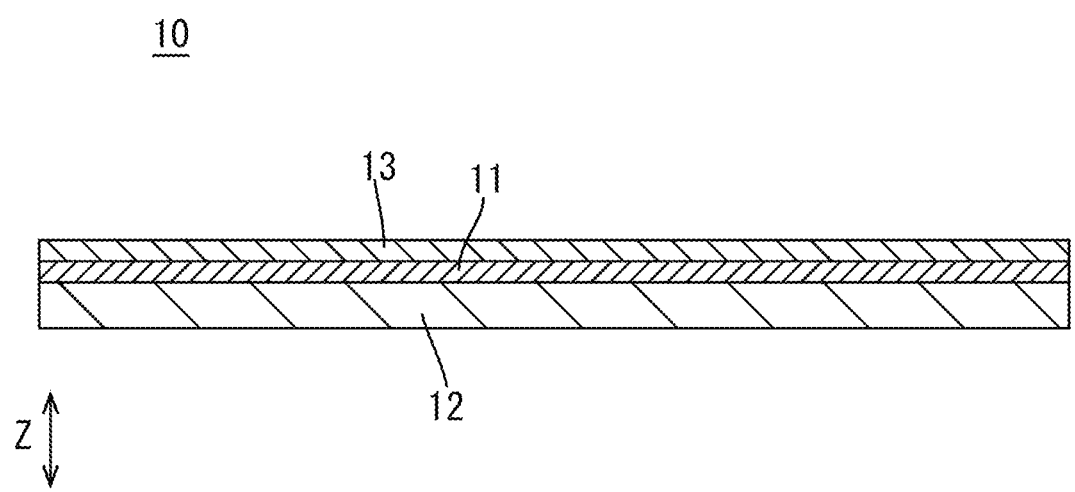
FIG. 1 is a schematic cross-sectional view of a liquid crystal display device according to a first embodiment.

A first embodiment will be described with reference to FIGS. 1 to 11. In this embodiment section, a liquid crystal display device 10 will be described. X-axes, Y-axes, and Z-axes may be present in the drawings. The axes in each drawing correspond to the respective axes in other drawings.

The liquid crystal display device 10 according to this embodiment is one example of 3D image display devices with which a user can see 3D images (stereoscopic images) and is an active retarder display device. As illustrated in FIG. 1, the liquid crystal display device 10 at least includes a liquid crystal panel 11 (a display device, a display panel) displaying images, a backlight device 12 (a lighting device) that is disposed behind (on a back surface side of) the liquid crystal panel 11, and a sub liquid crystal panel 13 that is disposed on a front side (a front surface side) with respect to the liquid crystal panel 11. The backlight device 12 is an external light source that supplies light for displaying to the liquid crystal panel 11. The backlight device 12 includes light sources (LEDs for example) configured to emit white light and optical members for converting the light from the light sources into planar light by applying optical effects to the light from the light sources.

The sub liquid crystal panel 13 is configured as a modulator for converting linear polarized light that exits the liquid crystal panel 11 into circular polarized light. The sub liquid crystal panel 13 is configured to switch polarization between right circularly polarization and left circularly polarization in synchronization with switching between a right eye image and a left eye image that are alternately displayed on the liquid crystal panel 11. A pair of circularly polarization glasses that include two circularly polarizing films having reversed rotation directions on a left glass and a right glass, respectively, is used in combination with the liquid crystal display device 10. A user can see 3D images by watching the liquid crystal display device 10 with wearing the pair of circularly polarization glasses. Since the sub liquid crystal panel 13 is driven at a high speed in synchronization with the display on the liquid crystal panel 11, great noise is inputted to the liquid crystal panel 11, which is disposed adjacent to the sub liquid crystal panel 13, from the front side.

Figure 2:
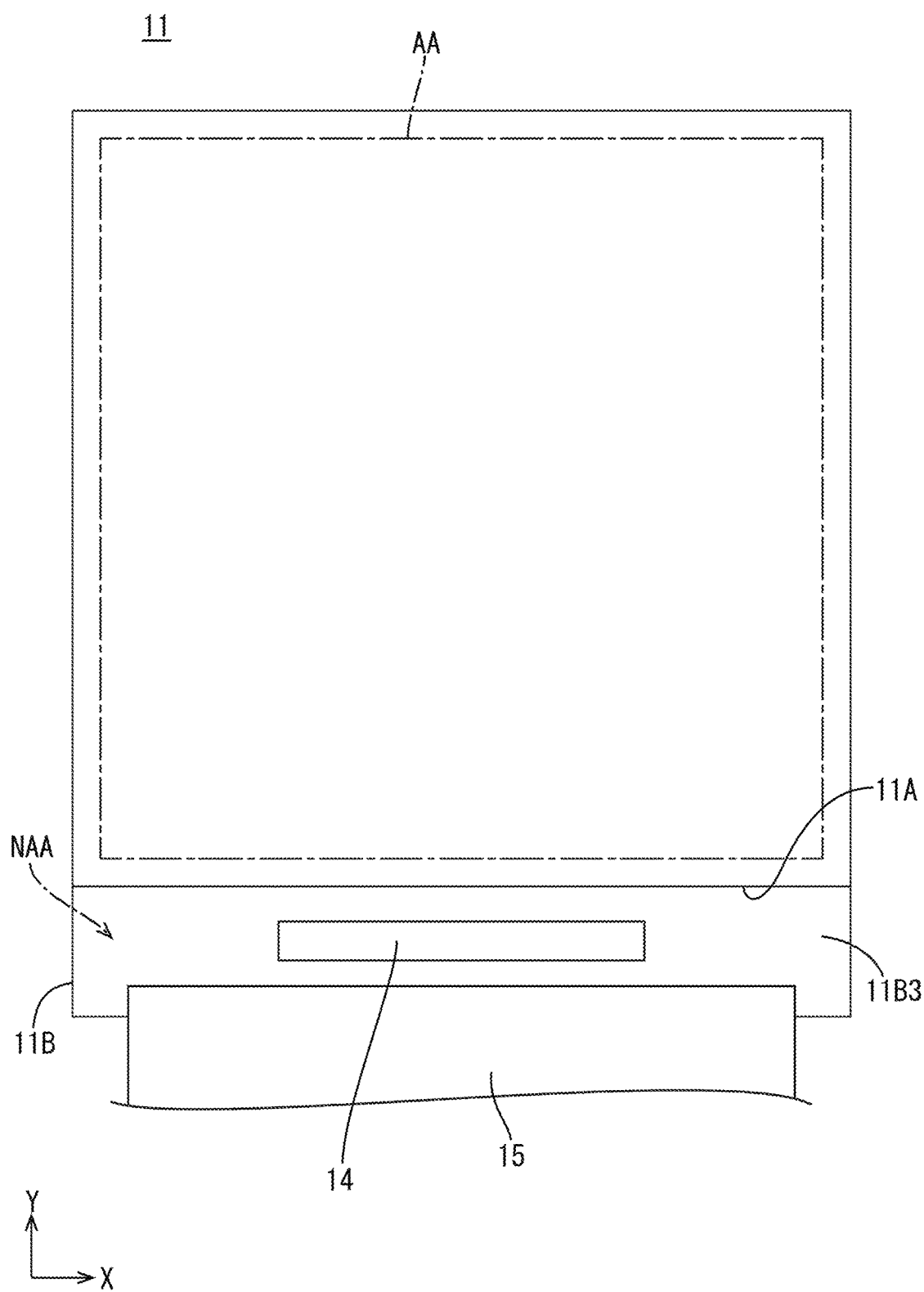
FIG. 2 is a plan view of a liquid crystal panel included in the liquid crystal display device.

Next, a configuration of the liquid crystal panel 11 included in the liquid crystal display device 10 with the active retarder display technology will be described. A general plan-view configuration of the liquid crystal panel 11 will be described with reference to FIG. 2. As illustrated in FIG. 2, the liquid crystal panel 11 has a rectangular shape as a whole. A middle section of a screen of the liquid crystal panel 11 is configured as a display area AA in which images are displayed. The display area AA is rectangular and is slightly smaller than an outline of the liquid crystal panel 11. An outer section formed in a frame shape surrounding the display area AA in the screen of the liquid crystal panel 11 is configured as a non-display area NAA in which the images are not displayed. The non-display area NAA has a rectangular frame shape. In FIG. 2, the display area AA is defined as an area surrounded by a dashed line.

As illustrated in FIG. 2, the liquid crystal panel 11 includes a pair of substrates 11A, 11B. The substrates 11A, 11B include glass substrates that are highly light transmissive and substantially transparent glass substrates. One of the substrates 11A, 11B on the front side is an opposed substrate 11A (a second substrate, a CF substrate) and another one on the back side is an array substrate 11B (a first substrate, an active matrix substrate). The opposed substrate 11A and the array substrate 11B have a rectangular plan view shape. The opposed substrate 11A and the array substrate 11B include a pair of side edges 11A1, 11B1 extending along the X-axis direction and a pair of side edges 11A2, 11B2 extending along the Y-axis direction (refer to FIGS. 6 and 7). The array substrate 11B is greater in size than the opposed substrate 11A and the array substrate 11B includes a projecting portion 11B3 that projects laterally from the opposed substrate 11A. A driver 14 (panel driving components) and a flexible circuit board 15 (a signal transmission member) are mounted on the projecting portion 11B3 of the array substrate 11B. The driver 14 is an LSI chip including a driver circuit therein. The driver 14 processes the signals transmitted via the flexible circuit board 15. The driver 14 is mounted on the projecting portion 11B3 of the array substrate 11B through the chip-on-glass (COG) technology. The flexible circuit board 15 includes a substrate that has insulating properties and flexibility and multiple traces of a wiring pattern that are formed on the substrate. A first end of the flexible circuit board 15 is connected to the array substrate 11B and a second end of the flexible circuit board 15 is connected to an external control circuit board (a signal source). The signals from the control circuit board are transmitted to the liquid crystal panel 11 via the flexible circuit board 15.

Figure 3:
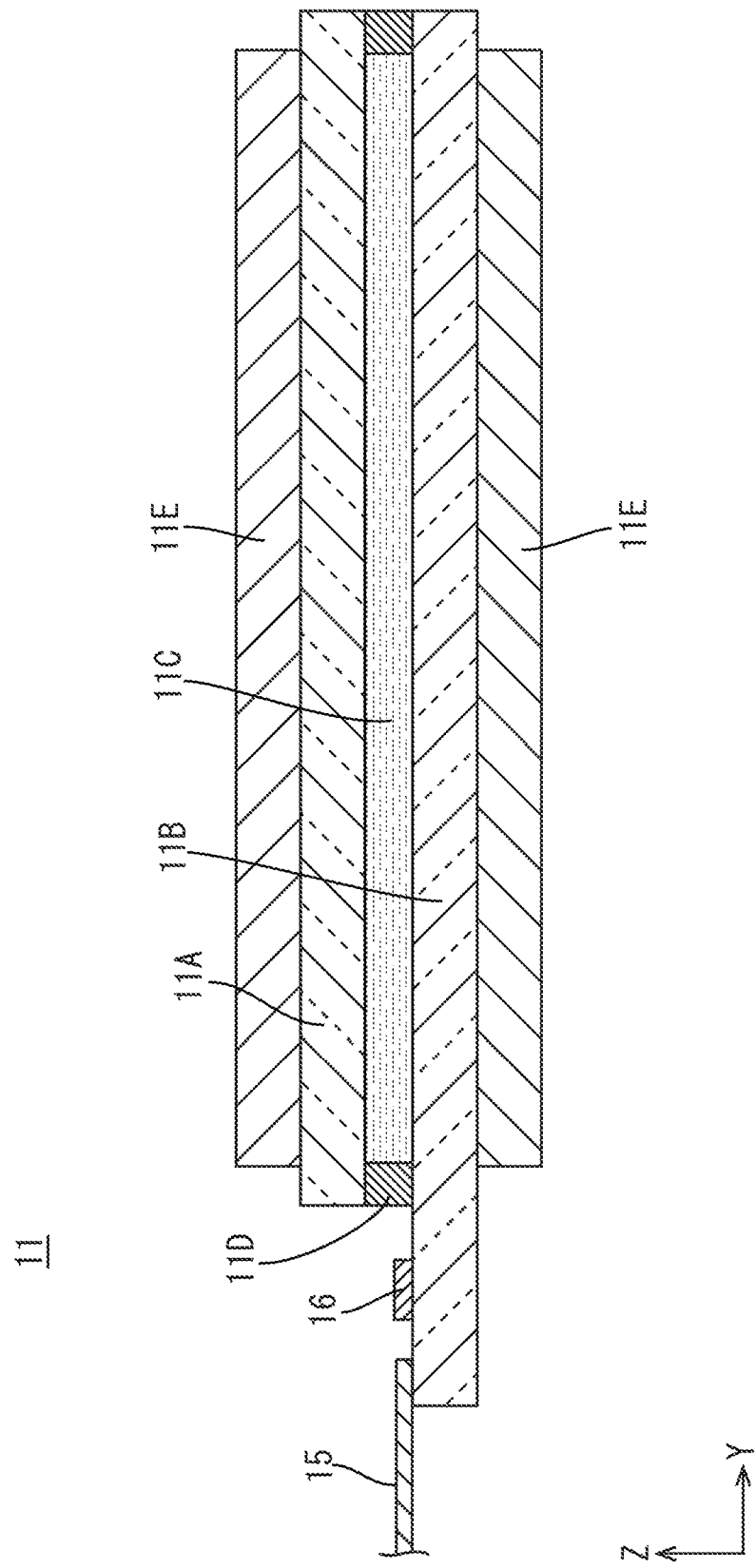
FIG. 3 is a schematic cross-sectional view of the liquid crystal panel.

Next, a cross-sectional configuration of the liquid crystal panel 11 will be described with reference to FIG. 3. As illustrated in FIG. 3, the two substrates 11A, 11B are disposed to have a distance in the Z-axis direction that is a normal direction to the plate surface of the substrates 11A, 11B. At least a liquid crystal layer 11C and a sealing member 11D are disposed between the two substrates 11A, 11B. The sealing member 11D seals the space between the substrates 11A, 11B to keep the liquid crystal layer 11C therein. The liquid crystal layer 11C includes liquid crystal molecules having optical characteristics that vary according to application of electric field. The sealing member 11D is disposed near the edges of the substrates 11A, 11B and disposed in the non-display area NAA. The sealing member 11D extends along an entire periphery of the edge portions. The sealing member 11D has a rectangular frame plan view shape (endless ring shape) as a whole and surrounds the liquid crystal layer 11C (the display area AA) and extends along the entire periphery of the display area AA. With the sealing member 11D, a gap (a cell gap) corresponding to a thickness of the liquid crystal layer 11C is maintained at the edge portions of the substrates 11A, 11B. Polarizing plates 11E are bonded to the outer surfaces of the substrates 11A, 11B, respectively. The polarizing plates 11E are arranged such that the transmission axes (absorption axes) of the polarizing plates 11E are perpendicular to each other, that is, are arranged with crossed nicols.

Figure 4:
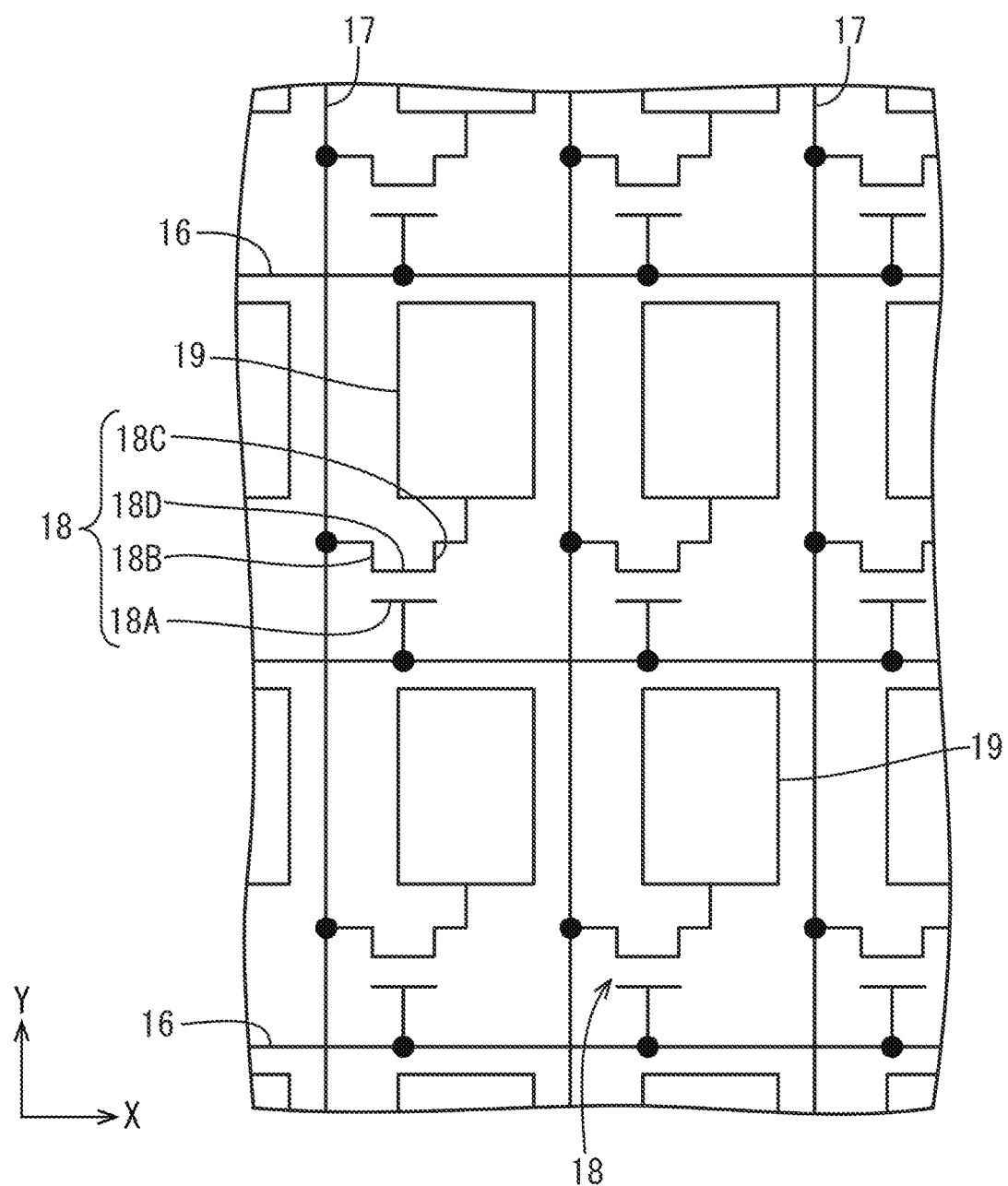
FIG. 4 is a circuit diagram illustrating a pixel arrangement in a display area of an array substrate included in the liquid crystal panel.

Next, a pixel arrangement in the display area AA of the array substrate 11B will be described with reference to FIG. 4. Gate lines 16 (scanning lines) and source lines 17 (image lines) are routed in a matrix on an inner surface side of the array substrate 11B in the display area AA. Thin film transistors (TFTs) 18 and pixel electrodes 19 are arranged adjacent to crossing points of the gate lines 16 and the source lines 17. The gate lines 16 extend in a direction substantially along the X-axis direction to cross the display area AA in a lateral direction and are connected to gate electrodes 18A of the TFTs 18, respectively. The gate lines 16 are arranged at intervals with respect to the Y-axis direction. The gate lines 16 are formed by patterning a metal film with a known photolithography method. The source lines 17 extend in a direction substantially along the Y-axis direction to cross the display area AA in a vertical direction and are connected to source electrodes 18B of the TFTs 18, respectively. The source lines 17 are arranged at intervals with respect to the X-axis direction. The source lines 17 are formed by patterning a metal film with the known photolithography method. The source lines 17 are disposed in an upper layer (closer to the liquid crystal layer 11C, closer to the opposed substrate 11A) than the gate lines 16 via an insulation film. The TFTs 18 and pixel electrodes 19 are arranged regularly along the X-axis direction and the Y-axis direction and arranged planarly in a matrix (rows and columns). The pixel electrodes 19 are connected to drain electrodes 18C of the TFTs 18, respectively. The pixel electrodes 19 are formed by patterning a transparent electrode film, which is made of transparent electrode material such as indium tin oxide (ITO), with the known photolithography method. The pixel electrodes 19 are disposed in an upper layer than the source lines 17 via an insulation film. The TFTs 18 include the gate electrodes 18A, the source electrodes 18B, the drain electrodes 18C, and channels 18D. The channels 18D are made of semiconductor material and are connected to the source electrodes 18B and the drain electrodes 18C. With the TFTs 18 being driven based on scanning signals supplied to the gate lines 16, the pixel electrodes 19 are charged at the potentials based on the image signals (data signals) supplied to the source lines 17. The gate lines 16, the source lines 17, and the TFTs 18 are configured as a pixel circuit section 20 that is a circuit for driving the pixels (refer to FIG. 5).

Figure 5:
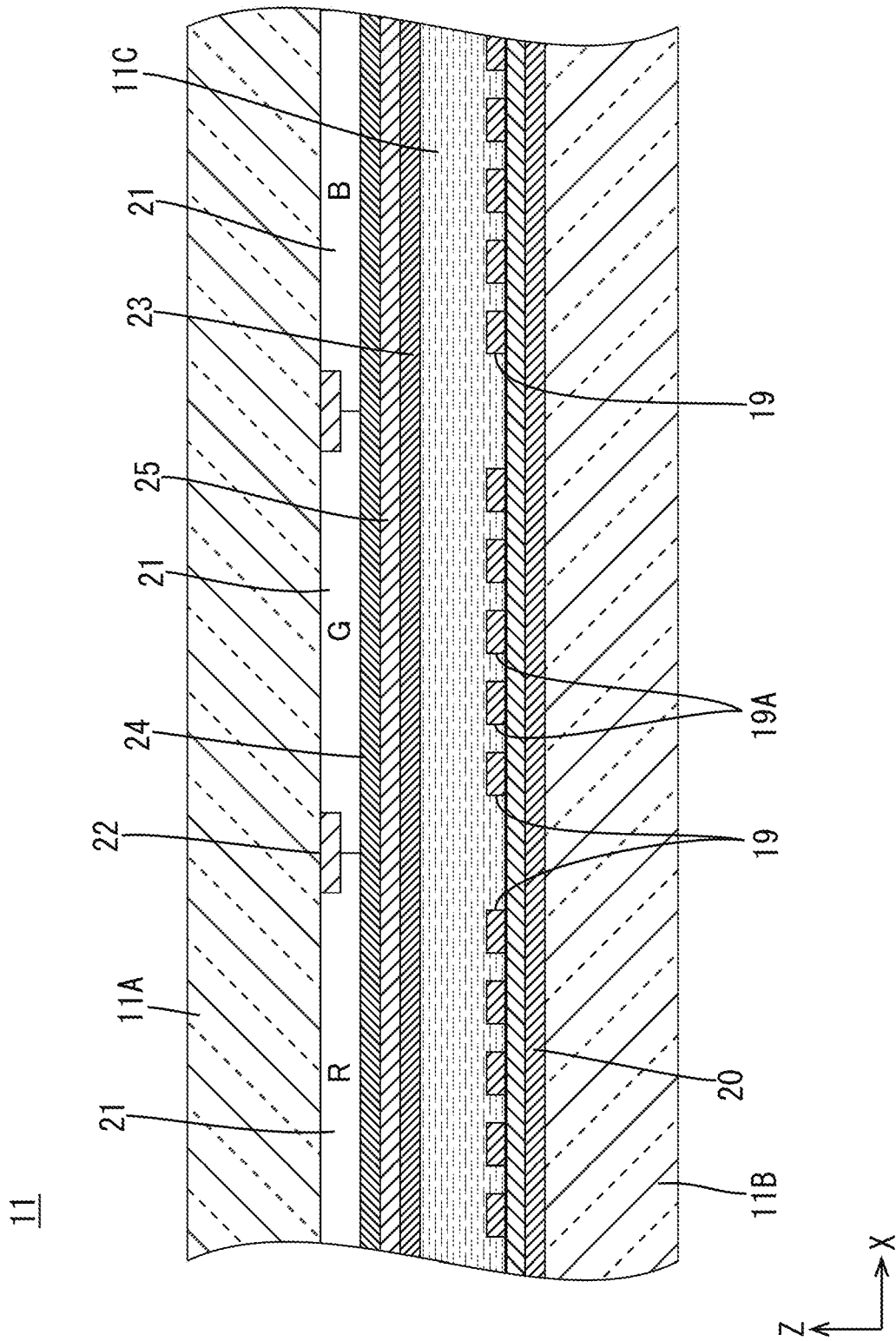
FIG. 5 is a cross-sectional view illustrating a pixel configuration of the liquid crystal panel in the display area.

Next, a configuration of the liquid crystal panel 11 in the display area AA will be described with reference to FIG. 5. The configuration of the liquid crystal panel 11 in the display area AA illustrated in FIG. 5 is simplified. As illustrated in FIG. 5, the pixel electrodes 19 and the pixel circuit section 20 are disposed on the inner surface side of the array substrate 11B in the display area AA. At least color filters 21, a light blocking portion 22 (a black matrix), and a first electrode 23 (an opposed electrode) are disposed on an inner surface side of the opposed substrate 11A in the display area AA.

The color filters 21 of the opposed substrate 11A are disposed to overlap the pixel electrodes 19 of the array substrate 11B and exhibit three different colors of red (R), green (G), and blue (B). The color filters 21 and the pixel electrodes 19 that are opposed to the color filters 21 compose a pixel, which is a unit of display. The light blocking portion 22 is formed in a grid pattern to separate the adjacent color filters 21 to prevent the mixture of colors between the pixels. The first electrode 23 is disposed in a solid manner at least in the display area AA to be opposite all the pixel electrodes 19 via the liquid crystal layer 11C. With the first electrode 23 being supplied with a common potential (a reference potential), a potential difference occurs between the pixel electrodes 19 that are charged by the pixel circuit section 20 and the first electrode 23. According to the potential difference, orientations of the liquid crystal molecules included in the liquid crystal layer 11C are varied. Accordingly, display with a certain gradation can be performed for every pixel. The first electrode 23 is formed by patterning a transparent electrode film (a second transparent electrode film) made of transparent electrode material such as indium tin oxide (ITO) with the known photolithography method similar to the pixel electrodes 19.

The pixel electrode 19 of the array substrate 11B has a rectangular plan view shape and includes slits 19A that extend radially from a center of the pixel electrode 19. The extending directions of the slits 19A are varied within a surface area of the pixel electrode 19. Namely, the pixel electrode 19 is divided into sections (for example, four sections) and the extending directions in which the slits 19A extend differ from each other among the sections. A recess (a section without including the pixel electrode 19) is formed in a portion of the surface of the array substrate 11B overlapping the slit 19A. Therefore, as the pixel electrode 19 is charged, an electric field is created on the inner surface of the array substrate 11B according to a recessed shape of the slit 19A. The liquid crystal molecules included in the liquid crystal layer 11C are oriented according to the recesses in the inner surface of the array substrate 11B. A display mode of the liquid crystal panel 11 according to this embodiment is a multi-domain vertical alignment (MVA) mode in which orientations of the liquid crystal molecules included in the liquid crystal layer 11C are different among the domains. Accordingly, displaying with a wide viewing angle is achieved.

As previously described, noise caused from the sub liquid crystal panel 13 is easily inputted to the liquid crystal panel 11 from the front side. Due to the noise, potential fluctuations may be caused in the first electrode 23 of the opposed substrate 11A. If the potential fluctuations are caused in the first electrode 23, a potential difference created between the first electrode 23 and the pixel electrodes 19 is varied and the display gradation of the pixels becomes unstable. This may deteriorate display quality. The opposed substrate 11A of this embodiment includes a second electrode 24 (a shield electrode, an electrostatic capacitance electrode). The second electrode 24 blocks the noise that may be inputted to the first electrode 23. The second electrode 24 is disposed in a solid manner at least in the display area AA and overlaps the first electrode 23 in a plan view. The second electrode 24 is formed by patterning a transparent electrode film (a first transparent electrode film) made of transparent electrode material such as indium tin oxide (ITO) with the known photolithography method similar to the pixel electrodes 19 and the first electrode 23. The second electrode 24 is supplied with a ground potential. An insulation film 25 is disposed between the first electrode 23 and the second electrode 24 of the opposed substrate 11A with respect to the Z-axis direction. The second electrode 24 is disposed in a lower layer than the insulation film 25 (on an opposite side from the liquid crystal layer 11C with respect to the insulation film 25, farther from the array substrate 11B than the insulation film 25 is). Namely, the second electrode 24 is disposed in a lower layer than the first electrode 23 via the insulation film 25 and closer to the sub liquid crystal panel 13, which is a source of the noise, than the first electrode 23 is. With such a configuration, the noise (external noise) from the sub liquid crystal panel 13 is inputted to the second electrode 24 prior to the first electrode 23. Therefore, the noise is effectively blocked by the second electrode 24 that is charged at the ground potential. The first electrode 23 is disposed in an upper layer than the insulation film 25 (closer to the liquid crystal layer 11C than the insulation film 25 is, closer to the array substrate 11B than the insulation film 25 is). Namely, the first electrode 23 is disposed in an upper layer than the second electrode 24 via the insulation film 25. Electric fields created between the first electrode 23 and the pixel electrodes 19 are not blocked by the second electrode 24. Furthermore, since the insulation film 25 is disposed between the first electrode 23 and the second electrode 24 that overlap each other, electrostatic capacitance is created between the first electrode having a common potential and the second electrode having a ground potential. This suppresses potential fluctuations in the first electrode 23.

Figure 6:
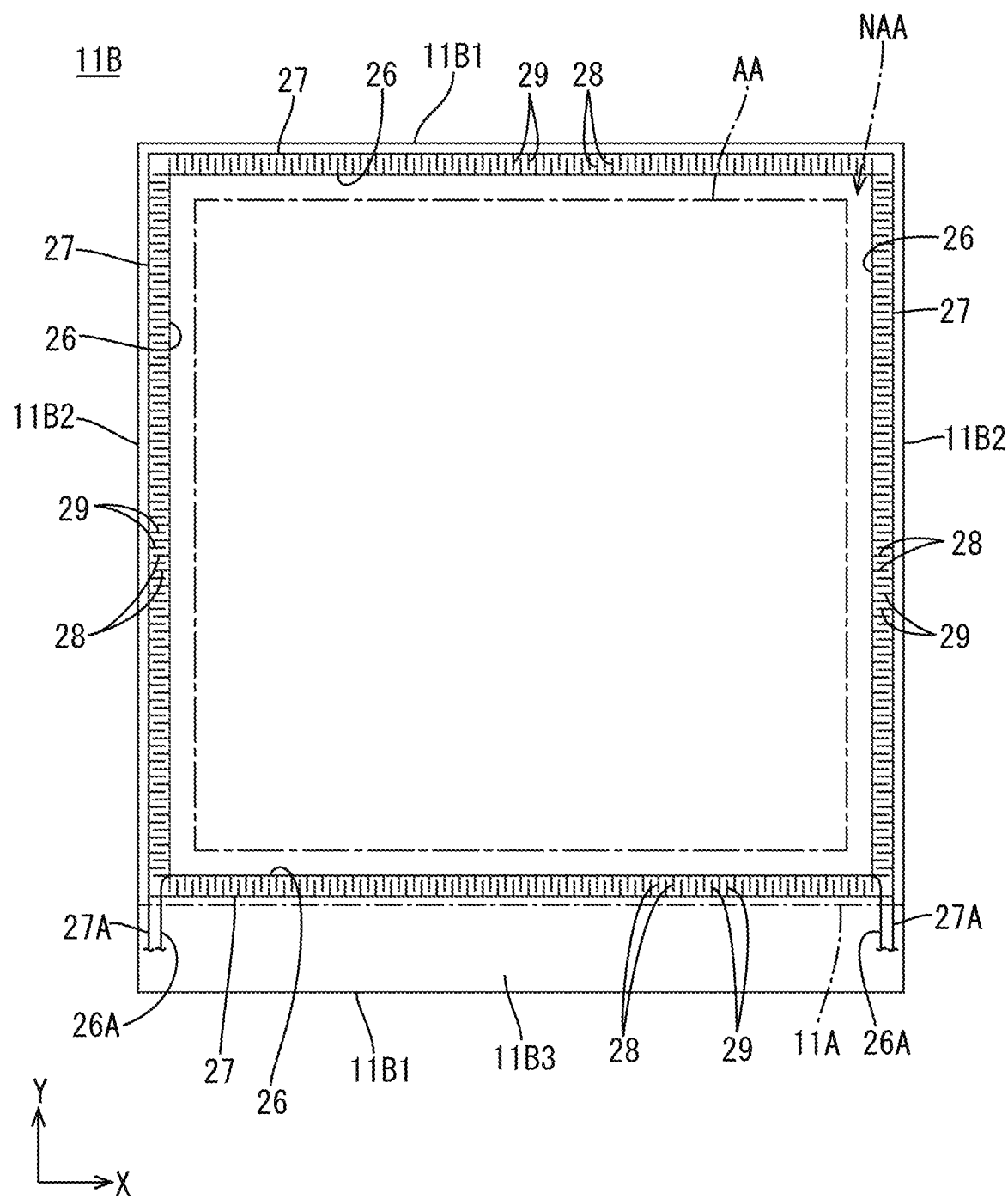
FIG. 6 is a plan view of the array substrate.

Next, a configuration of the array substrate 11B in the non-display area NAA will be described with reference to FIGS. 6 and 8. As illustrated in FIG. 6, first lines 26 for supplying the common potential to the first electrode 23 and second lines 27 for supplying the ground potential to the second electrode 24 are disposed in the non-display area NAA of the array substrate 11B. The first lines 26 and the second lines 27 are formed by patterning metal films, portions of which are configured as the gate lines 16 and the source lines 17, with the known photolithography method. Namely, in producing the array substrate 11B, the first lines 26 and the second lines 27 are formed in the process of forming the gate lines 16 and the source lines 17. The first lines 26 and the second lines 27 may be portions of the same metal film but may be portions of different metal films. The first lines 26 and the second lines 27 are disposed on portions of the non-display area NAA of the array substrate 11B that overlap the opposed substrate 11A. The first lines 26 and the second lines 27 are disposed in portions of the non-display area NAA of the array substrate 11B that are between the display area AA and edges 11B1, 11B2 of the array substrate 11B. The first lines 26 are spaced from the second lines 27, respectively. The first lines 26 and the second lines 27 extend parallel to each other. Four first lines 26 and four second lines 27 are disposed to extend along four edges of the array substrate 11B, respectively. The four edges include two edges 11B1 and two edges 11B2. Two of the four first lines 26 extend along the X-axis direction and other two of the four first lines 26 extend along the Y-axis direction. Two of the four second lines 27 extend along the X-axis direction and other two of the four second lines 27 extend along the Y-axis direction. The four first lines 26 are disposed such that end sections of the every adjacent two of the four first lines 26 overlap. The four first lines 26 form a square frame (an endless ring) plan view shape as a whole that extends to surround the display area AA. The four second lines 27 are disposed such that end sections of the every adjacent two of the four second lines 27 overlap. The four second lines 27 form a square frame (an endless ring) plan view shape as a whole that extends to surround the display area AA. The four first lines 26 and the four second lines 27 extend parallel to the sealing member 11D. The first lines 26 are disposed closer to the display area AA (on an inner side) than the second lines 27 are. The second lines 27 are disposed farther away from the display area AA (on an outer side) than the first lines 26 are.

Figure 8:
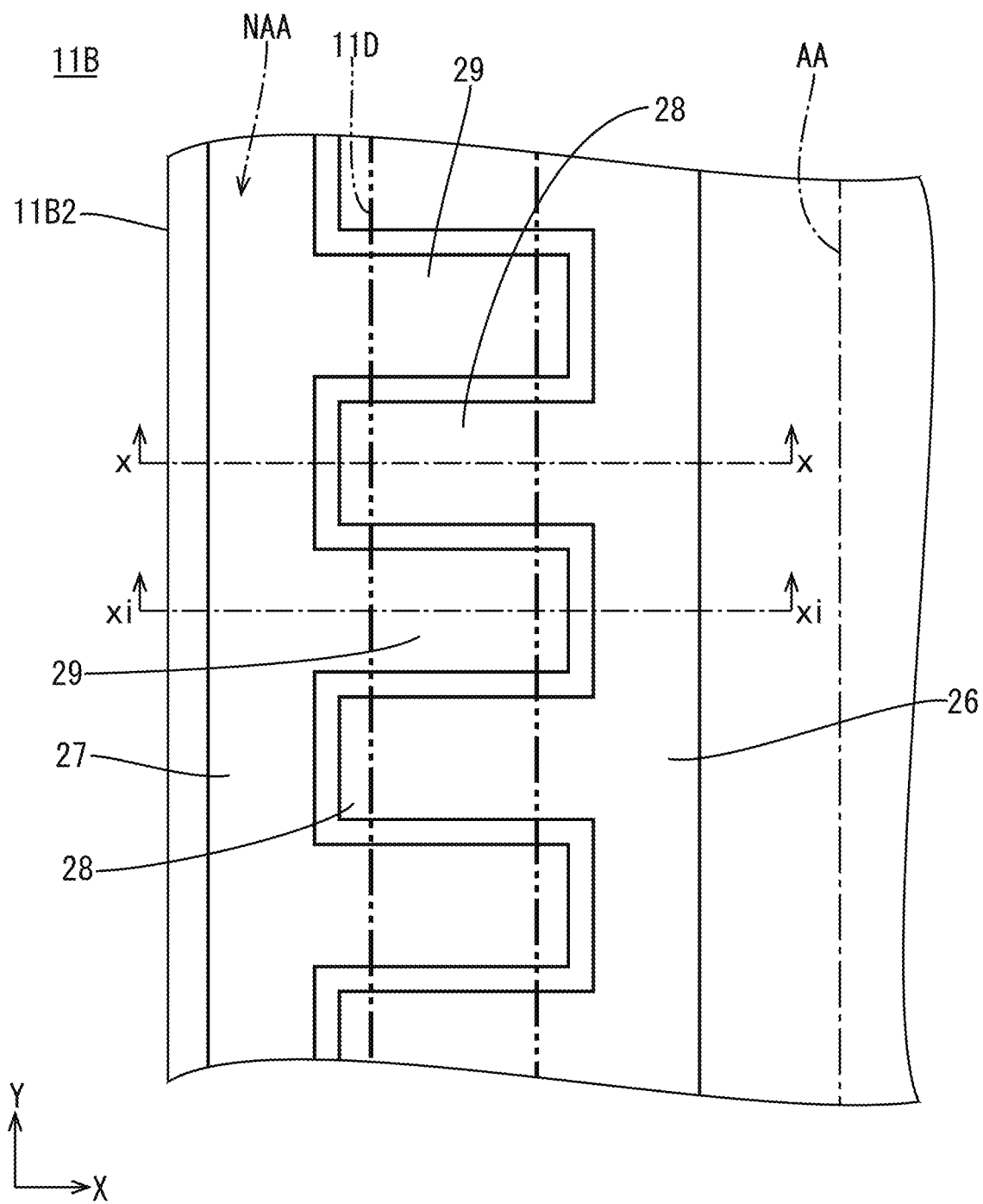
FIG. 8 is a magnified plan view illustrating an edge portion of the array substrate.

As illustrated in FIG. 8, the first lines 26 and the second lines 27 are disposed not to overlap the sealing member 11D. The sealing member 11D is indicated by two-dot chain lines in FIG. 8. The first line 26 is away from the second line 27 and a distance between the first line 26 and the second line 27 is greater than a width of the sealing member 11D. The distance between the first line 26 and the second line 27 is constant over an entire length. The first line 26 is disposed away from the sealing member 11D and closer to the display area AA than the sealing member 11D is. The second line 27 is disposed away from the sealing member 11D and farther away from the display area AA than the sealing member 11D is. The second lines 27 are disposed closer to the edges 11B1, 11B2 than the sealing member 11D is. The first line 26 is electrically connected to first connection electrodes 28 that project from the first line 26 toward the second line 27 (to be away from the display area AA). The first connection electrodes 28 are portions of the metal film portions of which are configured as the first lines 26 and are continuous to the first lines 26. Therefore, the first connection electrodes 28 are formed in the process of forming the first lines 26 in producing the array substrate 11B. The first connection electrodes 28 extend from the first line 26 along a direction (the X-axis direction in FIG. 8) that crosses the extending direction (the Y-axis direction in FIG. 8) in which the first line 26 extends. The first connection electrodes 28 are arranged at intervals in the extending direction of the first line 26. Each of the intervals between the first connection electrodes 28 is greater than a width of a second connection electrode 29. The second line 27 is electrically connected to the second connection electrodes 29 that project from the second line 27 toward the first line 26 (to be closer to the display area AA). Thus, the first connection electrodes 28 and the second connection electrodes 29 are disposed between the first line 26 and the second line 27. This saves spaces for the connection electrodes and a frame width of the liquid crystal panel 11 is preferably decreased. The second connection electrodes 29 are portions of the metal film portions of which are configured as the second lines 27 and are continuous to the second lines 27. Therefore, the second connection electrodes 29 are formed in the process of forming the second lines 27 in producing the array substrate 11B. The second connection electrodes 29 extend from the second line 27 along a direction that crosses the extending direction in which the second line 27 extends. The second connection electrodes 29 are arranged at intervals in the extending direction of the second line 27. Each of the intervals between the second connection electrodes 29 is greater than a width of a first connection electrode 28. The first connection electrodes 28 and the second connection electrodes 29 are disposed in an area (a space) between the first line 26 and the second line 27. The first connection electrodes 28 and the second connection electrodes 29 are arranged in the extending direction of the first line 26 and the second line 27. The first connection electrodes 28 and the second connection electrodes 29 are arranged alternately in the extending direction of the first line 26 and the second line 27. The first connection electrodes 28 and the second connection electrodes 29 are disposed to overlap the sealing member 11D in a plan view.

As illustrated in FIG. 6, extending lines 26A, 26B extending from the first line 26 and the second line 27, respectively, are disposed on the projecting portion 11B3 of the array substrate 11B. The projecting portion 11B3 is a portion of the non-display area NAA of the array substrate 11B and does not overlap the opposed substrate 11A. At least a pair of extending lines 26A, 26B extend to a mounting area in which the driver 14 or the flexible circuit board 15 is mounted and are connected to at least a pair of terminals mounted on the mounting area. The terminals are supplied with the common potential or the ground potential from the driver 14 or the flexible circuit board 15.

Figure 7:
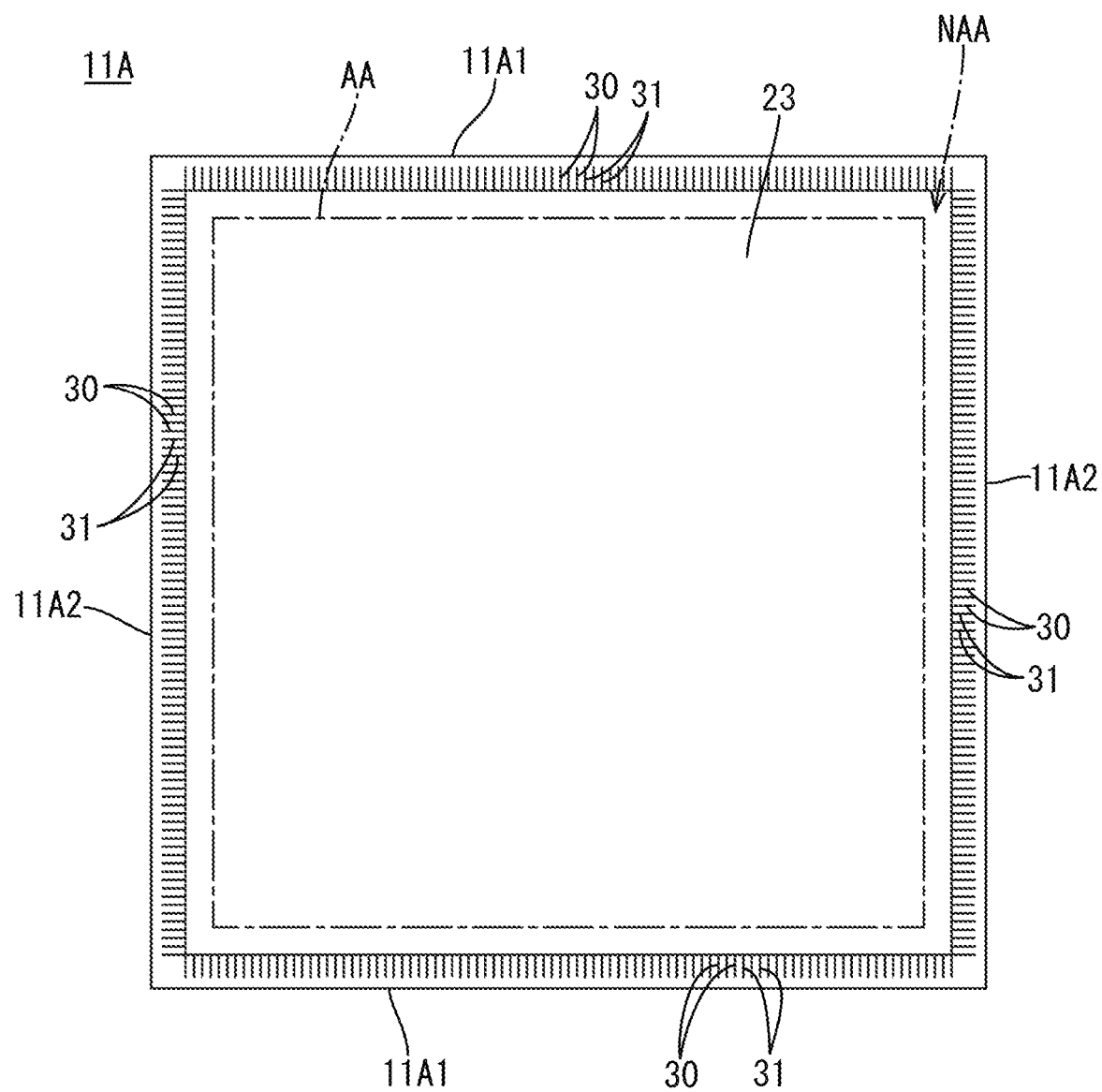
FIG. 7 is a plan view of an opposed substrate included in the liquid crystal panel.

Next, a configuration of the opposed substrate 11A in the non-display area NAA will be described with reference to FIGS. 7 and 9. As illustrated in FIG. 7, third connection electrodes 30 that are electrically connected to the first electrode 23 and fourth connection electrodes 31 that are electrically connected to the second electrode 24 are disposed in the non-display area NAA of the opposed substrate 11A. The first electrode 23 and the second electrode 24 have a square plan view shape and are greater in size than the display area AA. The first electrode 23 overlaps the display area AA and a middle section of the first electrode 23 corresponds to an entire area of the display area AA and an outer peripheral section of the first electrode 23 corresponds to the non-display area NAA. Similar to the first electrode 23, the second electrode 24 overlaps the display area AA and a middle section of the second electrode 24 corresponds to the entire area of the display area AA and an outer peripheral section of the second electrode 24 corresponds to the non-display area NAA. Namely, the first electrode 23 and the second electrode 24 are disposed in the display area AA and the non-display area NAA.

As illustrated in FIG. 7, the third connection electrodes 30 are disposed between the first electrode 23 and each of the edges 11A1, 11A2 of the opposed substrate 11A in the non-display area of the opposed substrate 11A. The third connection electrodes 30 are electrically connected to edge portions of the first electrode 23. The third connection electrodes 30 protrude outwardly from the edges of the first electrode 23. The third connection electrodes 30 are arranged at intervals in a direction (the X-axis direction or the Y-axis direction) along the edge of the first electrode 23. The third connection electrodes 30 are arranged along an entire peripheral edge portion that includes four edge portions of the first electrode 23. The third connection electrodes 30 are arranged corresponding to each of the four edge portions, which are configured as the peripheral edge portion of the first electrode 23. The fourth connection electrodes 31 are disposed between the second electrode 24 and each of the edges 11A1, 11A2 of the opposed substrate 11A in the non-display area NAA of the opposed substrate 11A. The fourth connection electrodes 31 are electrically connected to edge portions of the second electrode 24. The fourth connection electrodes 31 protrude outwardly from the edge portions of the second electrode 24. The fourth connection electrodes 31 are arranged at intervals in a direction along the edge portion of the second electrode 24. The fourth connection electrodes 31 are arranged along an entire peripheral edge portion that includes four edge portions of the second electrode 24. The fourth connection electrodes 31 are arranged corresponding to each of the four edge portions, which are configured as the peripheral edge portion of the second electrode 24.

Figure 9:
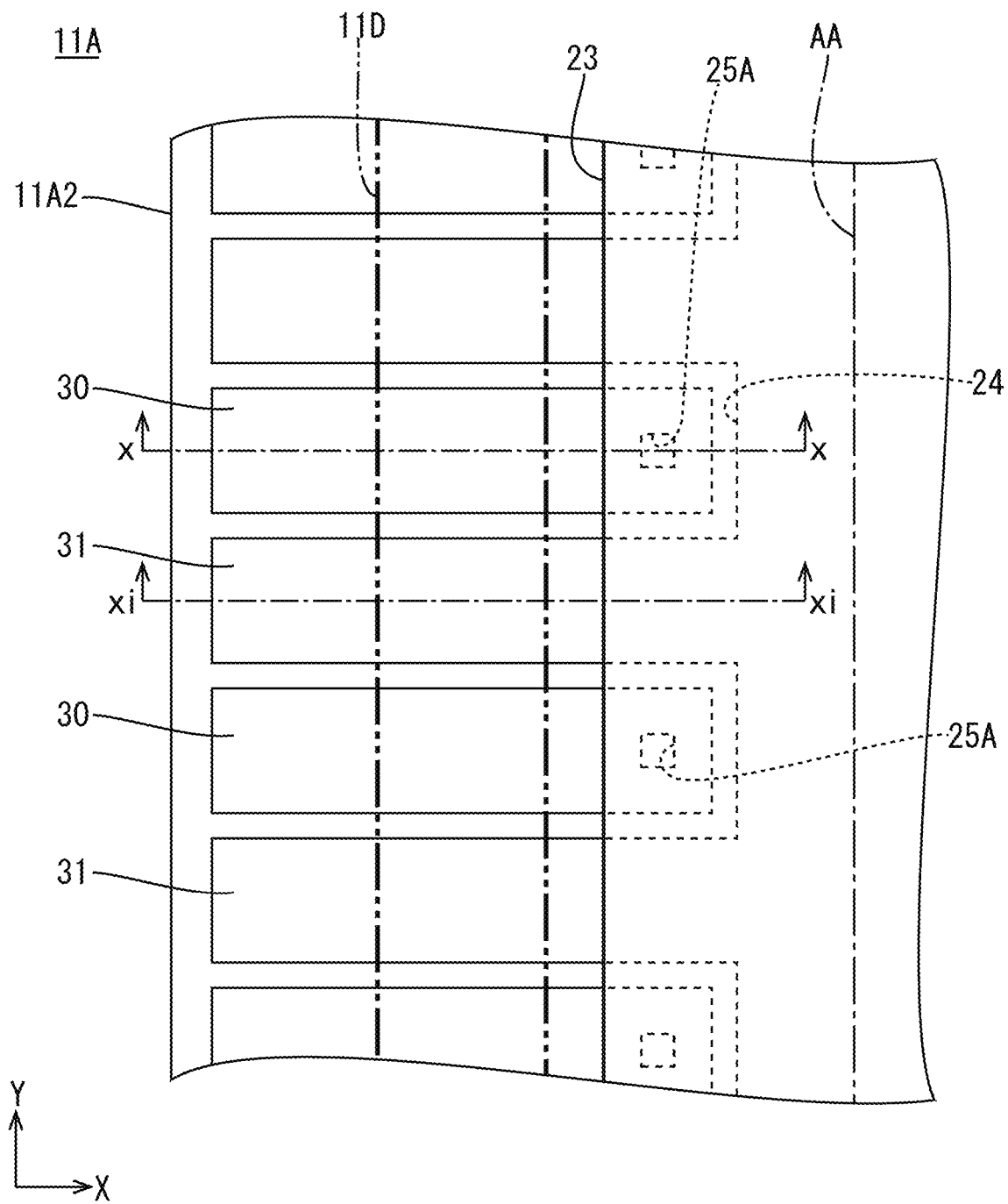
FIG. 9 is a magnified plan view illustrating an edge portion of the opposed substrate.

As illustrated in FIG. 9, peripheral edges of the first electrode 23 and the second electrode 24 are disposed on an inner side with respect to the sealing member 11D (closer to the display area AA than the sealing member 11D is) and do not overlap the sealing member 11D. The sealing member 11D is indicated by two-dot chain lines in FIG. 9. The third connection electrodes 30 extend in a direction (the X-axis direction in FIG. 9) that crosses a direction (the Y-axis direction in FIG. 9) along the edge of the first electrode 23. The third connection electrodes 30 are arranged at intervals in the direction along the edge of the first electrode 23. Each of the intervals between the third connection electrodes 30 is greater than a width of the fourth connection electrode 31. The fourth connection electrodes 31 extend from the second electrode 24 along a direction (the X-axis direction in FIG. 9) that crosses a direction (the Y-axis direction in FIG. 9) along the edge of the second electrode 24. The fourth connection electrodes 31 are arranged at intervals in the direction along the edge of the second electrode 24. Each of the intervals between the fourth connection electrodes 31 is greater than a width of the third connection electrode 30. The third connection electrodes 30 and the fourth connection electrodes 31 are arranged along the edges of the first electrode 23 and the second electrode 24. The third connection electrodes 30 and the fourth connection electrodes 31 are arranged alternately in the direction along the edges of the first electrode 23 and the second electrode 24. The third connection electrodes 30 and the fourth connection electrodes 31 are disposed to overlap the sealing member 11D in a plan view.

Figure 10:
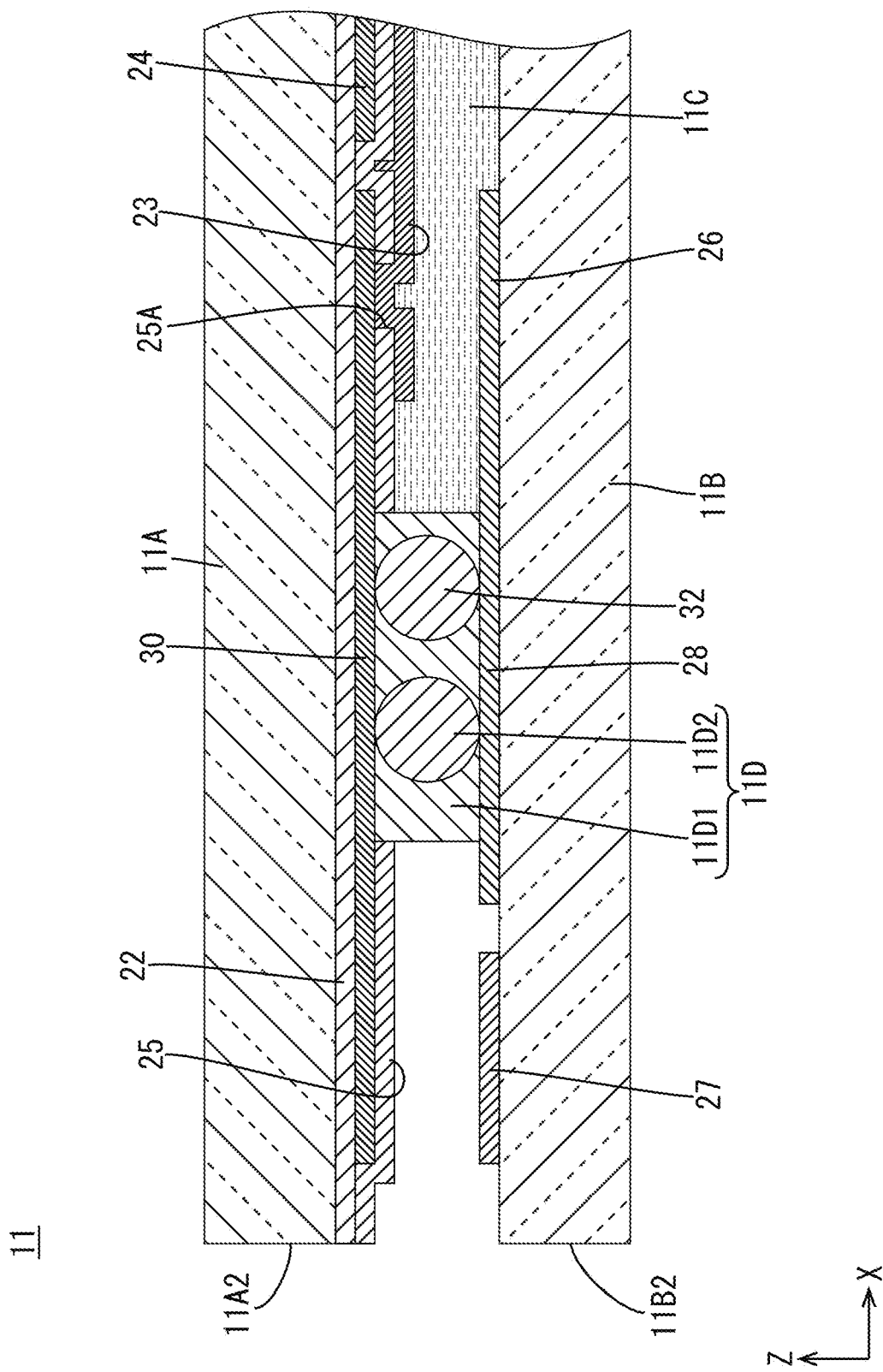
FIG. 10 is a cross-sectional view of the liquid crystal panel along line x-x in FIGS. 8 and 9.

Next, relation between the first connection electrodes 28 and the third connection electrodes 30 will be described. As illustrated in FIG. 10, the light blocking portion 22 is disposed in a solid manner on an entire area of the non-display area NAA of the opposed substrate 11A. With the light blocking portion 22 being disposed in a solid manner in the non-display area NAA, light is less likely to exit through the non-display area NAA. This improves display quality of images displayed on the display area AA. The third connection electrodes 30 are disposed to overlap the first connection electrodes 28, respectively. Namely, the third connection electrodes 30 are opposite and spaced from the first connection electrodes 28 with respect to the Z-axis direction, respectively. The third connection electrodes 30 are included in a lower layer than the insulation film 25 and in the same layer as the second electrode 24. The third connection electrodes 30 are separated from the second electrode 24 that is included in the same layer as the third connection electrodes 30. The third connection electrodes 30 are portions of the transparent electrode film a portion of which is configured as the second electrode 24. The portions of the transparent electrode film configured as the third connection electrodes 30 are different from the portion of the transparent electrode film configured as the second electrode 24. Therefore, the third connection electrodes 30 are formed in the process of forming the second electrode 24 in producing the opposed substrate 11A. A most portion of each third connection electrode 30 does not overlap the first electrode 23 but a portion of each third connection electrode 30 overlaps the first electrode 23 via the insulation film 25. Specifically, end portions of the third connection electrodes 30 that are close to the display area AA overlap the edge portions of the first electrode 23 via the insulation film 25. The insulation film 25 includes contact holes 25A in portions that are disposed between the end portions of the third connection electrodes 30 and the edge portions of the first electrode 23 that are overlapped with each other. The first electrode 23 and the third connection electrodes 30 are electrically connected to each other via the contact holes 25A. The end portions of the third connection electrodes 30 that are close to the display area AA and the edge portions of the first electrode 23 are electrically connected to each other via the contact holes 25A in the insulation film 25.

As illustrated in FIG. 10, most of the portions of the third connection electrodes 30 that do not overlap the first electrode 23 overlap the sealing member 11D. The sealing member 11D includes a base member 11D1 and electrically conductive particles 11D2. The base member 11D1 is made of photocurable resin or thermal curing resin. The electrically conductive particles 11D2 are dispersed in the base member 11D1. The electrically conductive particles 11D2 are obtained by performing electrically conductive plating such as gold plating to surfaces of particles made of synthetic resin. A particle size of the electrically conductive particles 11D2 is close to a cell gap of the liquid crystal panel 11. Some of the electrically conductive particles 11D2 overlap the first connection electrodes 28 and the third connection electrodes 30. The electrically conductive particles 11D2 overlapping the first connection electrodes 28 and the third connection electrodes 30 are configured as first electrically conductive portions 32 that are contacted with the first connection electrodes 28 and the third connection electrodes 30. The first connection electrodes 28 and the third connection electrodes 30 are electrically connected via the first electrically conductive portions 32. Thus, the first electrode 23 is supplied with the common potential from the first connection electrodes 28, which are continuous from each of the four first lines 26 surrounding the entire periphery of the first electrode 23, via the first electrically conductive portions 32 and the third connection electrodes 30. With such a configuration, the resistance distribution in the first electrode 23 is less likely to be irregular. Therefore, even if potential fluctuation is caused in the first electrode 23 due to the noise that is inputted from the sub liquid crystal panel 13, the potential of the first electrode 23 can be corrected to the predefined common potential promptly. This improves display quality of the liquid crystal panel 11. The first electrically conductive portions 32 that overlap the first connection electrodes 28 and the third connection electrodes 30 do not overlap the second electrode 24. According to such a configuration, even with the number of portions (the first connection electrodes 28, the first electrically conductive portions 32, the third connection electrodes 30) that electrically connect the first lines 26 and the first electrode 23 being increased, a short circuit is less likely to be caused between the third connection electrodes 30 and the second electrode 24 with the first electrically conductive portions 32. This improves connection reliability. End portions of the third connection electrodes 30 that are opposite from the display area AA do not overlap the sealing member 11D but are covered with the insulation film 25. The end portions of the third connection electrodes 30 that are on an outer side with respect to the sealing member 11D are protected by the insulation film 25.

Figure 11:
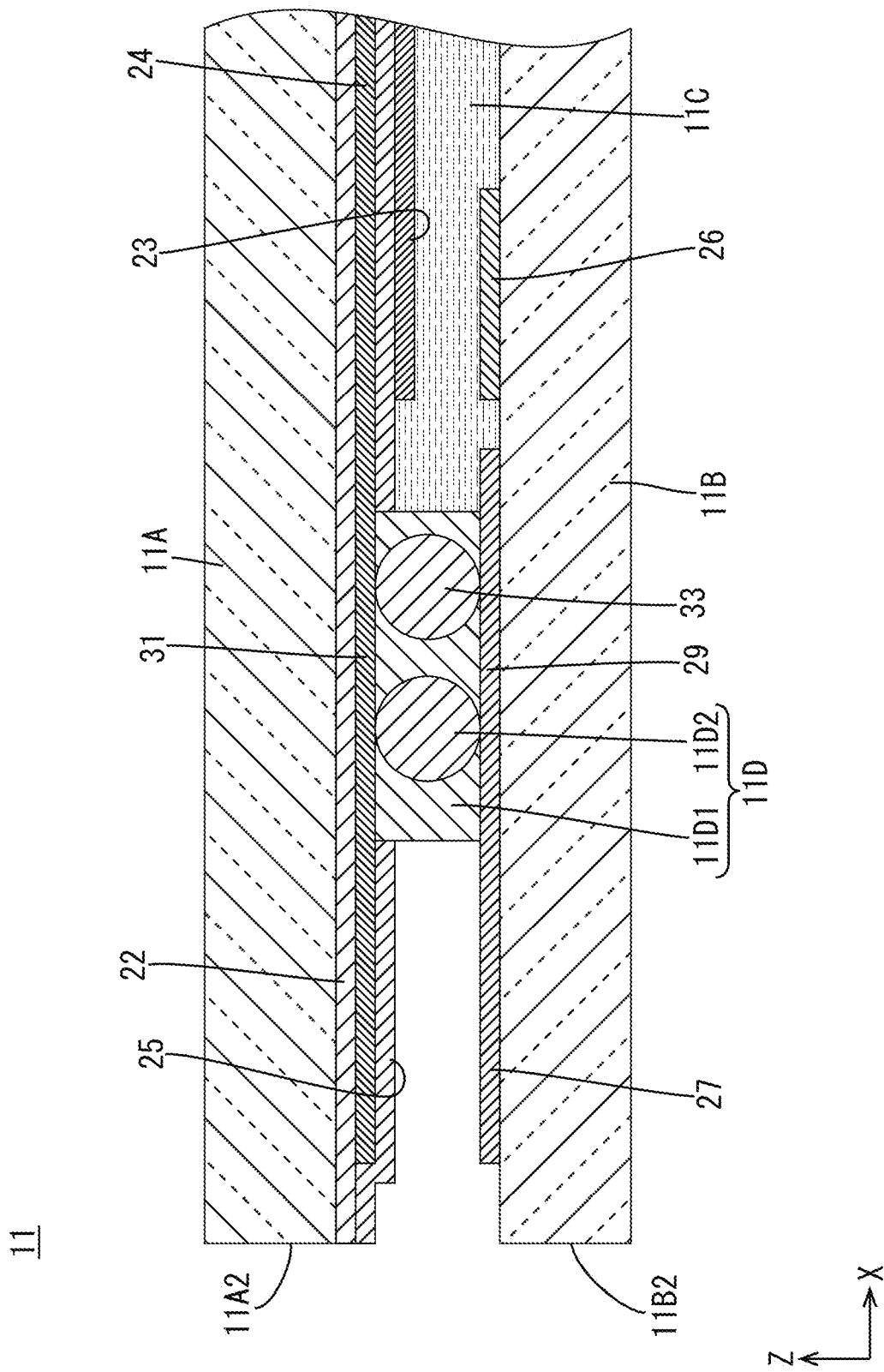
FIG. 11 is a cross-sectional view of the liquid crystal panel along line xi-xi in FIGS. 8 and 9.

Next, relation between the second connection electrodes 29 and the fourth connection electrodes 31 will be described with reference to FIG. 11. As illustrated in FIG. 11, the fourth connection electrodes 31 are disposed to overlap the second connection electrodes 29, respectively. Namely, the fourth connection electrodes 31 are opposite and spaced from the second connection electrodes 29 with respect to the Z-axis direction, respectively. The fourth connection electrodes 31 are included in a lower layer than the insulation film 25 and in the same layer as the second electrode 24. The fourth connection electrodes 31 are portions of the transparent electrode film a portion of which is configured as the second electrode 24. The portions of the transparent electrode film configured as the fourth connection electrodes 31 are different from the portion of the transparent electrode film configured as the second electrode 24. Therefore, the fourth connection electrodes 31 are formed in the process of forming the second electrode 24 in producing the opposed substrate 11A. End portions of the fourth connection electrodes 31 that are close to the display area AA are continuous to the edge portions of the second electrode 24. Accordingly, the fourth connection electrodes 31 and the second electrode 24 are electrically connected. The end portions of the fourth connection electrodes 31 that are close to the display area AA overlap the first electrode 23 but the rest portions of the fourth connection electrodes 31 are disposed on an outer side with respect to the edges of the first electrode 23 (on an opposite side from the display area AA) and do not overlap the first electrode 23.

As illustrated in FIG. 11, most of the portions of the fourth connection electrodes 31 that do not overlap the first electrode 23 are disposed to overlap the sealing member 11D. Some of the electrically conductive particles 11D2 included in the sealing member 11D overlap the second connection electrodes 29 and the fourth connection electrodes 31. The electrically conductive particles 11D2 overlapping the second connection electrodes 29 and the fourth connection electrodes 31 are configured as second electrically conductive portions 33 that are contacted with the second connection electrodes 29 and the fourth connection electrodes 31. The second connection electrodes 29 and the fourth connection electrodes 31 are electrically connected via the second electrically conductive portions 33. Thus, the second electrode 24 is supplied with the ground potential from the second connection electrodes 29, which are continuous from each of the four second lines 27 surrounding the entire periphery of the second electrode 24, via the second electrically conductive portions 33 and the fourth connection electrodes 31. With such a configuration, the resistance distribution in the second electrode 24 is less likely to be irregular. Therefore, even if potential fluctuation is caused in the second electrode 24 due to the noise that is inputted from the sub liquid crystal panel 13, the potential of the second electrode 24 can be corrected to the predefined ground potential promptly. The second electrically conductive portions 33 that overlap the second connection electrodes 29 and the fourth connection electrodes 31 do not overlap the first electrode 23. According to such a configuration, even with the number of portions (the second connection electrodes 29, the second electrically conductive portions 33, the fourth connection electrodes 31) that electrically connect the second lines 27 and the second electrode 24 being increased, a short circuit is less likely to be caused between the fourth connection electrodes 31 and the first electrode 23 with the second electrically conductive portions 33. This improves connection reliability. End portions of the fourth connection electrodes 31 that are opposite from the display area AA do not overlap the sealing member 11D but are covered with the insulation film 25. The end portions of the fourth connection electrodes 31 that are on an outer side with respect to the sealing member 11D are protected by the insulation film 25.

As illustrated in FIGS. 10 and 11, the third connection electrodes 30 and the fourth connection electrodes 31 are disposed in the same layer as the second electrode 24. The first connection electrodes 28 and the second connection electrodes 29 are disposed in the same layer. Therefore, a distance between the first connection electrodes 28 and the third connection electrodes 30 that are opposite each other with respect to the Z-axis direction is about equal to a distance between the second connection electrodes 29 and the fourth connection electrodes 31 that are opposite each other with respect to the Z-axis direction. Accordingly, a height of the first electrically conductive portions 32 that are disposed between the first connection electrodes 28 and the third connection electrodes 30 can be same as a height of the second electrically conductive portions 33 that are disposed between the second connection electrodes 29 and the fourth connection electrodes 31. As previously described, the first electrically conductive portions 32 and the second electrically conductive portions 33 are some of the electrically conductive particles 11D2. Therefore, with the sealing member 11D including the electrically conductive particles 11D2 having one particle size, the first electrically conductive portions 32 and the second electrically conductive portions 33 can be provided. Therefore, a material cost can be reduced and connection reliability can be improved.

As previously described, the liquid crystal panel 11 (the display device) according to this embodiment includes the array substrate 11B (a first substrate) and the opposed substrate 11A (a second substrate) that is disposed opposite the array substrate 11B. The array substrate 11B includes the first line 26, the second line 27 that is disposed away from the first line 26 and extends parallel to the first line 26, the first connection electrode 28 that projects from the first line 26 toward the second line 27, and the second connection electrode 29 that projects from the second line 27. The first connection electrode 28 and the second connection electrode 29 are arranged in the extending direction in which the second line 27 extends. The opposed substrate 11A includes the first electrode 23, the third connection electrode 30 that is electrically connected to the first electrode 23 and disposed to overlap the first connection electrode 28, the second electrode 24, and the fourth connection electrode 31 that is electrically connected to the second electrode 24 and disposed to overlap the second connection electrode 29. The third connection electrode 30 and the fourth connection electrode 31 are arranged in the extending direction. The liquid crystal panel 11 further includes the first electrically conductive portion 32 and the second electrically conductive portion 33 between the array substrate 11B and the opposed substrate 11A. The first electrically conductive portion 32 is disposed to overlap the first connection electrode 28 and the third connection electrode 30 and contacted with the first connection electrode 28 and the third connection electrode 30. The second electrically conductive portion 33 is disposed to overlap the second connection electrode 29 and the fourth connection electrode 31 and contacted with the second connection electrode 29 and the fourth connection electrode 31.

The first electrode 23 is supplied with the potential of the first line 26 via the first connection electrode 28, the first electrically conductive portion 32, and the third connection electrode 30. The second electrode 24 is supplied with the potential of the second line 27 via the second connection electrode 29, the second electrically conductive portion 33, and the fourth connection electrode 31. The first connection electrode 28, which projects from the first line 26 toward the second line 27, and the second connection electrode 29, which projects from the second line 27 toward the first line 26, are arranged in the extending direction in which the second line 27 extends. The third connection electrode 30 that is electrically connected to the first electrode 23 is disposed to overlap the first connection electrode 28. The fourth connection electrode 31 that is electrically connected to the second electrode 24 is disposed to overlap the second connection electrode 29. According to such a configuration, the first electrically conductive portion 32 that overlaps the first connection electrode 28 and the third connection electrode 30 does not overlap the second electrode 24. The second electrically conductive portion 33 that overlaps the second connection electrode 29 and the fourth connection electrode 31 does not overlap the first electrode 23. According to such a configuration, even with the number of portions (the first connection electrodes 28, the first electrically conductive portions 32, the third connection electrodes 30) that electrically connect the first line 26 and the first electrode 23 and the number of portions (the second connection electrodes 29, the second electrically conductive portions 33, the fourth connection electrodes 31) that electrically connect the second line 27 and the second electrode 24 being increased, a short circuit is less likely to be caused between the third connection electrode 30 and the second electrode 24 with the first electrically conductive portion 32 and a short circuit is less likely to be caused between the fourth connection electrode 31 and the first electrode 23 with the second electrically conductive portion 33. This improves connection reliability. The resistance distribution in the first electrode 23 and the second electrode 24 is less likely to be irregular. With the first connection electrode 28 and the second connection electrode 29 being sandwiched between the first line 26 and the second line 27, the space for the connection electrodes can be effectively saved and the frame width can be preferably reduced.

The array substrate 11B includes the edges 11B1, 11B2, the first lines 26 that extend along the edges 11B1, 11B2, respectively, and the second lines 27 that extend along the edges 11B1, 11B2, respectively. The first connection electrodes 28 are continuous from each of the first lines 26. The second connection electrodes 29 are continuous from each of the second lines 27. The third connection electrodes 30 are disposed to overlap the first connection electrodes 28, respectively. The first electrically conductive portions 32 are disposed to overlap the first connection electrodes 28, respectively. The fourth connection electrodes 31 are disposed to overlap the second connection electrodes 29, respectively. The second electrically conductive portions 33 are disposed to overlap the second connection electrodes 29, respectively. The first connection electrodes 28, which are continuous from each of the first lines 26, are electrically connected to the third connection electrodes 30, respectively, via the first electrically conductive portions 32. With such a configuration, the resistance distribution in the first electrode 23 is less likely to be irregular. The second connection electrodes 29, which are continuous from each of the second lines 27, are electrically connected to the fourth connection electrodes 31, respectively, via the second electrically conductive portions 33. With such a configuration, the resistance distribution in the second electrode 24 is less likely to be irregular.

The liquid crystal panel 11 further includes the liquid crystal layer 11C and the sealing member 11D. The liquid crystal layer 11C is sandwiched between the array substrate 11B and the opposed substrate 11A. The sealing member 11D is disposed between the array substrate 11B and the opposed substrate 11A and surrounds and seal the liquid crystal layer 11C. The first lines 26 and the second lines 27 extend parallel to the sealing member 11D. The first connection electrodes 28, the second connection electrodes 29, the third connection electrodes 30, and the fourth connection electrodes 31 are disposed to overlap the sealing member 11D. The first electrically conductive portions 32 and the second electrically conductive portions 33 are included in the sealing member 11D. With the liquid crystal layer 11C being enclosed with the sealing member 11D, the first electrically conductive portions 32 that are included in the sealing member 11D are electrically connected to the first connection electrodes 28 and the third connection electrodes 30 that overlap the sealing member 11D, and the second electrically conductive portions 33 that are included in the sealing member 11D are electrically connected to the second connection electrodes 29 and the fourth connection electrodes 31 that overlap the sealing member 11D. Thus, the space for the sealing member 11D is commonly used for the first electrically conductive portions 32 and the second electrically conductive portions 33. This saves a space in the liquid crystal panel 11 and the frame width is effectively reduced.

The first connection electrodes 28 are disposed corresponding to each of the first lines 26 and the second connection electrodes 29 are disposed corresponding to each of the second lines 27. The first connection electrodes 28 and the second connection electrodes 29 are alternately arranged with respect to the extending direction. Thus, the first connection electrodes 28 that are disposed corresponding to the first line 26 and the second connection electrodes 29 that are disposed corresponding to the second line 27 are alternately arranged with respect to the extending direction in which the second line 27 extends. With the first connection electrodes 28 being electrically connected to the third connection electrodes 30, respectively, via the first electrically conductive portions 32, the resistance distribution in the first electrode 23 is less likely to be irregular. With the second connection electrodes 29 being electrically connected to the fourth connection electrodes 31, respectively, via the second electrically conductive portions 33, the resistance distribution in the second electrode 24 is less likely to be irregular.

The array substrate 11B and the opposed substrate 11A are divided into the display area AA in which images are displayed and the non-display area NAA that surrounds the display area AA. The first electrode 23 and the second electrode 24 partially overlap the display area AA. The opposed substrate 11A includes the insulation film 25 that is disposed at least between the portion of the first electrode 23 and the portion of the second electrode 24 that are overlapped with each other. The first lines 26 are supplied with a common potential and the second lines 27 are supplied with a ground potential. The common potential transferred via the first lines 26 is supplied to the first electrode 23 via the first connection electrodes 28, the first electrically conductive portions 32, and the third connection electrodes 30. Since at least a portion of the first electrode 23 is disposed in the display area AA, images can be displayed in the display area AA with using the common potential supplied to the first electrode 23. The ground potential transferred via the second lines 27 is supplied to the second electrode 24 via the second connection electrodes 29, the second electrically conductive portions 33, and the fourth connection electrodes 31. Since at least a portion of the second electrode 24 charged at the ground potential is disposed to overlap the first electrode 23 in the display area AA, the second electrode 24 blocks external noise and the external noise is less likely to be inputted to the first electrode 23. Furthermore, since the insulation film 25 is disposed between the portion of the first electrode 23 and the portion of the second electrode 24 that overlap, electrostatic capacitance is created between the first electrode 23 and the second electrode 24 that are charged at different potentials. This suppresses potential fluctuation in the first electrode 23.

The first electrode 23 is disposed in the upper layer than the second electrode 24 via the insulation film 25. The third connection electrodes 30 are disposed in the same layer as the second electrode 24. Portions of the third connection electrodes 30 are disposed to overlap the first electrode 23. The insulation film 25 includes the contact holes 25A in portions that overlap the overlapping portions of the first electrode 23 overlapping the third connection electrodes 30. The third connection electrodes 30 are electrically connected to the first electrode 23 via the contact holes 25A. The fourth connection electrodes 31 are disposed in the same layer as the second electrode 24 and are continuous to the edge portions of the second electrode 24. The third connection electrodes 30 that are disposed in the same layer as the second electrode 24 are electrically connected to the first electrode 23 via the contact holes 25A in the insulation film 25. With the fourth connection electrodes 31 being continuous to the edge portions of the second electrode 24 that is included in the same layer as the fourth connection electrodes 31, the fourth connection electrodes 31 are electrically connected to the second electrode 24. With the third connection electrodes 30 and the fourth connection electrodes 31 being disposed in the same layer as the second electrode 24, the first electrically conductive portions 32 and the second electrically conductive portions 33 can be disposed at the same height. According to such a configuration, the common material (the electrically conductive particles 11D2) can be used for the first electrically conductive portions 32 and the second electrically conductive portions 33 and high connection reliability can be obtained.

The insulation film 25 covers at least portions of the third connection electrodes 30 not overlapping the first electrically conductive portions 32 and at least portions of the fourth connection electrodes 31 not overlapping the second electrically conductive portions 33. With at least the portions of the third connection electrodes 30 not overlapping the first electrically conductive portions 32 and at least the portions of the fourth connection electrodes 31 not overlapping the second electrically conductive portions 33 being covered with the insulation film 25, the non-overlapping portions of the third connection electrodes 30 and the non-overlapping portions of the fourth connection electrodes 31 are protected.

Second Embodiment

A second embodiment will be described with reference to FIGS. 12 to 14. The second embodiment includes third connection electrodes 130 and fourth connection electrodes 131 that have configurations different from those of the first embodiment. Configuration, operations, and effects similar to those of the first embodiment may not be described.

The configurations of the third connection electrodes 130 and the fourth connection electrodes 131 will be described with reference to FIGS. 12 to 14. As illustrated in FIGS. 12 and 13, the third connection electrodes 130 according to this embodiment include first lower layer electrode portions 34 and first upper layer electrode portions 35. The first lower layer electrode portions 34 are included in the same layer as a second electrode 124 and the first upper layer electrode portions 35 are included in the same layer as a first electrode 123. The first lower layer electrode portions 34 are separated from the second electrode 124 that is included in the same layer as the first lower layer electrode portions 34. The first lower layer electrode portions 34 are portions of a transparent electrode film a portion of which is configured as the second electrode 124. The portions of the transparent electrode film configured as the first lower layer electrode portions 34 are different from the portion of the transparent electrode film configured as the second electrode 124. Therefore, the first lower layer electrode portions 34 are formed in the process of forming the second electrode 124 in producing an opposed substrate 111A. The first upper layer electrode portions 35 are continuous to edge portions of a first electrode 123 that is included in the same layer as the first upper layer electrode portions 35. The first upper layer electrode portions 35 overlap the first lower layer electrode portions 34, respectively. The first upper layer electrode portions 35 are portions of a transparent electrode film a portion of which is configured as the first electrode 123. The portions of the transparent electrode film configured as the first upper layer electrode portions 35 are different from the portion of the transparent electrode film configured as the first electrode 123. Therefore, the first upper layer electrode portions 35 are formed in the process of forming the first electrode 123 in producing the opposed substrate 111A. An insulation film 125 includes first contact holes 25B in portions that overlap the first lower layer electrode portions 34 and the first upper layer electrode portions 35. The first contact holes 25B are adjacent to the end portions of the first lower layer electrode portions 34 and the end portions of the first upper layer electrode portions 35 close to the display area AA. The first lower layer electrode portions 34 and the first upper layer electrode portions 35 are electrically connected to each other via the first contact holes 25B. With the third connection electrodes 130 including the first lower layer electrode portions 34 and the first upper layer electrode portions 35 that are electrically connected via the first contact holes 25B, line resistance related to the common potential that is supplied from first lines 126 to the first electrode 123 can be reduced.

Figure 12:
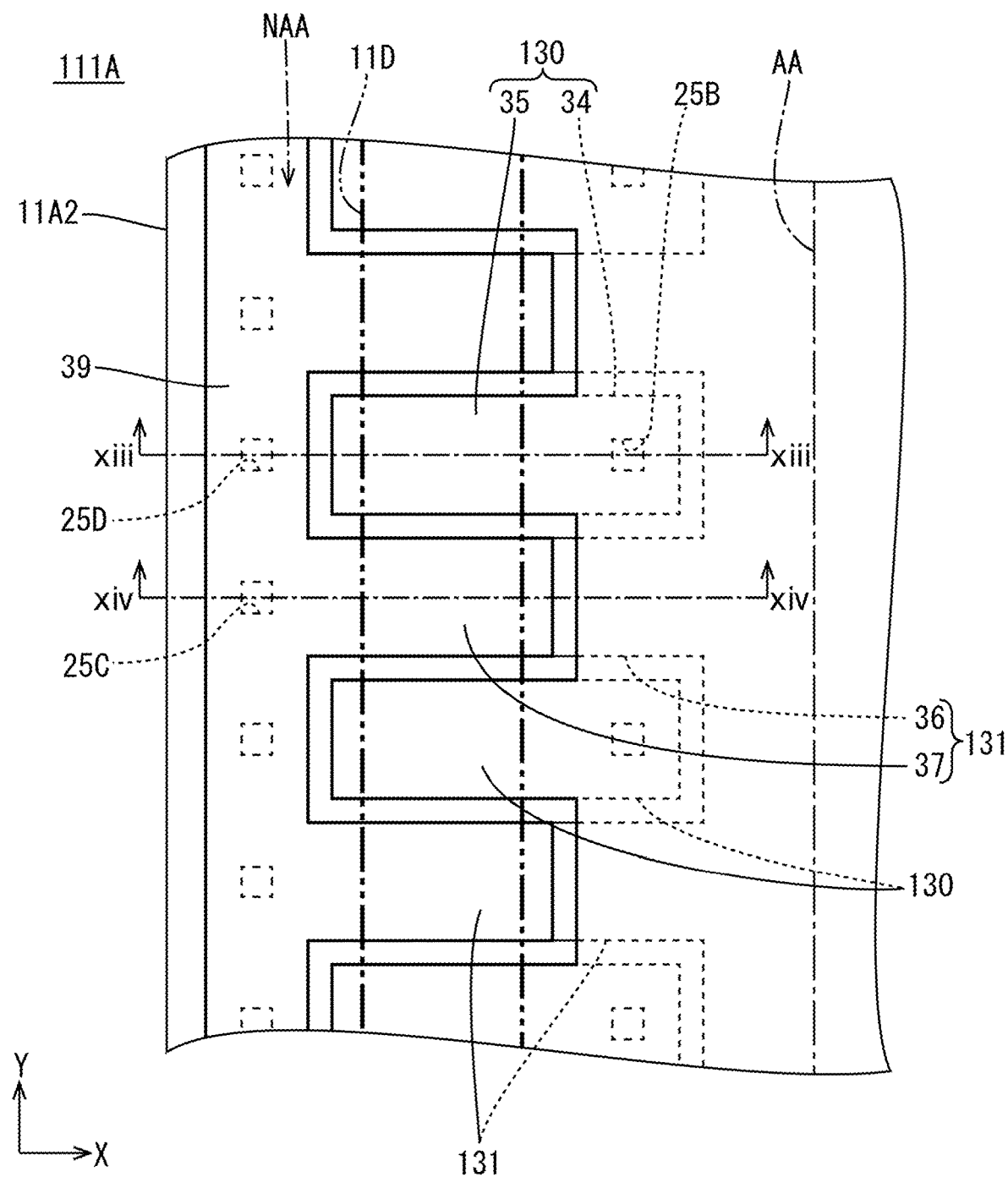
FIG. 12 is a magnified plan view illustrating an edge portion of an opposed substrate according to a second embodiment.
Figure 14:
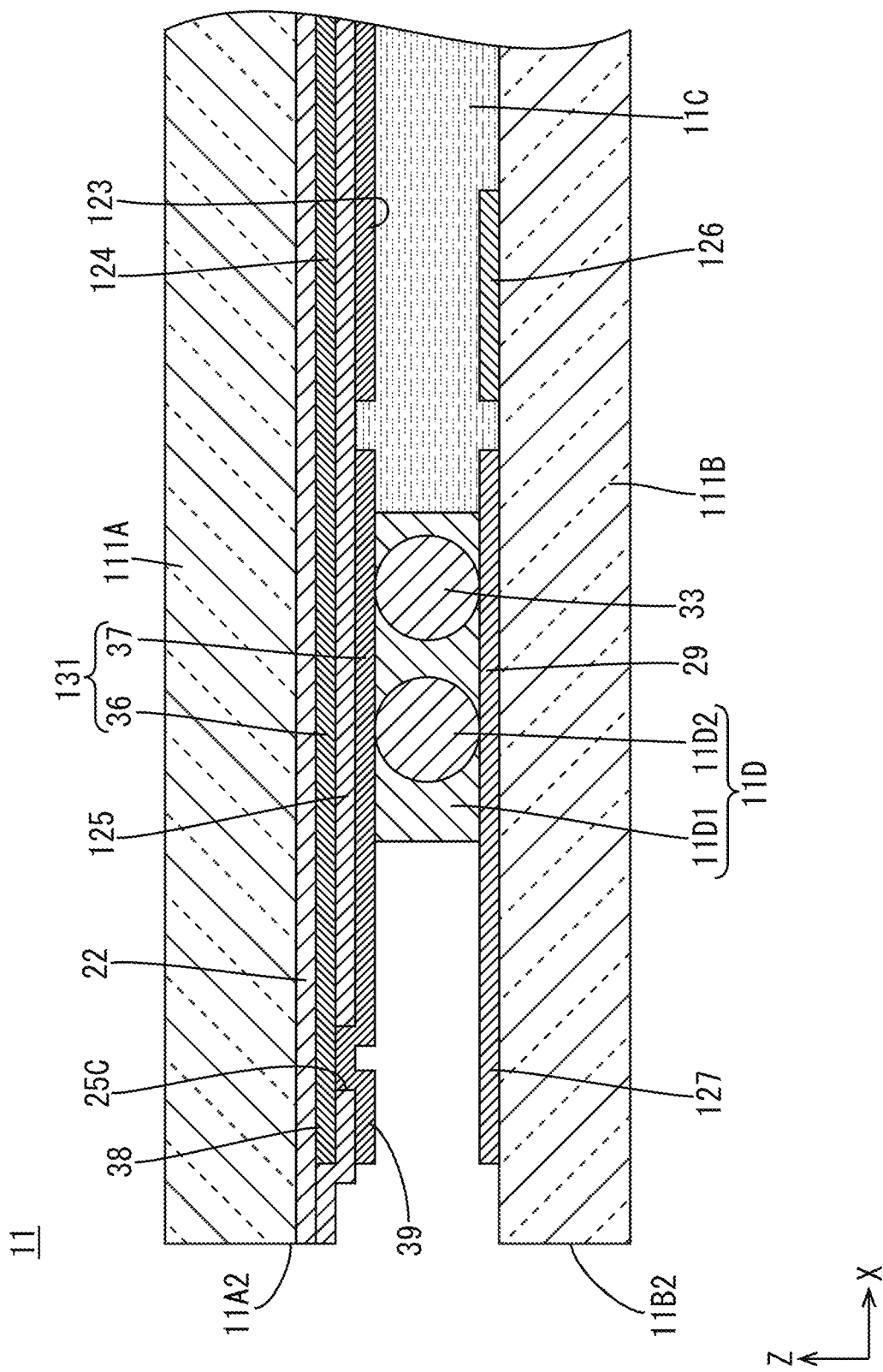
FIG. 14 is a cross-sectional view of the liquid crystal panel along line xiv-xiv in FIG. 12.

As illustrated in FIGS. 12 and 14, the fourth connection electrodes 131 include second lower layer electrode portions 36 that are disposed in the same layer as the second electrode 124 and second upper layer electrode portions 37 that are disposed in the same layer as the first electrode 123. The second lower layer electrode portions 36 are continuous to the edge portions of the second electrode 124. The second lower layer electrode portions 36 are portions of the transparent electrode film a portion of which is configured as the second electrode 124. The portions of the transparent electrode film configured as the second lower layer electrode portions 36 are different from the portion of the transparent electrode film configured as the second electrode 124. Therefore, the second lower layer electrode portions 36 are formed in the process of forming the second electrode 124 in producing the opposed substrate 111A. The second upper layer electrode portions 37, which are disposed in the same layer as the first electrode 123, are separated from the first electrode 123 and disposed to overlap the second lower layer electrode portions 36, respectively. The second upper layer electrode portions 37 are portions of the transparent electrode film a portion of which is configured as the first electrode 123. The portions of the transparent electrode film configured as the second upper layer electrode portions 37 are different from the portion of the transparent electrode film configured as the first electrode 123. Therefore, the second upper layer electrode portions 37 are formed in the process of forming the first electrode 123 in producing the opposed substrate 111A. The insulation film 125 includes second contact holes 25C in portions that overlap the second lower layer electrode portions 36 and the second upper layer electrode portions 37. The second contact holes 25C are adjacent to the outer end sections of the second lower layer electrode portions 36 and the outer end sections of the second upper layer electrode portions 37 that are on an opposite side from the display area AA. The second lower layer electrode portions 36 and the second upper layer electrode portions 37 are electrically connected to each other via the second contact holes 25C. With the fourth connection electrodes 131 including the second lower layer electrode portions 36 and the second upper layer electrode portions 37 that are electrically connected via the second contact holes 25C, line resistance related to the ground potential that is supplied from second lines 127 to the second electrode 124 can be reduced.

Figure 13:
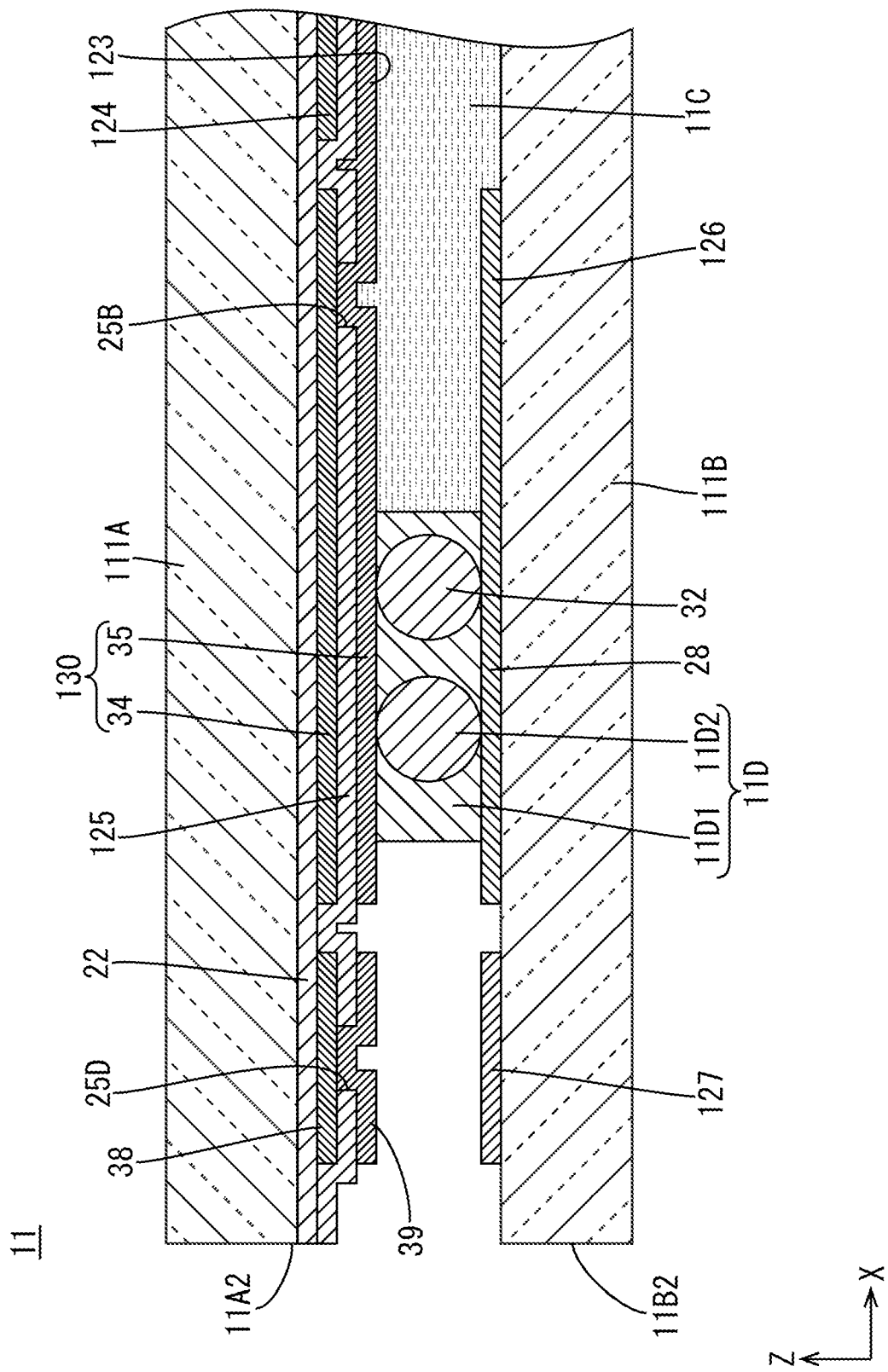
FIG. 13 is a cross-sectional view of the liquid crystal panel along line xiii-xiii in FIG. 12.

As illustrated in FIGS. 12 to 14, the opposed substrate 111A includes lower layer lines 38 that are disposed in the same layer as the second electrode 124 and upper layer lines 39 that are disposed in the same layer as the first electrode 123. The lower layer lines 38 and the upper layer lines 39 overlap via the insulation film 125. The lower layer lines 38 and the upper layer lines 39 overlap the second lines 127, respectively. The lower layer lines 38 and the upper layer lines 39 are disposed on an outer peripheral side (on an opposite side from the display area AA) of the opposed substrate 111A with respect to the third connection electrodes 130 and the fourth connection electrodes 131. The lower layer lines 38 and the upper layer lines 39 are disposed adjacent to the third connection electrodes 130 and the fourth connection electrodes 131. The lower layer lines 38 extend along the extending direction (the Y-axis direction in FIG. 12) in which the first line 126 and the second line 127 extend and are continuous to the end portions of the second lower layer electrode portions 36 that are opposite from the display area AA. The upper layer lines 39 extend along the extending direction (the Y-axis direction in FIG. 12) in which the first line 126 and the second line 127 extend and are continuous to the end portions of the second upper layer electrode portions 37 that are opposite from the display area AA. The insulation film 125 includes third contact holes 25D in portions that overlap the lower layer lines 38 and the upper layer lines 39. The lower layer lines 38 and the upper layer lines 39 are electrically connected to each other via the third contact holes 25D. With the lower layer lines 38 being electrically connected to the second lower layer electrode portions 36 and the upper layer lines 39 being electrically connected to the second upper layer electrode portions 37, line resistance related to the ground potential that is supplied from the second lines 127 to the second electrode 124 can be reduced. Four lower layer lines 38 and four upper layer lines 39 extend along four edges of the opposed substrate 111A, respectively, similar to the first lines 126 and the second lines 127. The four lower layer lines 38 form a square frame (an endless ring) plan view shape as a whole that extends to surround the display area AA. The four lower layer lines 38 are disposed such that end portions of the every adjacent two of the four lower layer lines 38 overlap. The four upper layer lines 39 form a square frame (an endless ring) plan view shape as a whole that extends to surround the display area AA. The four upper layer lines 39 are disposed such that end portions of the every adjacent two of the four upper layer lines 39 overlap.

As previously described, according to this embodiment, the first electrode 123 is disposed in an upper layer than the second electrode 124 via the insulation film 125. The third connection electrodes 130 include the first lower layer electrode portions 34, which are disposed in the same layer as the second electrode 124, and the first upper layer electrode portions 35, which are disposed in the same layer as the first electrode 123 and continuous to the first electrode 123 and overlap the first lower layer electrode portions 34, respectively. The fourth connection electrodes 131 include the second lower layer electrode portions 36, which are disposed in the same layer as the second electrode 124, and the second upper layer electrode portions 37, which are disposed in the same layer as the first electrode 123 and overlap the second lower layer electrode portions 36, respectively. The insulation film 125 includes the first contact holes 25B in portions that overlap the first lower layer electrode portions 34 and the first upper layer electrode portions 35. The first lower layer electrode portions 34 and the first upper layer electrode portions 35 are electrically connected to each other via the first contact holes 25B. The insulation film 125 includes the second contact holes 25C in portions that overlap the second lower layer electrode portions 36 and the second upper layer electrode portions 37. The second lower layer electrode portions 36 and the second upper layer electrode portions 37 are electrically connected to each other via the second contact holes 25C. The first upper layer electrode portions 35, which are continuous to the first electrode 123, are electrically connected to the first lower layer electrode portions 35, which overlap the first upper layer electrode portions 35, via the first contact holes 25B in the insulation film 125. With the third connection electrodes 130 including the first lower layer electrode portions 34 and the first upper layer electrode portions 35 that are electrically connected via the first contact holes 25B, line resistance related to the common potential that is supplied from the first lines 126 to the first electrode 123 can be reduced. The second lower layer electrode portions 36, which are continuous to the second electrode 124, are electrically connected to the second upper layer electrode portions 37, which overlap the second lower layer electrode portions 36, via the second contact holes 25C in the insulation film 125. With the fourth connection electrodes 131 including the second lower layer electrode portions 36 and the second upper layer electrode portions 37 that are electrically connected via the second contact holes 25C, line resistance related to the ground potential that is supplied from second lines 127 to the second electrode 124 can be reduced.

The opposed substrate 111A further includes the lower layer lines 38 and the upper layer lines 39. The lower layer lines 38 are disposed in the same layer as the second electrode 124 and extend along the extending direction in which the second lines 127 extend. The lower layer lines 38 are continuous to the end sections of the second lower layer electrode portions 36. The upper layer lines 39 are disposed in the same layer as the first electrode 123 and extend along the extending direction. The upper layer lines 39 are continuous to the end portions of the second upper layer electrode portions 37. The upper layer lines 39 are disposed to overlap the lower layer lines 38, respectively. The insulation film 125 includes the third contact holes 25D in portions that overlap the lower layer lines 38 and the upper layer lines 39. The lower layer lines 38 and the upper layer lines 39 are electrically connected to each other via the third contact holes 25D. The lower layer lines 38 and the upper layer lines 39 that extend along the extending direction of the second lines 127 are overlapped with each other and electrically connected to each other via the third contact holes 25D in the insulation film 125. With the lower layer lines 38 being electrically connected to the second lower layer electrode portions 36 and the upper layer lines 39 being electrically connected to the second upper layer electrode portions 37, line resistance related to the ground potential that is supplied from the second lines 127 to the second electrode 124 can be reduced.

Third Embodiment

Figure 15:
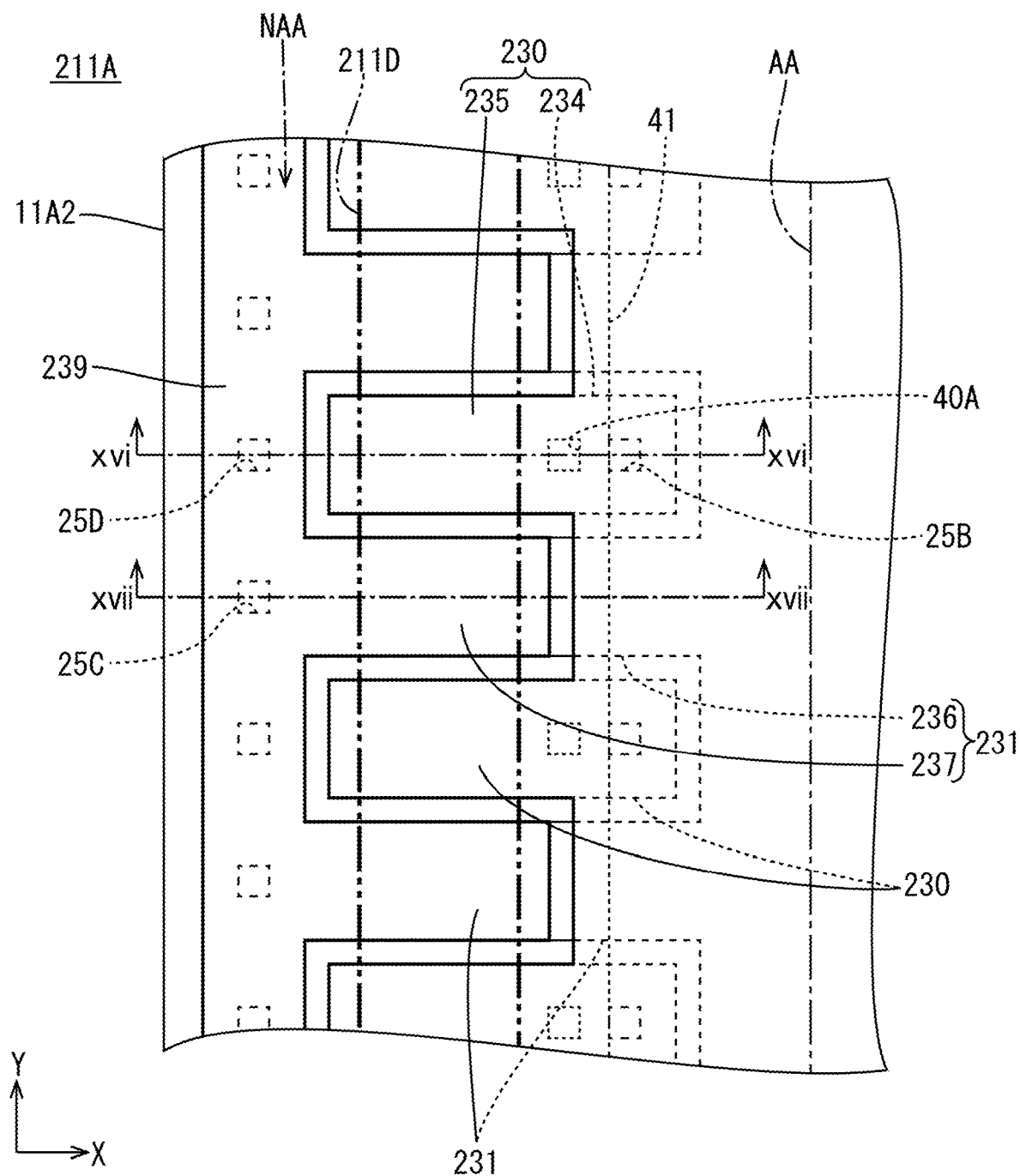
FIG. 15 is a magnified plan view illustrating an edge portion of an opposed substrate according to a third embodiment.
Figure 16:
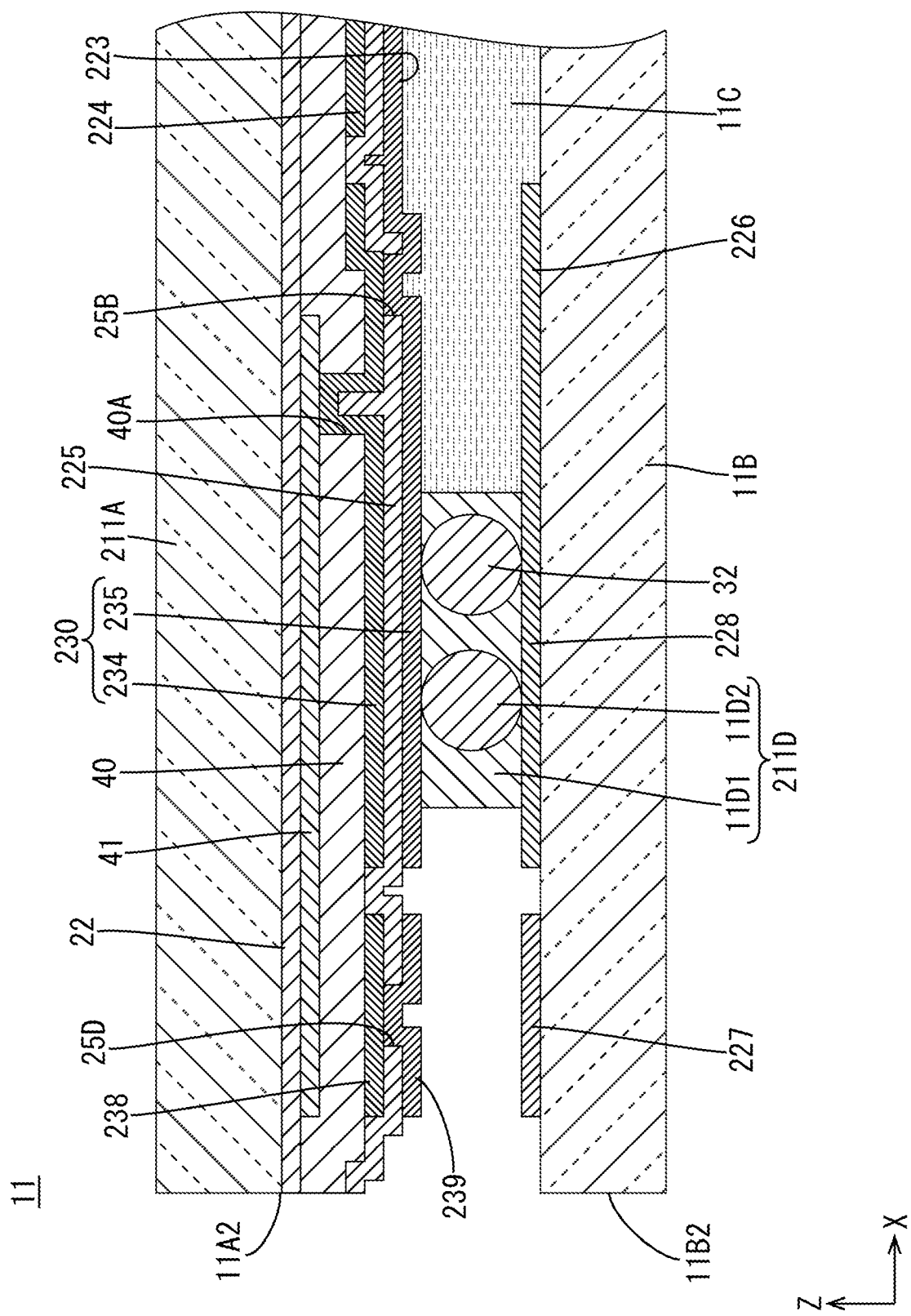
FIG. 16 is a cross-sectional view of the liquid crystal panel along line xvi-xvi in FIG. 15.
Figure 17:
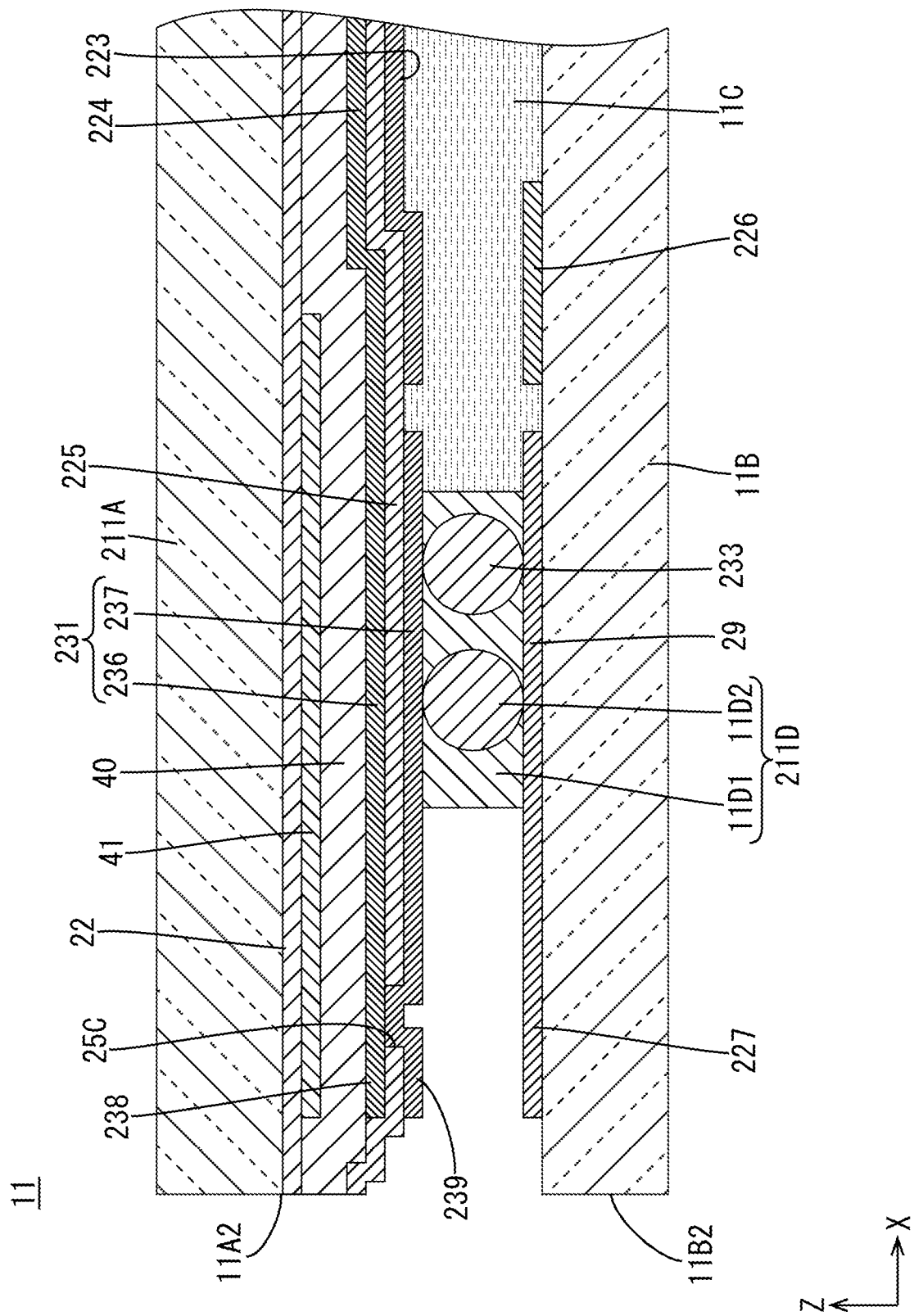
FIG. 17 is a cross-sectional view of the liquid crystal panel along line xvii-xvii in FIG. 15.

A third embodiment will be described with reference to FIGS. 15 to 17. The third embodiment further includes overlapping lines 41 in addition to the configuration of the second embodiment. Configuration, operations, and effects similar to those of the second embodiment may not be described.

A configuration of an opposed substrate 211A will be described with reference to FIGS. 15 to 17. As illustrated in FIGS. 15 to 17, the opposed substrate 211A includes a lower layer insulation film 40 and the overlapping lines 41. The lower layer insulation film 40 is disposed in a lower layer than a second electrode 224. The overlapping lines 41 are disposed in a lower layer than the lower layer insulation film 40. The lower layer insulation film 40 is thicker than an insulation film 225 that is disposed in an upper layer than the lower layer insulation film 40. The lower layer insulation film 40 is disposed in an entire area of at least the non-display area NAA. The lower layer insulation film 40 may be disposed in entire areas of the display area AA and the non-display area NAA.

The overlapping lines 41 extend along an extending direction in which first lines 226 and second lines 227 extend. Specifically, the overlapping lines 41 extend in the non-display area NAA of the opposed substrate 211A to surround the display area AA along an entire periphery of the display area AA. The overlapping lines 41 form a square frame plan view shape (an endless ring shape) as a whole. The overlapping lines 41 extend parallel to a sealing member 211D and overlaps the sealing member 211D. The overlapping lines 41 are disposed to overlap third connection electrodes 230 (first lower layer electrode portions 234 and first upper layer electrode portions 235) and fourth connection electrodes 231 (second lower layer electrode portions 236 and second upper layer electrode portions 237). Furthermore, the overlapping lines 41 overlap upper layer lines 239 and lower layer lines 238. The overlapping lines 41 are formed by patterning a metal film with the known photolithography. The overlapping lines 41 that are portions of the metal film may have light blocking properties; however, the overlapping lines 41 are disposed in the non-display area NAA and less likely to adversely affect images displayed in the display area AA.

The lower layer insulation film 40 includes fourth contact holes 40A in portions that overlap the overlapping lines 41 and the first lower layer electrode portions 234 of the third connection electrodes 230. The overlapping lines 41 and the first lower layer electrode portions 234 that are overlapped with each other are electrically connected via the fourth contact holes 40A. With the overlapping lines 41 being electrically connected to the third connection electrodes 230, the overlapping lines 41 are charged at the common potential same as that of the first lines 226, first connection electrodes 228, and the third connection electrodes 230. Since the overlapping lines 41 are portions of the metal film and extend entirely in the non-display area NAA, line resistance related to the common potential that is supplied from the first lines 226 to the first electrode 223 can be effectively reduced. The overlapping lines 41 are disposed to overlap the second lower layer electrode portions 236 of the fourth connection electrodes 231; however, the lower layer insulation film 40 having a greater thickness than the insulation film 225 is disposed between the overlapping lines 41 and the second lower layer electrode portions 236. In determining the thickness of the insulation film 225, the thickness of the insulation film 225 needs to be sufficiently thin such that a predefined electrostatic capacitance is created between the first electrode 223 and the second electrode 224. In this respect, in determining the thickness of the lower layer insulation film 40, the thickness of the lower layer insulation film 40 can be set sufficiently great because electrostatic capacitance need not be created between the overlapping lines 41 and the second lower layer electrode portions 236. Therefore, the second electrically conductive portions 233 are less likely to break through the lower layer insulation film 40 and cause a short circuit between the second lower layer electrode portions 236 of the fourth connection electrodes 231 and the overlapping lines 41.

As previously described, according to this embodiment, the opposed substrate 211A includes the lower layer insulation film 40 and the overlapping lines 41. The lower layer insulation film 40 is disposed in a lower layer than the second electrode 224 and is thicker than the insulation film 225. The overlapping lines 41 are disposed in a lower layer than the lower layer insulation film 40. The overlapping lines 41 extend along the extending direction of the second lines 227 and are disposed to overlap the third connection electrodes 230 and the fourth connection electrodes 231. The lower layer insulation film 40 includes the fourth contact holes 40A in portions that overlap the overlapping lines 41 and the first lower layer electrode portions 234 of the third connection electrodes 230. The overlapping lines 41 that extend in the extending direction of the second lines 227 are disposed to overlap the third connection electrodes 230 and the fourth connection electrodes 231. The overlapping lines 41 are electrically connected to the first lower layer electrode portions 234 of the third connection electrodes 230 via the fourth contact holes 40A in the lower layer insulation film 40. With the overlapping lines 41 being provided, line resistance related to the common potential that is supplied from the first lines 226 to the first electrode 223 is further reduced. Since the lower layer insulation film 40 is thicker than the insulation film 225, the second electrically conductive portions 233 are less likely to break through the lower layer insulation film 40 and cause a short circuit between the second lower layer electrode portions 236 of the fourth connection electrodes 231 and the overlapping lines 41.

Fourth Embodiment

A fourth embodiment will be described with reference to FIGS. 18 to 22. The fourth embodiment further includes at least third lines 42 and a third electrode 46 in addition to the configuration of the second embodiment. Configuration, operations, and effects similar to those of the second embodiment may not be described.

Figure 18:
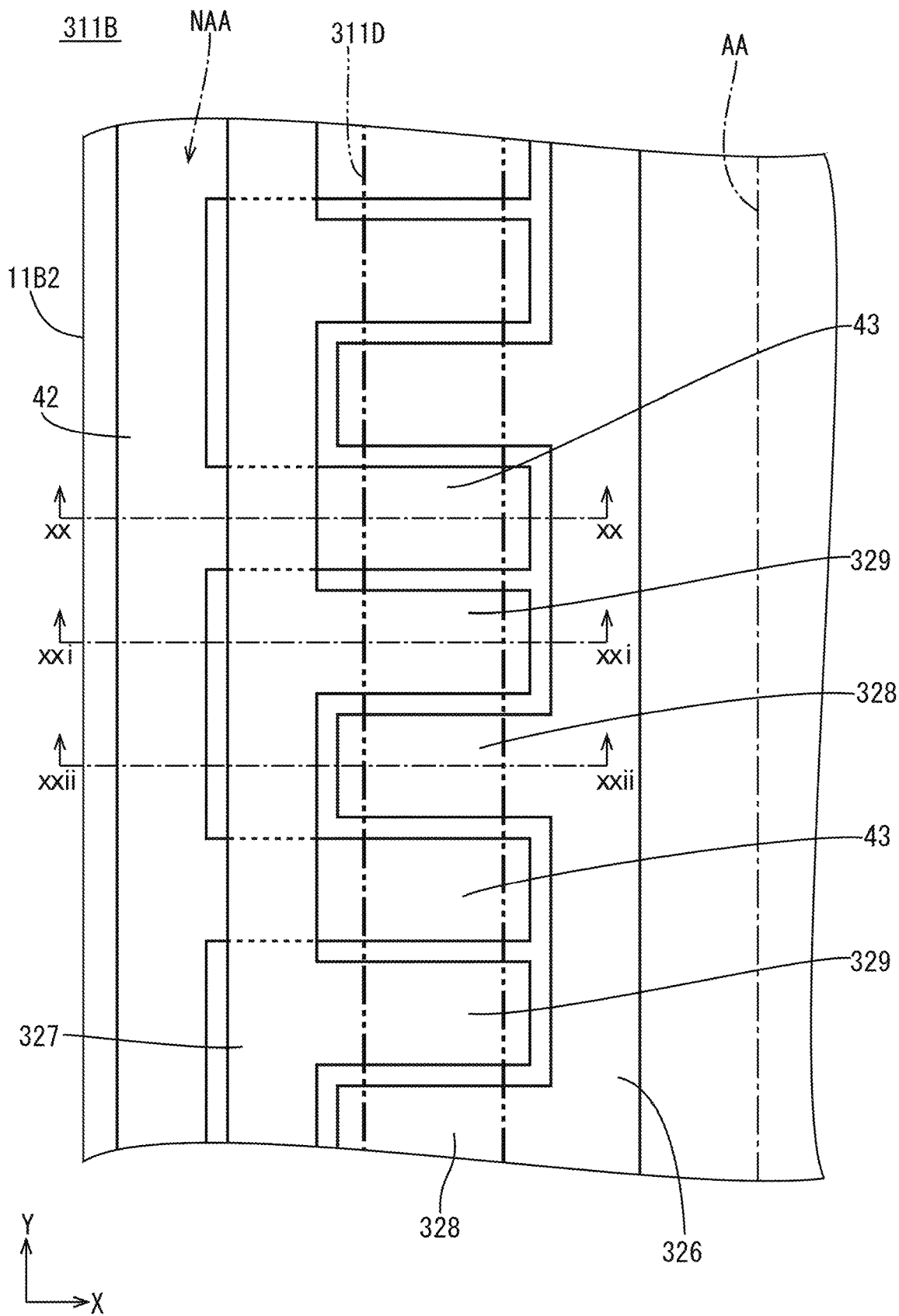
FIG. 18 is a magnified plan view illustrating an edge portion of an array substrate according to a fourth embodiment.

A configuration of an array substrate 311B in the non-display area NAA will be described with reference to FIGS. 18 and 20. As illustrated in FIG. 18, third lines 42 are disposed in the non-display area NAA of the array substrate 311B according to this embodiment. The third lines 42 are disposed such that second lines 327 are sandwiched between the third lines 42 and first lines 326 and the third lines 42 extend parallel to the first lines 326 and the second lines 327. The third lines 42 are disposed closer to edges (farther away from the display area AA) of the array substrate 311B than both of the first lines 326 and the second lines 327 are. The third lines 42 are away from the second lines 327, respectively. A distance between the third line 42 and the second line 327 is about constant over an entire length. The distance between the third line 42 and the second line 327 is smaller than a distance between the first line 326 and the second line 327. The third lines 42 enable a touch panel driving signal potential to be supplied to a third electrode. Four third lines 42 extend along four edges of the array substrate 311B similar to the first lines 326 and the second lines 327. Two of the four third lines 42 extend in the X-axis direction and other two of the four third lines 42 extend in the Y-axis direction. The four third lines 42 form a square frame (an endless ring) plan view shape as a whole that extends to surround the display area AA. The four third lines 42 are disposed such that end portions of the every adjacent two of the four third lines 42 overlap. The four third lines 42 extend parallel to a sealing member 311D. The third lines 42 are disposed not to overlap the sealing member 311D.

As illustrated in FIG. 18, fifth connection electrodes 43 project from the third lines 42 toward the first line 326 and the second line 327 (closer to the display area AA). The third lines 42 are electrically connected to the fifth connection electrodes 43. The fifth connection electrodes 43 are portions of the metal film portions of which are configured as the third lines 42 and are continuous to the third lines 42. Therefore, the fifth connection electrodes 43 are formed in the process of forming the third lines 42 in producing the array substrate 311B. The fifth connection electrodes 43 extend from the third line 42 along a direction (the X-axis direction in FIG. 18) that crosses the extending direction (the Y-axis direction in FIG. 18) in which the second line 327 extends. The fifth connection electrodes 43 are arranged at intervals in the extending direction of the second line 327. Each of the intervals between the fifth connection electrodes 43 is greater than a total of a width of the first connection electrode 328 and a width of the second connection electrode 329. The fifth connection electrodes 43, the first connection electrodes 328, and the second connection electrodes 329 are arranged in a line. Therefore, the fifth connection electrodes 43, the first connection electrodes 328, and the second connection electrodes 329 are disposed to overlap the sealing member 311D in a plan view. The fifth connection electrodes 43 are disposed such that the fifth connection electrode 43 is sandwiched between the first connection electrode 328 and the second connection electrode 329. Namely, in the non-display area NAA of the array substrate 311B, the first connection electrodes 328, the second connection electrodes 329, and the fifth connection electrodes 43 are arranged in a predefined order (the first connection electrode 328, the fifth connection electrode 43, the second connection electrode 329 are arranged in this order) repeatedly.

Figure 20:
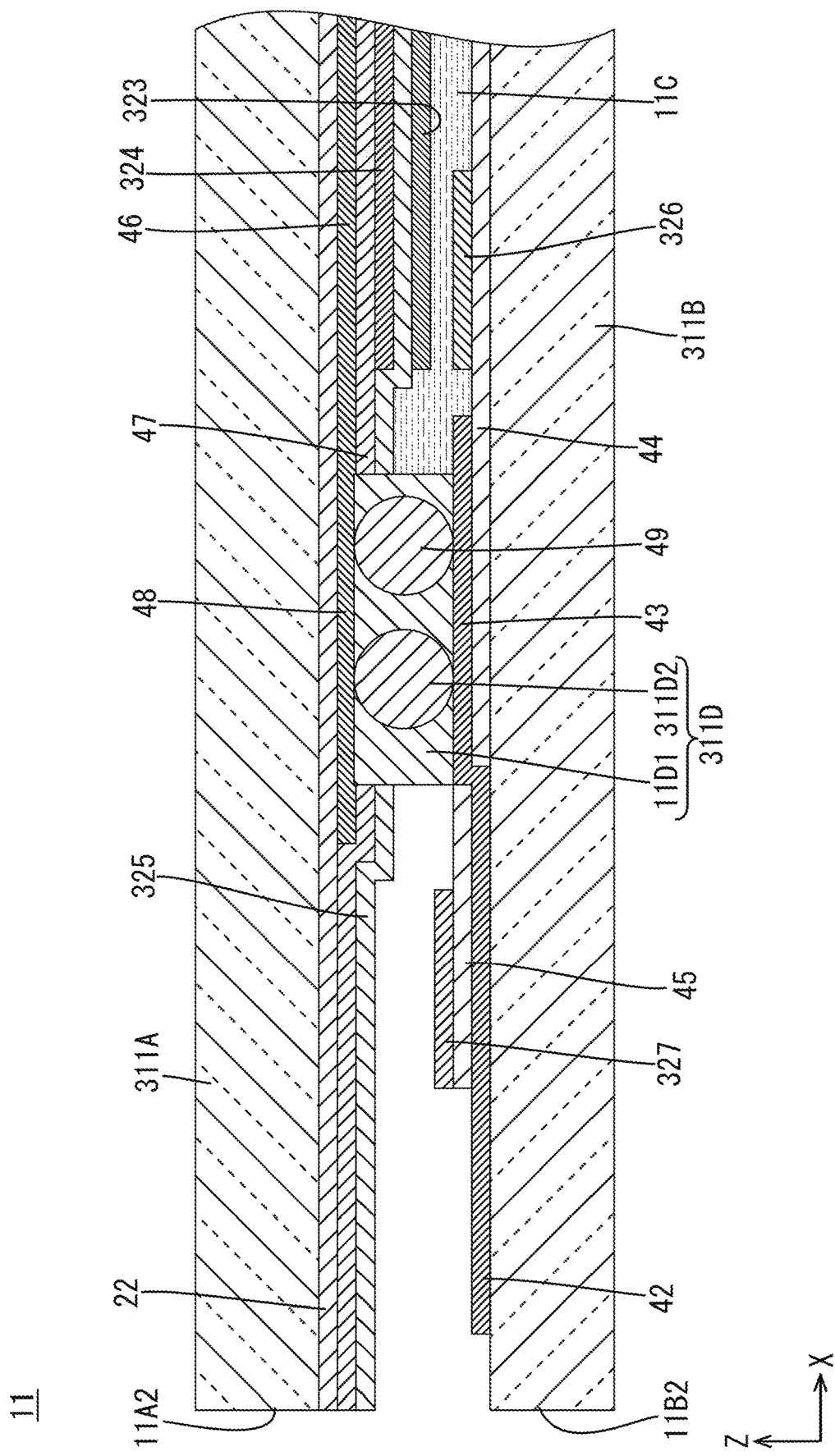
FIG. 20 is a cross-sectional view of the liquid crystal panel along line xx-xx in FIGS. 18 and 19.

As illustrated in FIG. 20, the third lines 42 and the fifth connection electrodes 43 are disposed in an upper layer than the first lines 326 and the second lines 327. The array substrate 311B includes a first insulation film 44 and a second insulation film 45. The first insulation film 44 is disposed in a lower layer than the first lines 326 and the second lines 327. The second insulation film 45 is disposed in a lower layer than the second lines 327 and disposed in an upper layer than the third lines 42. The fifth connection electrodes 43 include basal end-side portions that are continuous to the third lines 42. The second lines 327 cross the basal end-side sections of the fifth connection electrodes 43. The second insulation film 45 is disposed at least between the portions of the fifth connection electrodes 43 and the second lines 327 that are overlapped. This keeps insulation between the fifth connection electrodes 43 and the second lines 327.

Figure 19:
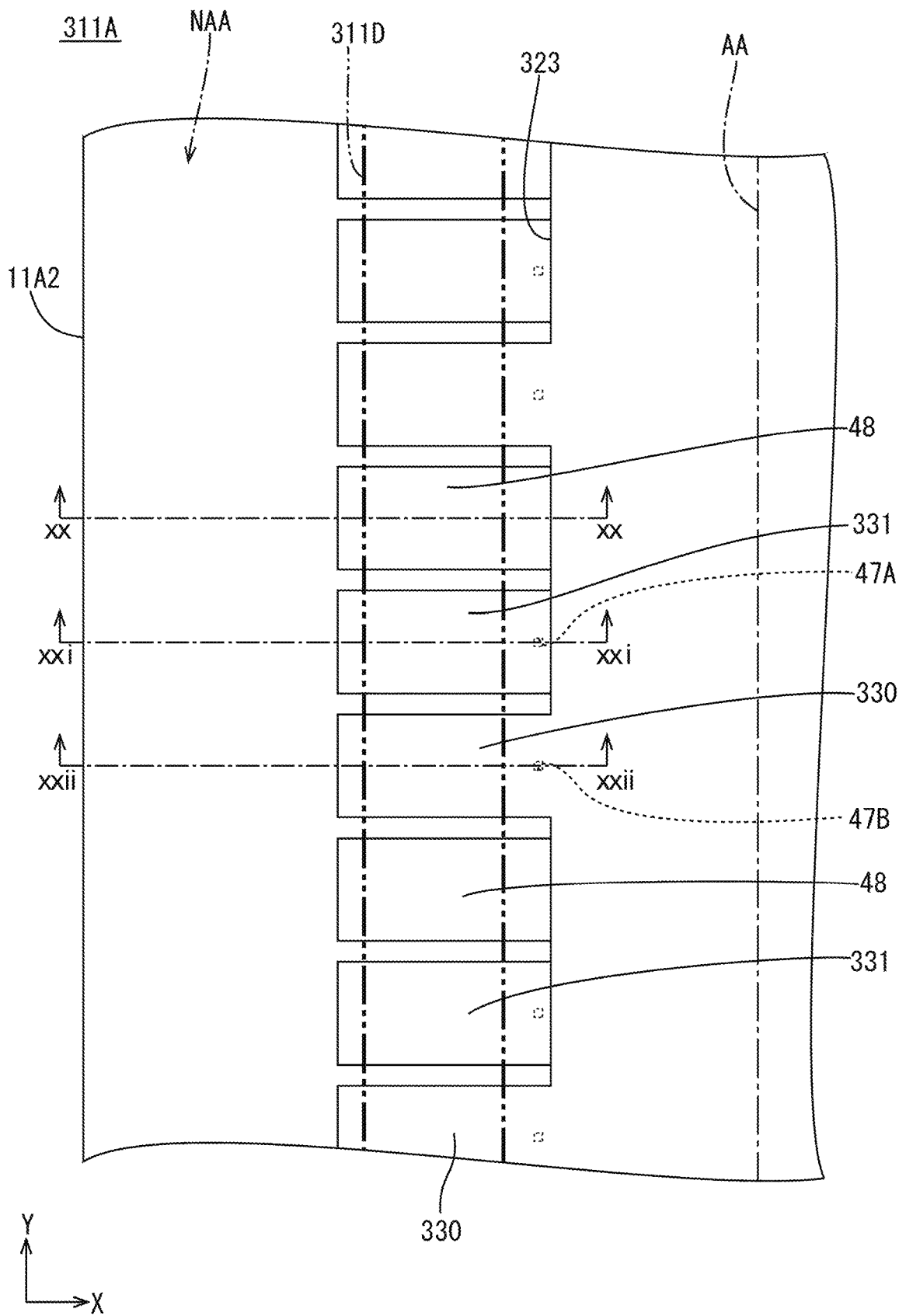
FIG. 19 is a magnified plan view illustrating an edge portion of an opposed substrate.

Next, a configuration of an opposed substrate 311A will be described with reference to FIGS. 19 and 20. As illustrated in FIGS. 19 and 20, the opposed substrate 311A of this embodiment includes a third electrode 46. The third electrode 46 is at least a portion of a touch panel electrode. The third electrode 46 is disposed in a solid manner in at least the display area AA to overlap a first electrode 323 and a second electrode 324 in a plan view. The third electrode 46 is disposed in the display area AA and the non-display area NAA and extends from the display area AA to the non-display area NAA similar to the first electrode 323 and the second electrode 324. Outer edges of the third electrode 46 are disposed on an inner side with respect to the sealing member 311D (closer to the display area AA than the sealing member 311D is). The third electrode 46 does not overlap the sealing member 311D. The third electrode 46 is formed by patterning a transparent electrode film (a lower layer transparent electrode film) that is made of transparent electrode material such as indium tin oxide (ITO) with the known photolithography method similar to the first electrode 323 and the second electrode 324. The third electrode 46 is supplied with a touch panel driving signal potential via the third lines 42. The third electrode 46 is disposed in a lower layer than the second electrode 324. The opposed substrate 311A includes a third insulation film 47 in a lower layer than the second electrode 324 and in an upper layer than the third electrode 46. The third electrode 46 is disposed in a lower layer than the third insulation film 47. The second electrode 324 is disposed in an upper layer than the third insulation film 47.

Next, a configuration of the opposed substrate 311A in the non-display area NAA will be described with reference to FIGS. 19 and 20. As illustrated in FIGS. 19 and 20, sixth connection electrodes 48 that are electrically connected to the third electrode 46 are disposed in the non-display area NAA of the opposed substrate 311A of this embodiment. The sixth connection electrodes 48 project from the edge of the third electrode 46 in a direction (the X-axis direction in FIG. 19) crossing a direction (the Y-axis direction in FIG. 19) along the edge of the third electrode 46. The sixth connection electrodes 48 are arranged at intervals in the direction along the edge of the third electrode 46 (the X-axis direction or the Y-axis direction). The sixth connection electrodes 48 are arranged along four edges of the third electrode 46. The sixth connection electrodes 48 are arranged along an entire periphery of the third electrode 46. Namely, the sixth connection electrodes 48 project from each of the four edges of the third electrode 46. As illustrated in FIG. 19, an interval between the sixth connection electrodes 48 is greater than a total of the width of a third connection electrode 330 and the width of a fourth connection electrode 331. The sixth connection electrodes 48, the third connection electrodes 330, and the fourth connection electrodes 331 are arranged in a line. Therefore, the sixth connection electrodes 48, the third connection electrodes 330, and the fourth connection electrodes 331 are disposed to overlap the sealing member 311D in a plan view. The sixth connection electrodes 48 are disposed such that the sixth connection electrode 48 is sandwiched between the third connection electrode 330 and the fourth connection electrode 331. Namely, in the non-display area NAA of the opposed substrate 311A, the third connection electrodes 330, the fourth connection electrodes 331, and the sixth connection electrodes 48 are arranged in a predefined order (the third connection electrode 330, the sixth connection electrode 48, the fourth connection electrode 331 are arranged in this order) repeatedly.

Next, relation between the fifth connection electrodes 43 and the sixth connection electrodes 48 will be described with reference to FIG. 20. As illustrated in FIG. 20, the sixth connection electrodes 48 are disposed to overlap the fifth connection electrodes 43, respectively. Namely, the sixth connection electrodes 48 are disposed to be opposite and spaced from the fifth connection electrodes 43, respectively, with respect to the Z-axis direction. The sixth connection electrodes 48 are disposed in a lower layer than the third insulation film 47 and disposed in the same layer as the third electrode 46. The sixth connection electrodes 48 are portions of the transparent electrode film a portion of which is configured as the third electrode 46. The portions of the transparent electrode film configured as the sixth connection electrodes 48 are different from the portion of the transparent electrode film configured as the third electrode 46. Therefore, the sixth connection electrodes 48 are formed in the process of forming the third electrode 46 in producing the opposed substrate 311A. The sixth connection electrodes 48 are disposed such that the end portions of the respective sixth connection electrodes 48 close to the display area AA are continuous to the end portion of the third electrode 46 included in the same layer as the sixth connection electrodes 48. Thus, the sixth connection electrodes 48 are electrically connected to the third electrode 46.

As illustrated in FIG. 20, some of electrically conductive particles 311D2 included in the sealing member 311D are disposed to overlap the fifth connection electrodes 43 and the sixth connection electrodes 48. The electrically conductive particles 311D2 that are disposed to overlap the fifth connection electrodes 43 and the sixth connection electrodes 48 are configured as third electrically conductive portions 49 that are contacted with the fifth connection electrodes 43 and the sixth connection electrodes 48. Thus, the fifth connection electrodes 43 and the sixth connection electrodes 48 are electrically connected to each other via the third electrically conductive portions 49. Thus, the third electrode 46 is provided with the touch panel driving signal potential from the fifth connection electrodes 43 that are continuous to each of the four third lines 42, which are disposed to surround an entire periphery of the third electrode 46, via the third electrically conductive portions 49 and the sixth connection electrodes 48. With such a configuration, the resistance distribution in the third electrode 46 is less likely to be irregular. Therefore, even if potential fluctuation is caused in the third electrode 46 due to the noise that is inputted from the sub liquid crystal panel 13, the potential of the third electrode 46 can be corrected to the predefined touch panel driving signal potential promptly. The third electrically conductive portions 49 that overlap the fifth connection electrodes 43 and the sixth connection electrodes 48 do not overlap the first electrode 323 and the second electrode 324. According to such a configuration, even with the number of portions (the fifth connection electrodes 43, the third electrically conductive portions 49, the sixth connection electrodes 48) that electrically connect the third lines 42 and the third electrode 46 being increased, a short circuit is less likely to be caused between the sixth connection electrodes 48 and the first electrode 323 with the third electrically conductive portions 49 or a short circuit is less likely to be caused between the sixth connection electrode 48 and the second electrode 324 with the third electrically conductive portions 49. This improves connection reliability. End portions of the sixth connection electrodes 48 that are opposite from the display area AA do not overlap the sealing member 311D but are covered with the third insulation film 47. The end portions of the sixth connection electrodes 48 that are on an outer side with respect to the sealing member 311D are protected by the third insulation film 47.

Figure 21:
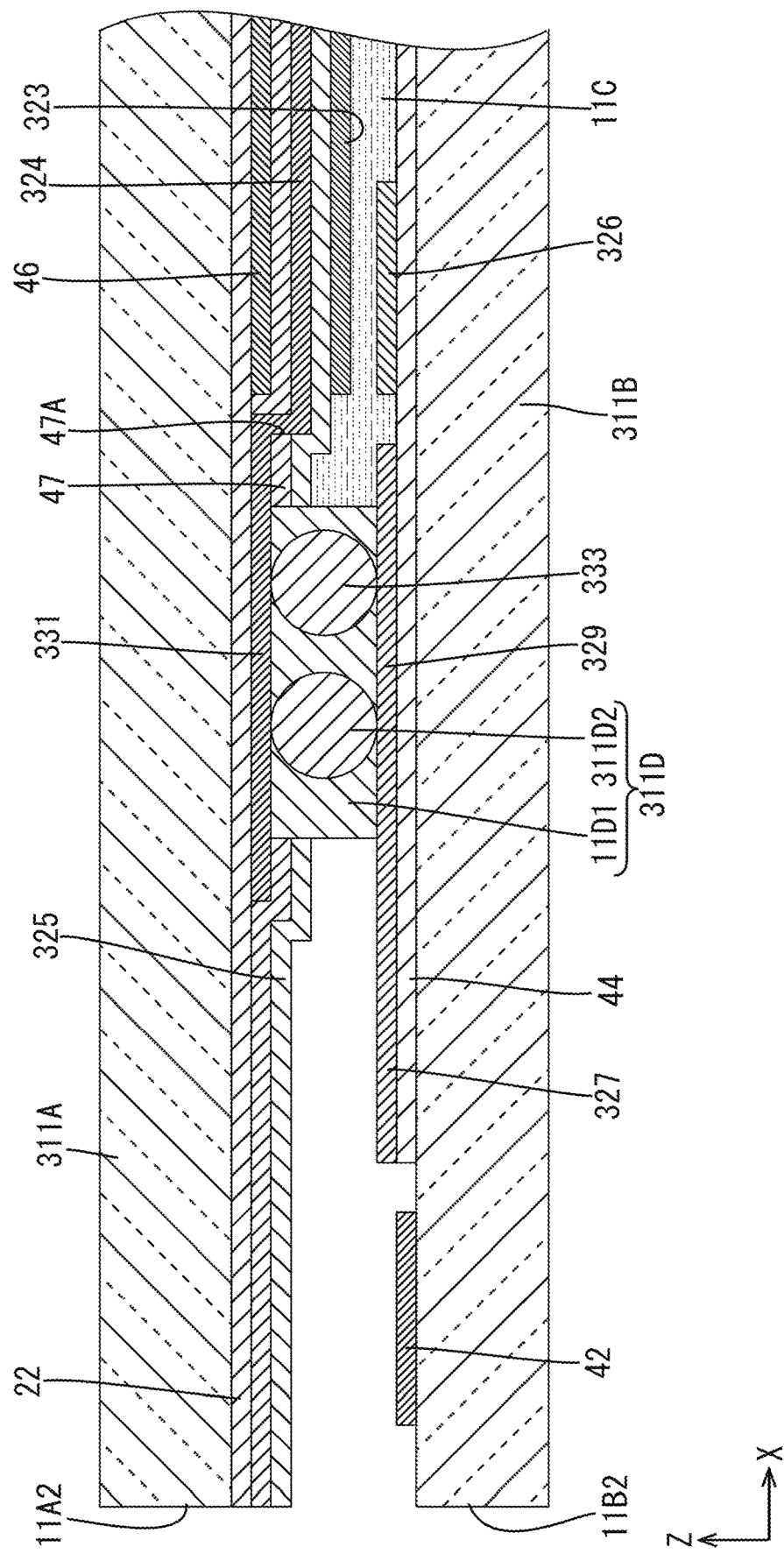
FIG. 21 is a cross-sectional view of the liquid crystal panel along line xxi-xxi in FIGS. 18 and 19.
Figure 22:
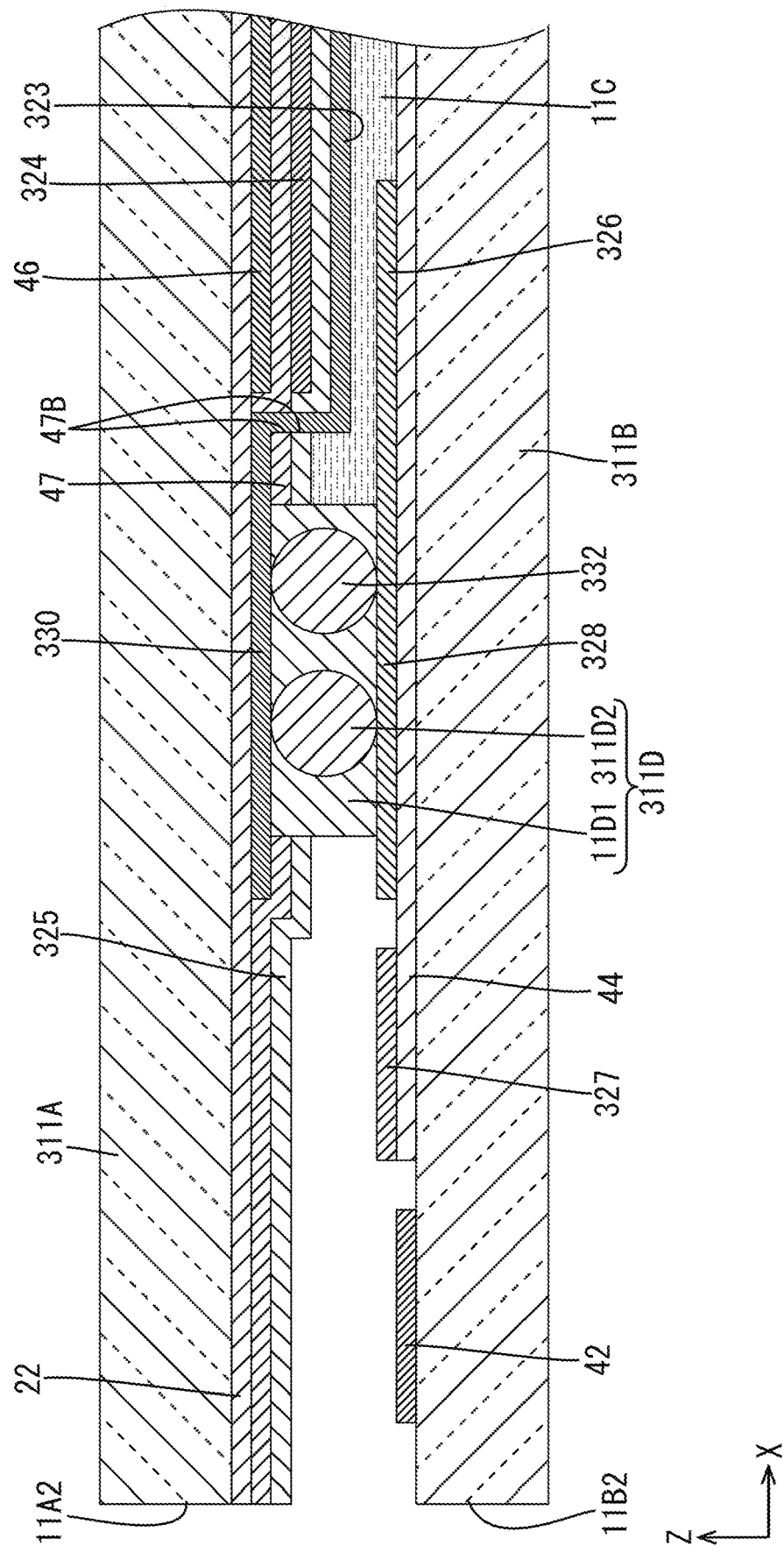
FIG. 22 is a cross-sectional view of the liquid crystal panel along line xxii-xxi in FIGS. 18 and 19.

Configurations of the third connection electrodes 330 and the fourth connection electrodes 331 will be described with reference to FIGS. 21 and 22. As illustrated in FIGS. 21 and 22, the third connection electrodes 330 and the fourth connection electrodes 331 according to this embodiment are disposed in a lower layer than the third insulation film 47. The third connection electrodes 330 and the fourth connection electrodes 331 are disposed in the same layer as the third electrode 46 and the sixth connection electrodes 48. The third connection electrodes 330 and the fourth connection electrodes 331 are separated from the third electrode 46 and the sixth connection electrodes 48 that are disposed in the same layer as the third connection electrodes 330 and the fourth connection electrodes 331. The third connection electrodes 330 and the fourth connection electrode 331 are portions of the transparent electrode film a portion of which is configured as the third electrode 46. The portions of the transparent electrode film configured as the third connection electrodes 330 and the fourth connection electrode 331 are different from the portions of the transparent electrode film configured as a third electrode 46 and the sixth connection electrodes 48. Therefore, the third connection electrodes 330 and the fourth connection electrode 331 are formed in the process of forming the third electrode 46 and the sixth connection electrodes 48 in producing the opposed substrate 311A.

As illustrated in FIG. 21, most portions of the fourth connection electrodes 331 do not overlap the second electrode 324 but portions of the fourth connection electrode 331 are disposed to overlap the second electrode 324 via the third insulation film 47. Specifically, end portions of the fourth connection electrodes 331 close to the display area AA overlap edge portions of the second electrode 324 via the third insulation film 47. The third insulation film 47 includes fifth contact holes 47A in portions that overlap overlapping portions of the second electrode 324 and the fourth connection electrodes 331. The second electrode 324 and the fourth connection electrodes 331 are electrically connected via the fifth contact holes 47A. The end portions of the fourth connection electrodes 331 close to the display area AA and the edge portions of the second electrode 324 are electrically connected via the fifth contact holes 47A in the third insulation film 47.

As illustrated in FIG. 22, most portions of the third connection electrodes 330 do not overlap the first electrode 323 but portions of the third connection electrodes 330 overlap the first electrode 323 via the insulation film 325 and the third insulation film 47. Specifically, end portions of the third connection electrodes 330 close to the display area AA overlap edge portions of the first electrode 323 via the insulation film 325 and the third insulation film 47. The insulation film 325 and the third insulation film 47 include sixth contact holes 47B in portions that overlap overlapping portions of the first electrode 323 and the third connection electrodes 330. The first electrode 323 and the third connection electrodes 330 are electrically connected via the sixth contact holes 47B. The sixth contact holes 47B extend through the insulation film 325 and the third insulation film 47. The end portions of the third connection electrodes 330 close to the display area AA and the edge portions of the first electrode 323 are electrically connected via the sixth contact holes 47B in the insulation film 325 and the third insulation film 47.

As illustrated in FIGS. 20 to 22, the third connection electrodes 330, the fourth connection electrodes 331, and the sixth connection electrodes 48 are disposed in the same layer as the third electrode 46. The third connection electrodes 330, the fourth connection electrodes 331, and the sixth connection electrodes 48 are disposed in the same layer. Therefore, a distance between the first connection electrodes 328 and the third connection electrodes 330 that are opposed to each other with respect to the Z-axis direction, a distance between the second connection electrodes 329 and the fourth connection electrodes 331 that are opposed to each other with respect to the Z-axis direction, and a distance between the fifth connection electrodes 43 and the sixth connection electrodes 48 that are opposed to each other with respect to the Z-axis direction are about same. With such a configuration, the first electrically conductive portions 332 that are disposed between the first connection electrodes 328 and the third connection electrodes 330, the second electrically conductive portions 333 that are disposed between the second connection electrodes 329 and the fourth connection electrodes 331, and the third electrically conductive portions 49 that are disposed between the fifth connection electrodes 43 and the sixth connection electrodes 48 are disposed at an about same height. The first electrically conductive portions 332, the second electrically conductive portions 333, and the third electrically conductive portions 49 are some of the electrically conductive particles 311D2 that are included in the sealing member 311D. With the sealing member 311D including the electrically conductive particles 311D2 having one particle size, the first electrically conductive portions 332, the second electrically conductive portions 333, and the third electrically conductive portions 49 can be provided. Therefore, a material cost can be reduced and connection reliability can be improved.

As previously described, according to this embodiment, the array substrate 311B includes the third lines 42 and the fifth connection electrodes 43. The third lines 42 are disposed such that the second lines 327 are sandwiched between the third lines 42 and the first lines 326 or the first lines 326 are sandwiched between the third lines 42 and the second lines 327. The third lines 42 extend in the extending direction parallel to the first lines 326 and the second lines 327. The fifth connection electrodes 43 project from the third lines 42 toward the first lines 326 and the second lines 327. The fifth connection electrodes 43, the first connection electrodes 328, and the second connection electrodes 329 are arranged at intervals with respect to the extending direction. The opposed substrate 311A includes the third electrode 46 and the sixth connection electrodes 48. The sixth connection electrodes 48 are electrically connected to the third electrode 46 and disposed to overlap the fifth connection electrodes 43, respectively. The sixth connection electrodes 48, the third connection electrodes 330, and the fourth connection electrodes 331 are arranged at intervals with respect to the extending direction. The third electrically conductive portions 49 are disposed between the array substrate 311B and the opposed substrate 311A to overlap the fifth connection electrodes 43 and the sixth connection electrodes 48. The third electrically conductive portions 49 are contacted with the fifth connection electrodes 43 and the sixth connection electrodes 48. The third electrode 46 is supplied with the potential of the third lines 42 via the fifth connection electrodes 43, the third electrically conductive portions 49, and the sixth connection electrodes 48. The fifth connection electrodes 43, the first connection electrodes 328, and the second connection electrodes 329 are arranged at intervals with respect to the extending direction of the second line 327. The sixth connection electrodes 48, the third connection electrodes 330, and the fourth connection electrodes 331 are arranged at intervals with respect to the extending direction of the second line 327. According to such a configuration, the first electrically conductive portions 332, which are disposed to overlap the first connection electrodes 328 and the third connection electrodes 330, are disposed not to overlap the second electrode 324 and the third electrode 46. The second electrically conductive portions 333, which are disposed to overlap the second connection electrodes 329 and the fourth connection electrodes 331, are disposed not to overlap the first electrode 323 and the third electrode 46. The third electrically conductive portions 49, which are disposed to overlap the fifth connection electrodes 43 and the sixth connection electrodes 48, are disposed not to overlap the first electrode 323 and the second electrode 324. Therefore, even with the number of the portions (the first connection electrodes 328, the first electrically conductive portions 332, the third connection electrodes 330) that electrically connect the first lines 326 and the first electrode 323, the number of the portions (the second connection electrodes 329, the second electrically conductive portions 333, and the fourth connection electrodes 331) that electrically connect the second lines 327 and the second electrode 324, and the number of the portions (the fifth connection electrodes 43, the third electrically conductive portions 49, the sixth connection electrodes 48) that electrically connect the third lines 42 and the third electrode 46 being increased, a short circuit is less likely to be caused between the third connection electrodes 330 and the second electrode 324 or the third electrode 46 with the first electrically conductive portions 332, and a short circuit is less likely to be caused between the fourth connection electrodes 331 and the first electrode 323 or the third electrode 46 with the second electrically conductive portions 333, and a short circuit is less likely to be caused between the sixth connection electrodes 48 and the first electrode 323 or the second electrode 324 with the third electrically conductive portions 49. This improves connection reliability. The resistance distribution in the first electrode 323, the second electrode 324, and the third electrode 46 is less likely to be irregular.

Fifth Embodiment

A fifth embodiment will be described with reference to FIGS. 23 to 31. The fifth embodiment includes a sub liquid crystal panel 413 (the liquid crystal panel, an electronic device) having a configuration different from that of the above embodiments. Configuration, operations, and effects similar to those of the first embodiment may not be described.

Figure 23:
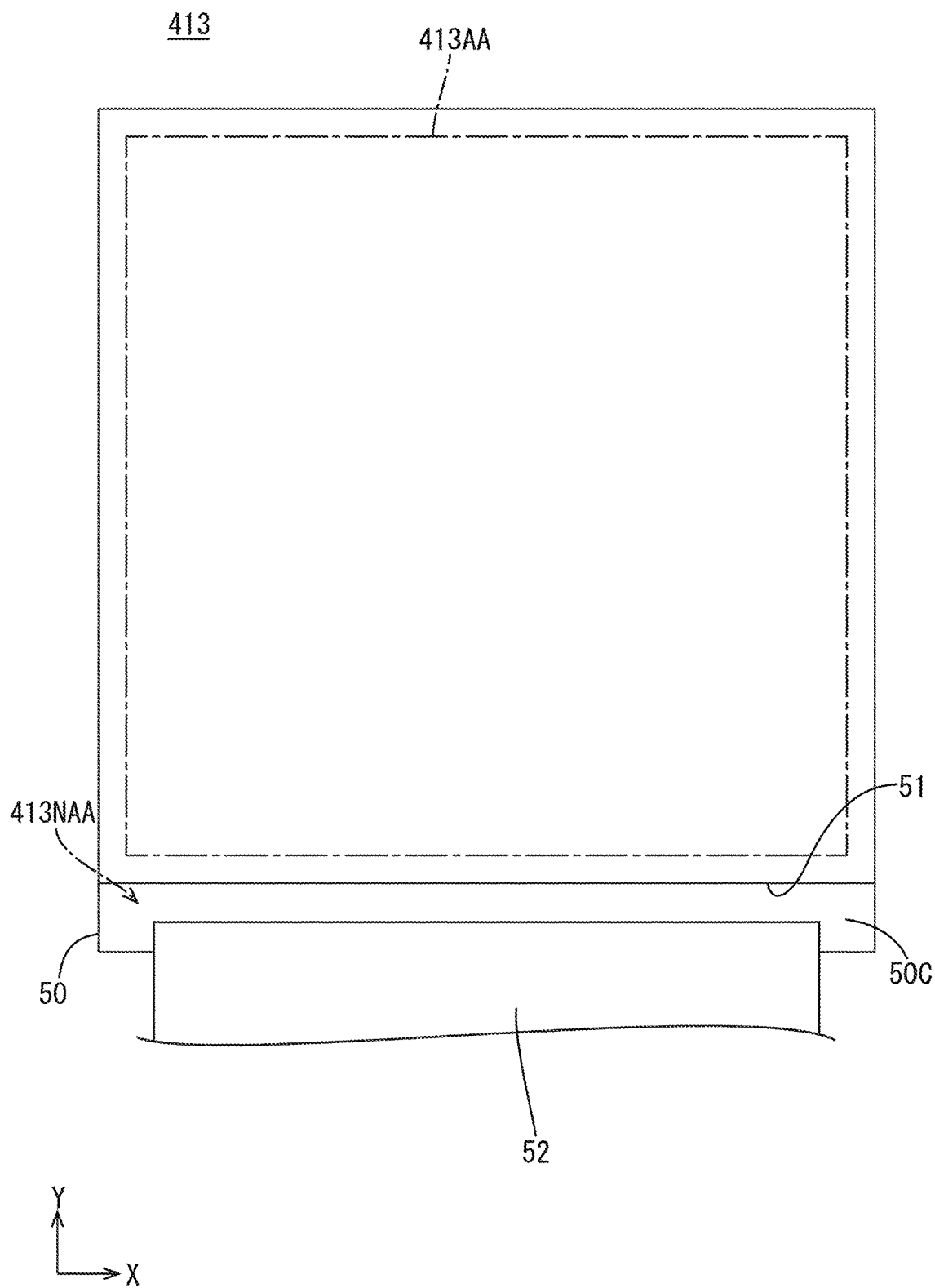
FIG. 23 is a plan view of a sub liquid crystal panel included in a liquid crystal display device according to a fifth embodiment.

As illustrated in FIG. 23, the sub liquid crystal panel 413 of this embodiment has a rectangular shape as a whole similar to that of the liquid crystal panel 11 (refer to FIG. 2). A middle section of a screen of the sub liquid crystal panel 413 is configured as an active area 413AA. The active area 413AA overlaps the display area AA of the liquid crystal panel 11. An outer section in a frame shape surrounding the active area 413AA in the screen of the sub liquid crystal panel 413 is configured as a non-active area 413NAA. The non-active area 413NAA has a rectangular frame shape. In FIG. 23, the active area 413AA is defined as an area surrounded by a dashed line. The sub liquid crystal panel 413 is disposed on the front side of the liquid crystal panel 11 and the liquid crystal panel 11 is sandwiched between the sub liquid crystal panel 413 and the backlight device 12 (refer to FIG. 1).

As illustrated in FIG. 23, the sub liquid crystal panel 413 includes a pair of substrates 50, 51 including substantially transparent glass substrates that are highly light transmissive. One of the substrates 50, 51 on the back side is a first substrate 50 and another one on the front side is a second substrate 51. The first substrate 50 and the second substrate 51 have a rectangular plan view shape. The first substrate 50 includes a pair of side edges 50A extending along the X-axis direction and a pair of side edges 50B extending along the Y-axis direction (refer to FIG. 25). The second substrate 51 includes a pair of side edges 51A extending along the X-axis direction and a pair of side edges 51B extending along the Y-axis direction (refer to FIG. 26). The first substrate 50 is greater in size than the second substrate 51 and a portion of the first substrate 50 projects laterally from the second substrate 51. A flexible circuit board 52 (a signal transmission member) is mounted on a projecting portion 50C of the first substrate 50. The flexible circuit board 52 includes a substrate that has insulating properties and flexibility and multiple traces of a wiring pattern that are formed on the substrate. A first end of the flexible circuit board 52 is connected to the first substrate 50 and a second end of the flexible circuit board 52 is connected to an external control circuit board (a signal source). The signals from the control circuit board are transmitted to the sub liquid crystal panel 413 via the flexible circuit board 52.

Figure 24:
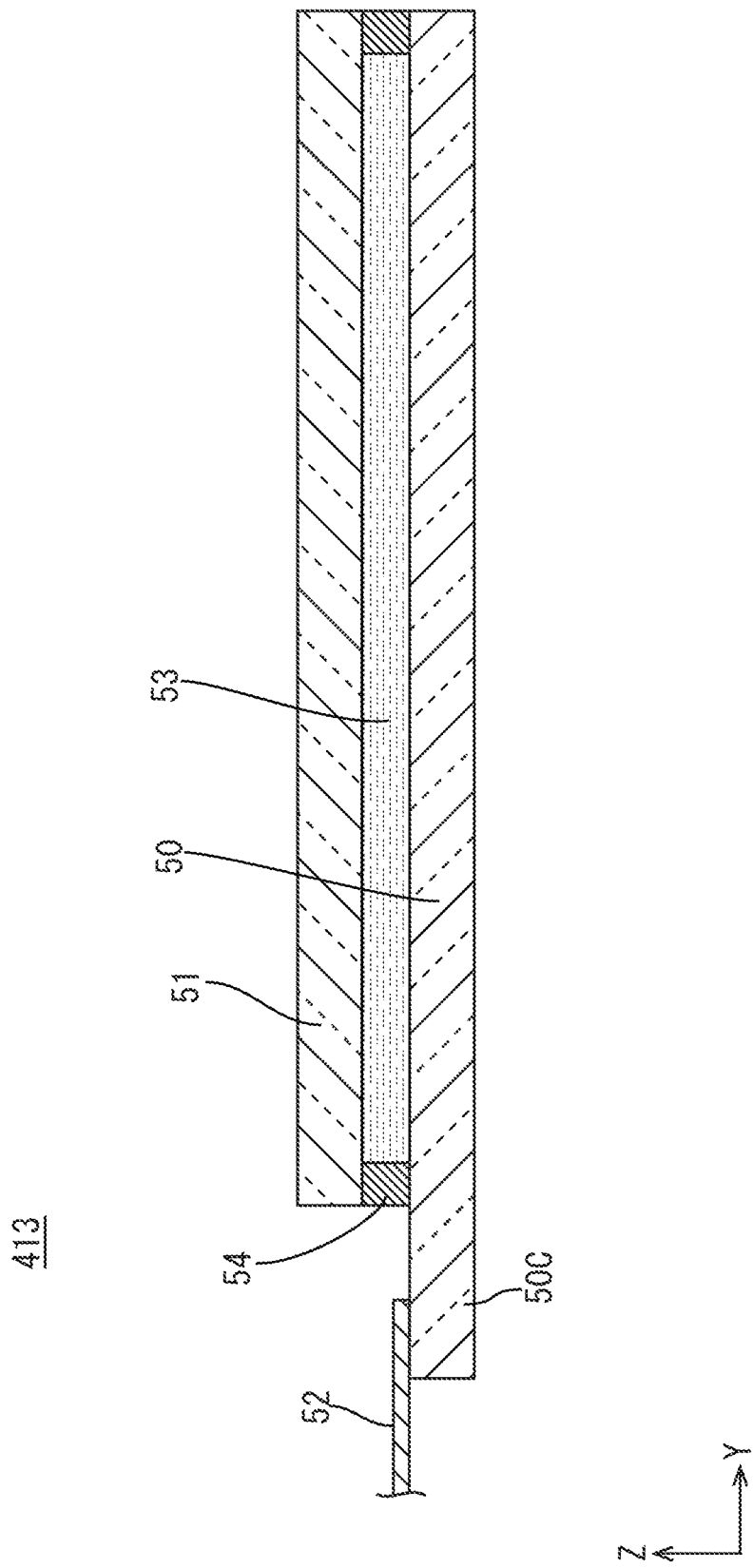
FIG. 24 is a schematic cross-sectional view of the sub liquid crystal panel.

Next, a cross-sectional configuration of the sub liquid crystal panel 413 will be described with reference to FIG. 24. As illustrated in FIG. 24, the two substrates 50, 51 are disposed opposite each other to have a distance in the Z-axis direction that is a normal direction to the plate surface of the substrates 50, 51. At least a liquid crystal layer 53 and a sealing member 54 are disposed between the two substrates 50, 51. The sealing member 54 seals the space between the substrates 50, 51 to keep the liquid crystal layer 53 therein. The liquid crystal layer 53 includes liquid crystal molecules having optical characteristics that vary according to application of electric field. The sealing member 54 is disposed near edges of the substrates 50, 51 and in the non-active area 413NAA. The sealing member 54 extends along an entire periphery of the substrate 50, 51. The sealing member 54 has a rectangular frame plan view shape (endless ring shape) as a whole and surrounds the liquid crystal layer 53 (the active area 413AA) and extends along the entire periphery. With the sealing member 54, a gap (a cell gap) corresponding to a thickness of the liquid crystal layer 53 is maintained at the edge portions of the substrates 50, 51.

The sub liquid crystal panel 413 includes a modulation pattern with which linear polarized light that exits the display area AA of the liquid crystal panel 11 is converted into circular polarized light. The sub liquid crystal panel 413 includes the modulation pattern in the active area 413AA. With the modulation pattern, the sub liquid crystal panel 413 is configured as a modulator. Specifically, by applying predefined voltage to the liquid crystal layer 53 having the modulation pattern, the sub liquid crystal panel 413 is configured to control the orientations of the liquid crystal molecules and the light polarization of light that passes through the liquid crystal layer 53 according to the voltage value. The polarization of the light passing through the sub liquid crystal panel 413 can be switched between right circularly polarization and left circularly polarization by driving the modulation pattern of the sub liquid crystal panel 413 in synchronization with switching between a right eye image and a left eye image that are alternately displayed on the liquid crystal panel 11. With wearing a pair of circularly polarization glasses that include two circularly polarizing films having reversed rotation directions on a left glass and a right glass, respectively, a user can see 3D images by seeing the light passing through the sub liquid crystal panel 413.

Figure 25:
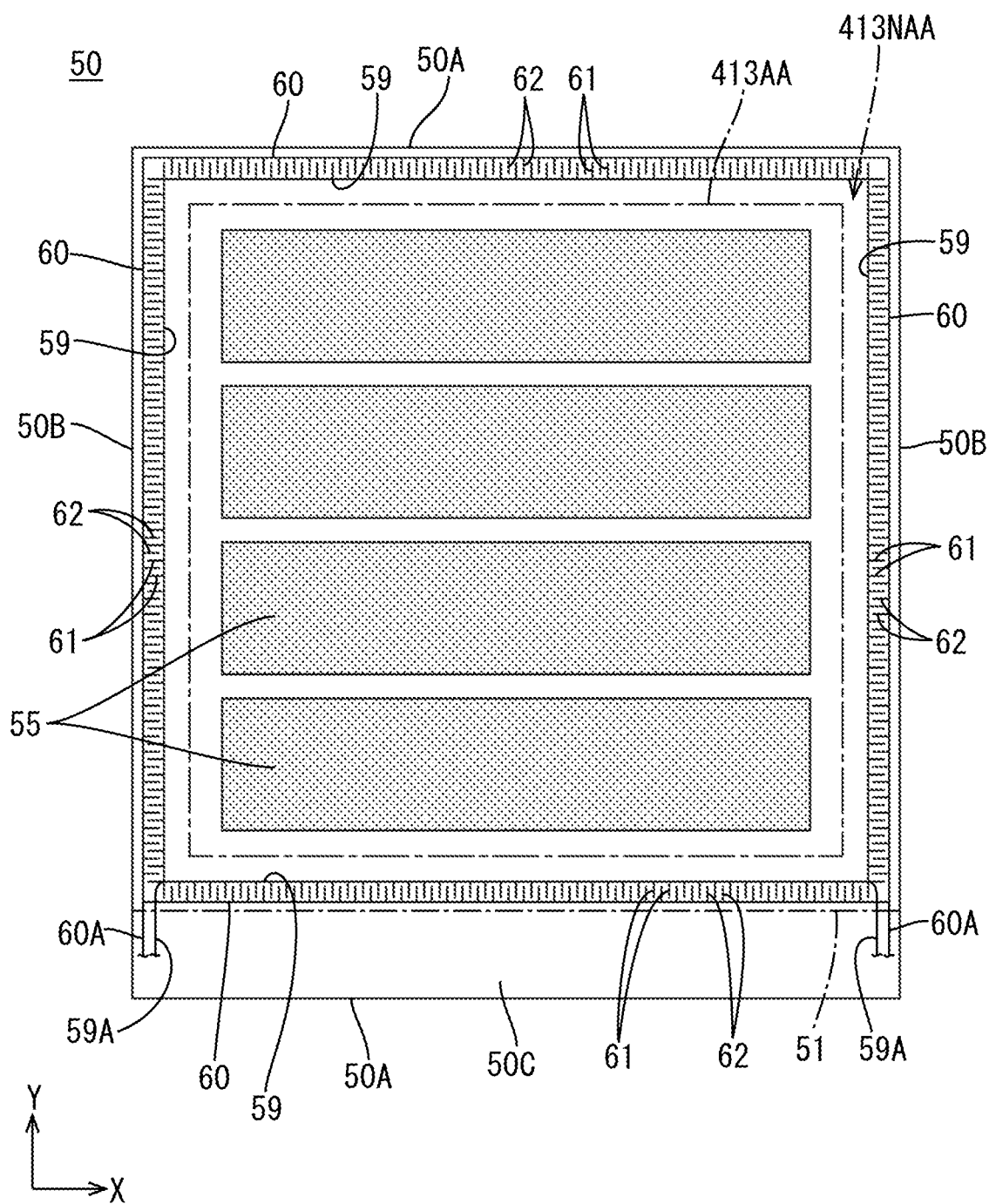
FIG. 25 is a plan view of a first substrate included in the sub liquid crystal panel.
Figure 26:
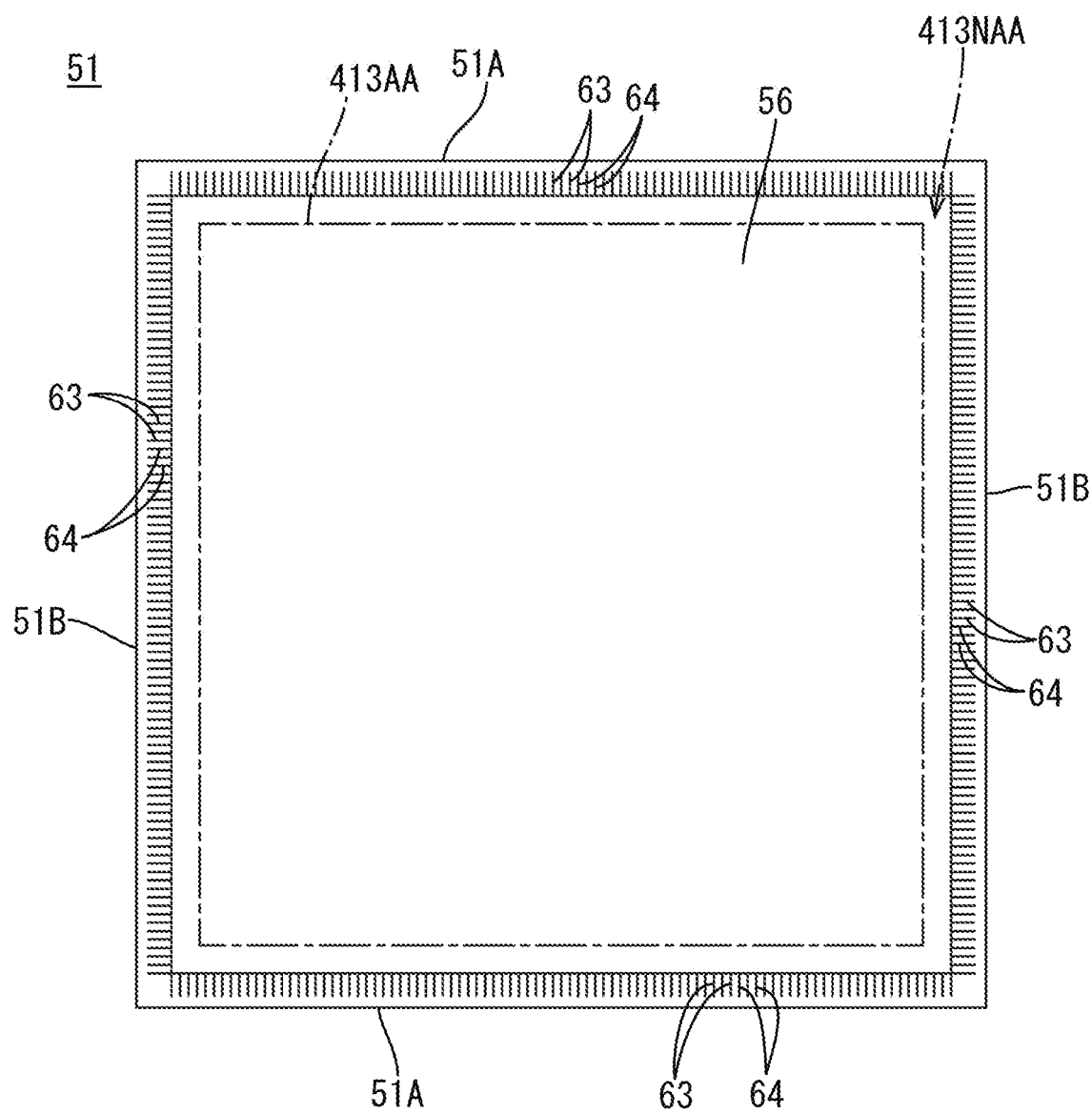
FIG. 26 is a plan view of a second substrate included in the sub liquid crystal panel.
Figure 27:
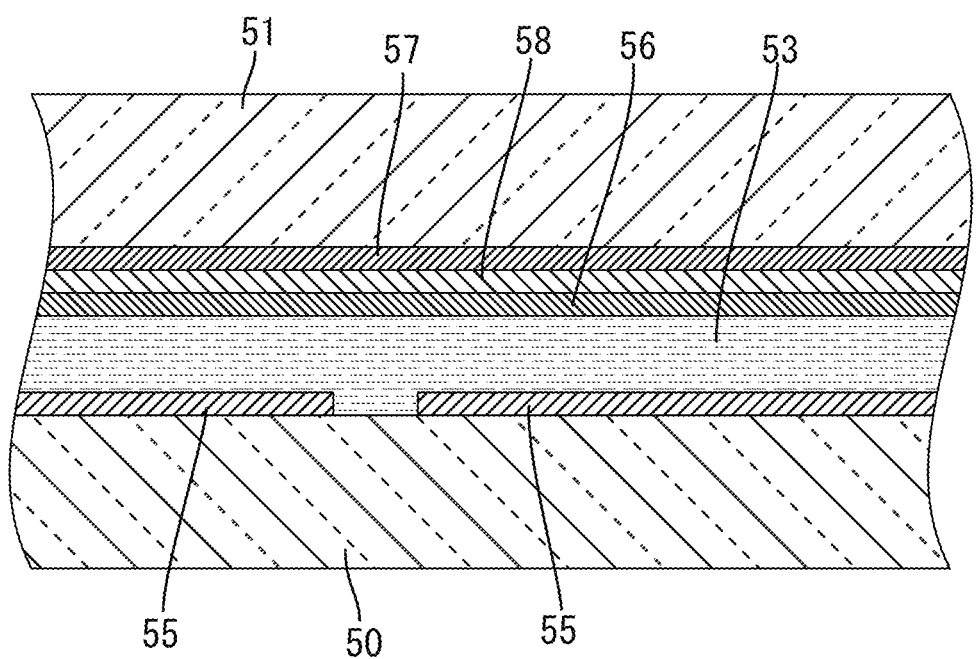
FIG. 27 is a cross-sectional view illustrating a configuration of an active area of the sub liquid crystal panel.

As illustrated in FIGS. 25 to 27, the modulation pattern includes segment electrodes 55 (fourth electrodes) included in the first substrate 50 and a first electrode 56 included in the second substrate 51. As illustrated in FIGS. 25 to 27, the segment electrodes 55 extend along the X-axis direction and have a belt shape (an elongated rectangular shape) having a constant width. The segment electrodes 55 are arranged at intervals along the Y-axis direction in the active area 413AA of the first substrate 50. The four segment electrodes 55 are arranged in FIG. 25; however, the specific number of the segment electrodes 55 may be altered other than four as appropriate. The segment electrodes 55 are formed by patterning a transparent electrode film made of transparent electrode material such as indium tin oxide (ITO) with the known photolithography method. The segment electrodes 55 are supplied with a predefined potential via the flexible circuit board 52.

As illustrated in FIGS. 26 and 27, the first electrode 56 is disposed in a solid manner in the active area 413AA of the second substrate 51. The first electrode 56 is opposite all the segment electrodes 55 via the liquid crystal layer 53. The first electrode 56 is supplied with a common potential (a reference potential) via the flexible circuit board 52. The common potential is constant and 0V, for example. The common potential may not be 0V and may be changed to be opposite polarities at a certain cycle. The first electrode 56 is formed by patterning the transparent electrode film made of transparent electrode material such as indium tin oxide (ITO) with the known photolithography method similar to the segment electrodes 55. This keeps high light transmittance in the active area 413AA of the sub liquid crystal panel 413 and the light that passes through the display area AA of the liquid crystal panel 11 can pass through the active area 413AA of the sub liquid crystal panel 413 with a low loss.

The modulation pattern of the sub liquid crystal panel 413 is driven based on the signal that is supplied via the flexible circuit board 52. With the segment electrode 55 being supplied with a potential that is different from the common potential, a potential difference occurs between the segment electrode 55 and the first electrode 56. With an electric filed based on the potential difference being applied to the liquid crystal layer 53, orientations of the liquid crystal molecules are varied. Polarization of the light transmitting through the liquid crystal layer 53 are varied according to the orientations of the liquid crystal molecules. Thus, polarization of the light transmitting through the liquid crystal layer 53 can be controlled based on the signals supplied to the segment electrodes 55. The signals supplied to the segment electrodes 55 may be determined as appropriate. For example, different signals can be supplied to an odd-numbered segment electrode 55 and an even-numbered segment electrode 55 numbered from one end with respect to the Y-axis direction in the active area 413AA of the first substrate 50. In such a configuration, for example, in the display area AA of the liquid crystal panel 11, the pixels overlapping the odd-numbered segment electrodes 55 are controlled to display a right eye image and the pixels overlapping the even-numbered segment electrodes 55 are controlled to display a left eye image. Accordingly, polarization of the light for displaying the right eye image is changed based on the signals (signals for the right eye image) supplied to the odd-numbered segment electrodes 55 when passing through the liquid crystal layer 53, and polarization of the light for displaying the left eye image is changed based on the signals (signals for the left eye image) supplied to the even-numbered segment electrodes 55 when passing through the liquid crystal layer 53. A user wearing the pair of circularly polarization glasses can see a 3D image by seeing the light that passes through the sub liquid crystal panel 413 in which the polarization is controlled as described above. Other than the above-described configuration, the same signals may be supplied to all the segment electrodes 55 at the same timing. Specifically, all the pixels are controlled to display the right eye image at a first timing and all the pixels are controlled to display the left eye image at a second timing that is different from the first timing. At the first timing when all the pixels in the display area AA of the liquid crystal panel 11 are controlled to display the right eye image, the signals for the right eye image are supplied to all the segment electrodes 55. At the second timing when all the pixels in the display area AA of the liquid crystal panel 11 are controlled to display the left eye image, the signals for the left eye image are supplied to all the segment electrodes 55. Accordingly, polarization of the light for displaying the right eye image is changed based on the signals for the right eye image supplied to all the segment electrodes 55 when passing through the liquid crystal layer 53. Polarization of the light for displaying the left eye image is changed based on the signals for the left eye image supplied to all the segment electrodes 55 when passing through the liquid crystal layer 53. A user wearing the pair of circularly polarization glasses can see a 3D image by seeing the light that passes through the sub liquid crystal panel 413 in which the polarization is controlled as described above.

As previously described, signals are inputted to the segment electrodes 55 included in the sub liquid crystal panel 413 at a high speed in synchronization with the display on the liquid crystal panel 11, great noise is inputted to the first electrode 56. Due to such noise, potential fluctuation may be caused in the first electrode 56 of the second substrate 51. If potential fluctuation is caused in the first electrode 56, a potential difference created between the first electrode 56 and the segment electrodes 55 may be changed and polarization of the light passing through the liquid crystal layer 53 may not be controlled appropriately. This may deteriorate display quality.

As illustrated in FIG. 27, the second substrate 51 of this embodiment includes a second electrode 57 (an electrostatic capacitance electrode) for suppressing potential fluctuations caused in the first electrode 56 due to noise. The second electrode 57 is disposed in a solid manner at least in the active area 413AA to overlap the first electrode 56 in a plan view. The second electrode 57 is formed by patterning a transparent electrode film made of transparent electrode material such as indium tin oxide (ITO) similar to the segment electrodes 55 and the first electrode 56. The second electrode 57 is supplied with a ground potential (which is constant and 0V, for example). The second substrate 51 includes an insulation film 58 that is disposed between the first electrode 56 and the second electrode 57 with respect to the Z-axis direction. Therefore, an electrostatic capacitance is created between the first electrode 56 and the second electrode 57. According to such a configuration, even with signals being inputted to the segment electrodes 55 at a high speed and noise being caused, potential fluctuation is less likely to be caused in the first electrode 56 due to such noise. This stabilizes a potential difference created between the first electrode 56 and the segment electrodes 55 and polarization of the light passing through the liquid crystal layer 53 may be controlled appropriately. As a result, good display quality can be obtained. The first electrode 56 is disposed in an upper layer (closer to the liquid crystal layer 53 or the first substrate 50) than the insulation film 58. Namely, the first electrode 56 is disposed in an upper layer than the second electrode 57 via the insulation film 58. Therefore, an electric field created between the first electrode 56 and the segment electrode 55 is less likely to be blocked by the second electrode 57.

Next, a configuration of the first substrate 50 in the non-active area 413NAA will be described with reference to FIGS. 25 and 28. As illustrated in FIG. 25, the first substrate 50 includes first lines 59 and second lines 60 in the non-active area 413NAA. The first lines 59 are for supplying a common potential to the first electrode 56 and the second lines 60 are for supplying a ground potential to the second electrode 57. The first lines 59 and the second lines 60 are formed by patterning metal films with the known photolithography method. The first lines 59 and the second lines 60 may be portions of a same metal film but may be portions of different metal films. The first lines 59 and the second lines 60 are disposed in portions of the non-active area 413NAA of the first substrate 50 overlapping the second substrate 51. The first lines 59 and the second lines 60 are disposed in portions of the non-active area 413NAA of the first substrate 50 that are between the active area 413AA and each of the side edges 50A, 50B of the first substrate 50. One of the first lines 59 and one of the second lines 60 are disposed at a distance and parallel to each other. Four first lines 59 and four second lines 60 are disposed to extend along four edges of the first substrate 50, respectively. The four edges include two edges 50A and two edges 50B. Two of the four first lines 59 extend along the X-axis direction and other two of the four first lines 59 extend along the Y-axis direction. Two of the four second lines 60 extend along the X-axis direction and other two of the four second lines 60 extend along the Y-axis direction. The four first lines 59 are disposed such that end portions of the every adjacent two of the four first lines 59 overlap. The four first lines 59 form a square frame (an endless ring) plan view shape as a whole that extends to surround the active area 413AA. The four second lines 60 are disposed such that end portions of the every adjacent two of the four second lines 60 overlap. The four second lines 60 form a square frame (an endless ring) plan view shape as a whole that extends to surround the active area 413AA. The segment electrodes 55 are surrounded by the four first lines 59 and also surrounded by the four second lines 60. The four first lines 59 and the four second lines 60 extend along the sealing member 54. The first lines 59 are disposed closer to the active area 413AA (closer to the segment electrodes 55, on an inner side) than the second lines 60 are. The second lines 60 are disposed farther away from the active area 413AA (on an outer side) than the first lines 59 are.

Figure 28:
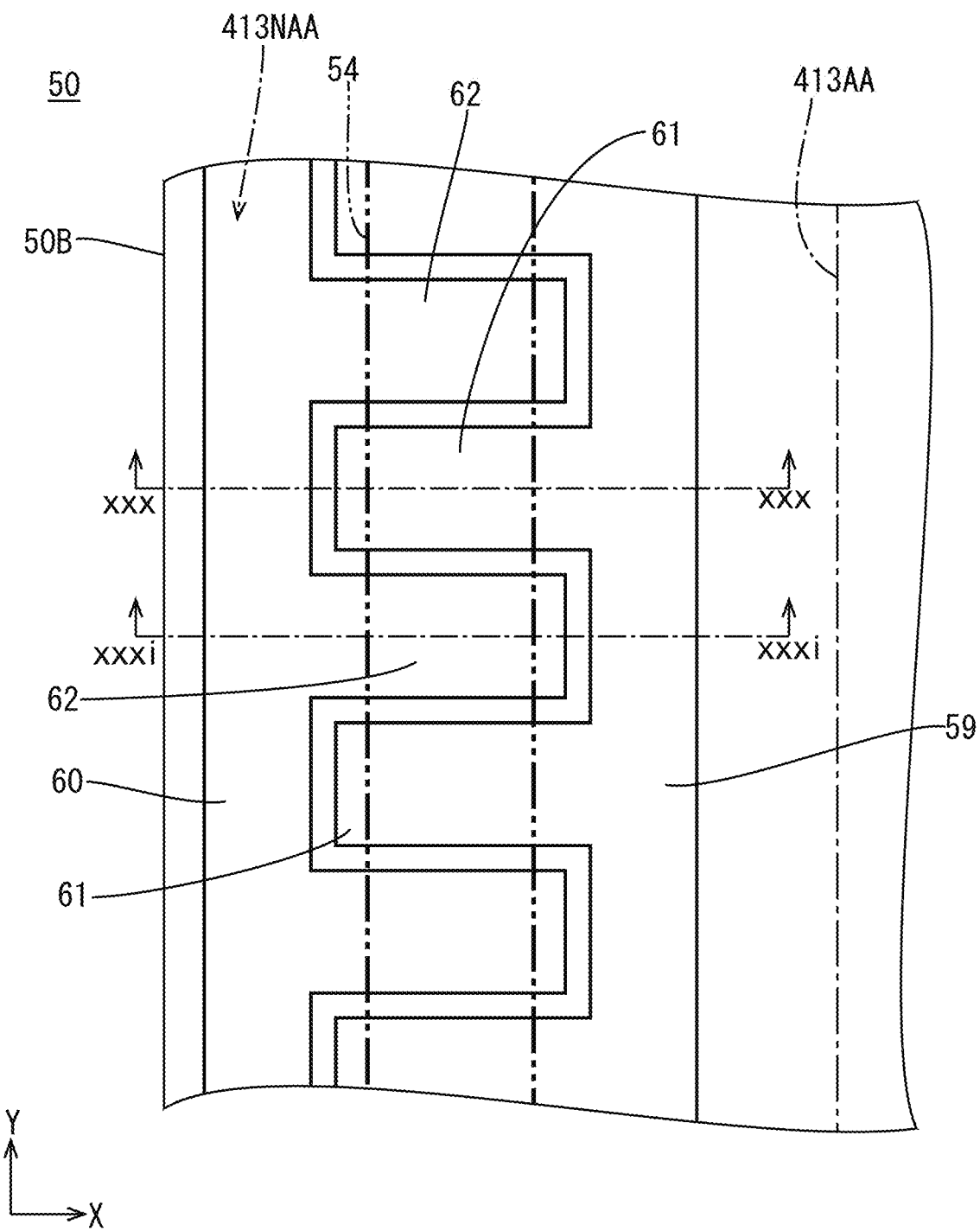
FIG. 28 is a magnified plan view illustrating an edge portion of the first substrate.

As illustrated in FIG. 28, the first lines 59 and the second lines 60 are disposed not to overlap the sealing member 54. The sealing member 54 is indicated by two-dot chain lines in FIG. 28. The first lines 59 are away from the second lines 60, respectively, and a distance between the first line 59 and the second line 60 is greater than a width of the sealing member 54. The distance between the first line 59 and the second line 60 is constant over an entire length. The first lines 59 are disposed away from the sealing member 54 and closer to the active area 413AA than the sealing member 54 is. The second lines 60 are disposed away from the sealing member 54 and farther away from the active area 413AA (closer to the edges 50A, 50B of the first substrate 50) than the sealing member 54 is. The first line 59 is electrically connected to first connection electrodes 61 that protrude toward the second line 60 (to be away from the active area 413AA). The first connection electrodes 61 are portions of the metal film portions of which are configured as the first lines 59 and are continuous to the first lines 59. Therefore, the first connection electrodes 61 are be formed in the process of forming the first lines 59 in producing the first substrate 50. The first connection electrodes 61 extend from the first line 59 along a direction (the X-axis direction in FIG. 28) that crosses the extending direction (the Y-axis direction in FIG. 28) in which the first line 59 extends. The first connection electrodes 61 are arranged at intervals along the extending direction of the first line 59. Each of the intervals between the first connection electrodes 61 is greater than a width of a second connection electrode 62. The second line 60 is electrically connected to the second connection electrodes 62 that protrude toward the first line 59 (to be closer to the active area 413AA). Thus, the first connection electrodes 61 and the second connection electrodes 62 are disposed between the first line 59 and the second line 60. This saves spaces for the connection electrodes and a frame width of the sub liquid crystal panel 413 is preferably decreased. The second connection electrodes 62 are portions of the metal film portions of which are configured as the second lines 60 and are continuous to the second lines 60. Therefore, the second connection electrodes 62 are formed in the process of forming the second lines 60 in producing the first substrate 50. The second connection electrodes 62 extend from the second line 60 along a direction that crosses the extending direction in which the second line 60 extends. The second connection electrodes 62 are arranged at intervals along the extending direction of the second line 60. Each of the intervals between the second connection electrodes 62 is greater than a width of a first connection electrode 61. The first connection electrodes 61 and the second connection electrodes 62 are disposed in an area (a space) between the first line 59 and the second line 60. The first connection electrodes 61 and the second connection electrodes 62 are arranged along the extending direction of the first line 59 and the second line 60. The first connection electrodes 61 and the second connection electrodes 62 are arranged alternately in the extending direction of the first line 59 and the second line 60. The first connection electrodes 61 and the second connection electrodes 62 are disposed to overlap the sealing member 54 in a plan view.

As illustrated in FIG. 25, extending lines 59A, 60A extend from the first lines 59 and the second lines 60, respectively, and are disposed on the projecting portion 50C of the first substrate 50. The projecting portion 50C is a portion of the first substrate 50 that does not overlap the second substrate 51. At least a pair of the extending line 59A and the extending line 60A extends to the mounting area for the flexible circuit board 52 and is connected to at least a pair of terminals mounted on the mounting area. The terminals are supplied with a common potential or a ground potential via the flexible circuit board 52.

Next, a configuration of the second substrate 51 in the non-active area 413NAA will be described with reference to FIGS. 26 and 29. As illustrated in FIG. 26, third connection electrodes 63 that are electrically connected to the first electrode 56 and the fourth connection electrodes 64 that are electrically connected to the second electrode 57 are disposed in the non-active area 413NAA of the second substrate 51. The first electrode 56 and the second electrode 57 have a square plan view shape and are greater in size than the active area 413AA. The first electrode 56 overlaps the active area 413AA and a middle section of the first electrode 56 corresponds to an entire area of the active area 413AA and an outer peripheral section of the first electrode 56 corresponds to the non-active area 413NAA. Similar to the first electrode 56, the second electrode 57 overlaps the active area 413AA and a middle section of the second electrode 57 corresponds to the entire area of the active area 413AA and an outer peripheral section of the second electrode 57 corresponds to the non-active area 413NAA. Namely, the first electrode 56 and the second electrode 57 are disposed in the active area 413AA and the non-active area 413NAA.

As illustrated in FIG. 26, the third connection electrodes 63 are disposed between the first electrode 56 and each of the edges 51A, 51B of the second substrate 51 in the non-active area 413NAA of the second substrate 51. The third connection electrodes 63 are electrically connected to edge portions of the first electrode 56. The third connection electrodes 63 protrude outwardly from the edges of the first electrode 56. The third connection electrodes 63 are arranged at intervals in a direction (the X-axis direction or the Y-axis direction) along the edge of the first electrode 56. The third connection electrodes 63 are arranged along an entire peripheral edge portion that includes four edge portions of the first electrode 56. The third connection electrodes 63 are arranged corresponding to each of the four edge portions that are configured as the peripheral edge portion of the first electrode 56. The fourth connection electrodes 64 are disposed between the second electrode 57 and each of the edges 51A, 51B of the second substrate 51 in the non-active area 413NAA of the second substrate 51. The fourth connection electrodes 64 are electrically connected to edge portions of the second electrode 57. The fourth connection electrodes 64 project outwardly from the edges of the second electrode 57. The fourth connection electrodes 64 are arranged at intervals in a direction along the edge of the second electrode 57. The fourth connection electrodes 64 are arranged along an entire peripheral edge portion that includes four edge portions of the second electrode 57. The fourth connection electrodes 64 are arranged corresponding to each of the four edge portions, which are configured as the peripheral edge portion of the second electrode 57.

Figure 29:
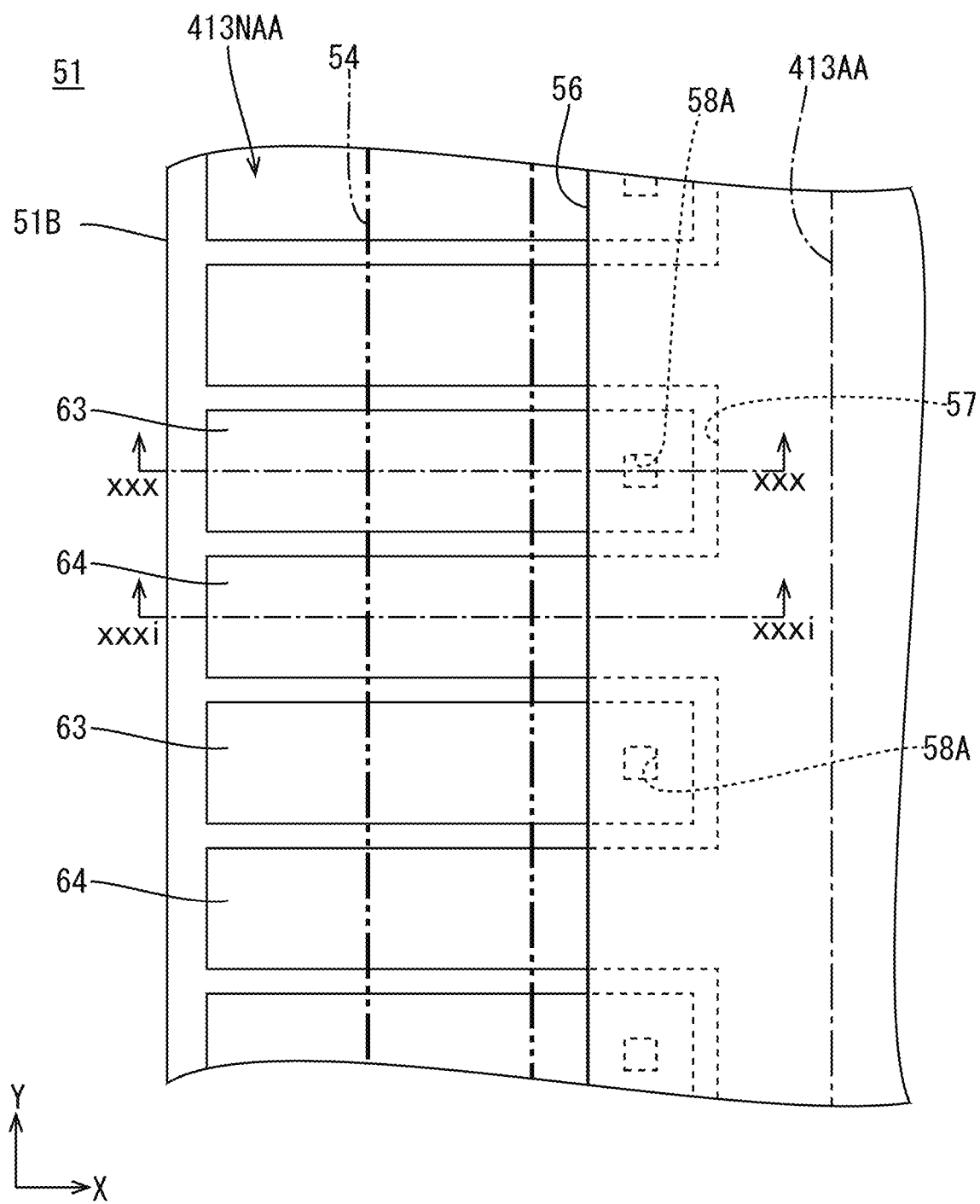
FIG. 29 is a magnified plan view illustrating an edge portion of the second substrate.

As illustrated in FIG. 29, the edges of the first electrode 56 and the second electrode 57 are disposed on an inner side with respect to the sealing member 54 (closer to the active area 413AA than the sealing member 54 is) and do not overlap the sealing member 54. The sealing member 54 is indicated by two-dot chain lines in FIG. 29. The third connection electrodes 63 extend along a direction (the X-axis direction in FIG. 29) that crosses a direction (the Y-axis direction in FIG. 29) along the edge of the first electrode 56. The third connection electrodes 63 are arranged at intervals in the direction along the edge of the first electrode 56. Each of the intervals between the third connection electrodes 63 is greater than a width of the fourth connection electrode 64. The fourth connection electrodes 64 extend from the second electrode 57 in a direction (the X-axis direction in FIG. 29) that crosses a direction (the Y-axis direction in FIG. 29) along the edge of the second electrode 57. The fourth connection electrodes 64 are arranged at intervals in the direction along the edge of the second electrode 57. Each of the intervals between the fourth connection electrodes 64 is greater than a width of the third connection electrode 63. The third connection electrodes 63 and the fourth connection electrodes 64 are arranged along the edges of the first electrode 56 and the second electrode 57. The third connection electrodes 63 and the fourth connection electrodes 64 are arranged alternately in the direction along the edges of the first electrode 56 and the second electrode 57. The third connection electrodes 63 and the fourth connection electrodes 64 are disposed to overlap the sealing member 54 in a plan view.

Next, relation between the first connection electrodes 61 and the third connection electrodes 63 will be described with reference to FIG. 30. The third connection electrodes 63 are disposed to overlap the first connection electrodes 61, respectively. Namely, the third connection electrodes 63 are opposite and spaced from the first connection electrodes 61 with respect to the Z-axis direction, respectively. The third connection electrodes 63 are disposed in a lower layer than the insulation film 58 and in the same layer as the second electrode 57. The third connection electrodes 63 are separated from the second electrode 57 that is included in the same layer as the third connection electrodes 63. The third connection electrodes 63 are portions of the transparent electrode film a portion of which is configured as the second electrode 57. The portions of the transparent electrode film configured as the third connection electrodes 63 are different from the portion of the transparent electrode film configured as the second electrode 57. Therefore, the third connection electrodes 63 are formed in the process of forming the second electrode 57 in producing the second substrate 51. A most portion of each third connection electrode 63 does not overlap the first electrode 56 but a portion of each third connection electrode 63 overlaps the first electrode 56 via the insulation film 58. Specifically, end portions of the third connection electrodes 63 that are close to the active area 413AA overlap edge portions of the first electrode 56 via the insulation film 58. The insulation film 58 includes contact holes 58A in portions that are disposed between the end portions of the third connection electrodes 63 and the edge portions of the first electrode 56 that are overlapped with each other. The first electrode 56 and the third connection electrodes 63 are electrically connected to each other via the contact holes 58A. The end portions of the third connection electrodes 63 that are close to the active area 413AA and the edge portions of the first electrode 56 are electrically connected to each other via the contact holes 58A in the insulation film 58.

Figure 30:
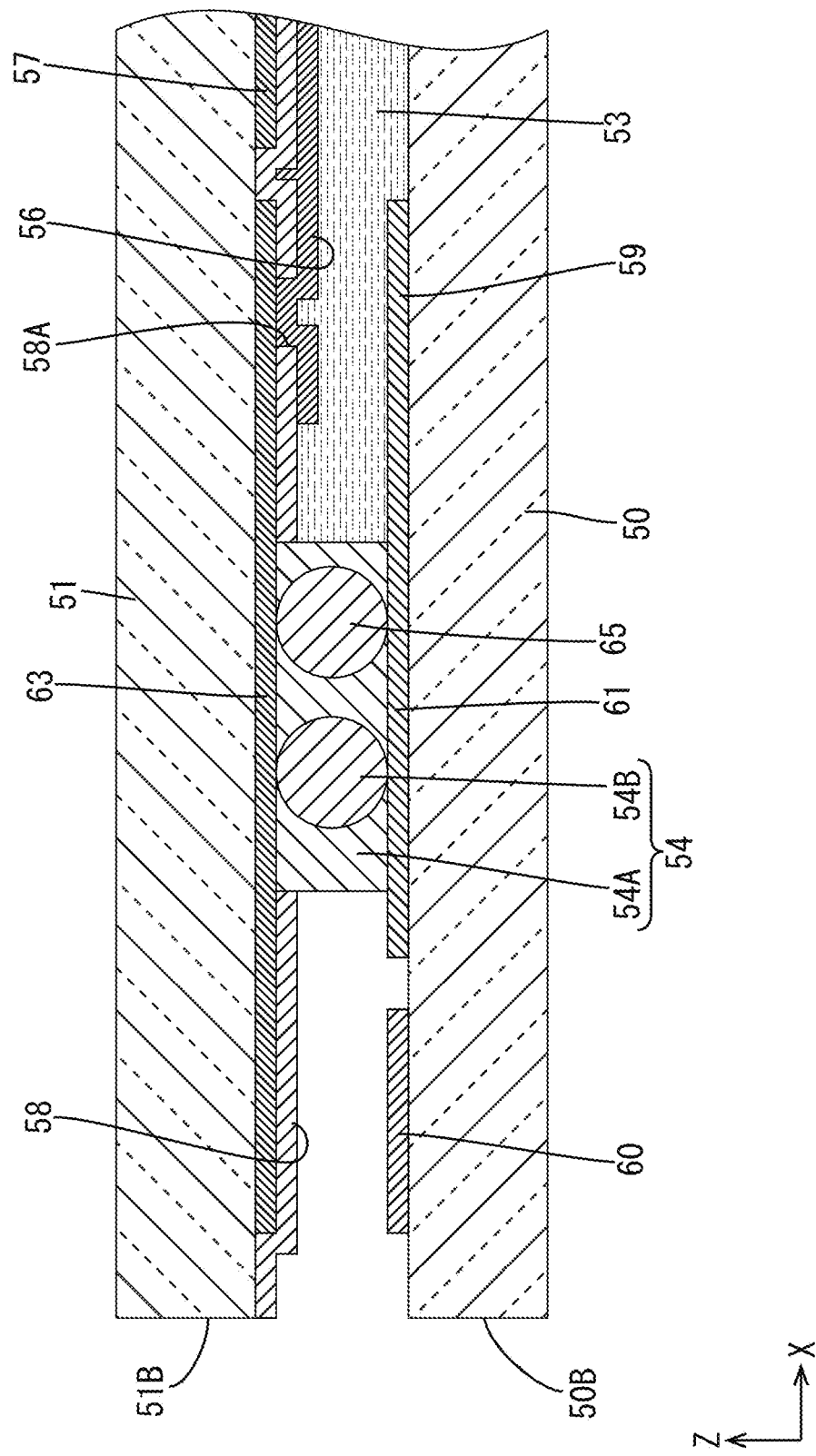
FIG. 30 is a cross-sectional view of the liquid crystal panel along line xxx-xxx in FIGS. 28 and 29.

As illustrated in FIG. 30, most of the portions of the third connection electrodes 63 that do not overlap the first electrode 56 overlap the sealing member 54. The sealing member 54 includes a base member 54A and electrically conductive particles 54B. The base member 54A is made of photocurable resin or thermal curing resin. The electrically conductive particles 54B are dispersed in the base member 54A. The electrically conductive particles 54B are obtained by performing electrically conductive plating such as gold plating to surfaces of particles made of synthetic resin. A particle size of the electrically conductive particles 54B is close to a cell gap of the sub liquid crystal panel 413. Some of the electrically conductive particles 54B overlap the first connection electrodes 61 and the third connection electrodes 63. The electrically conductive particles 54B overlapping the first connection electrodes 61 and the third connection electrodes 63 are configured as first electrically conductive portions 65 that are contacted with the first connection electrodes 61 and the third connection electrodes 63. The first connection electrodes 61 and the third connection electrodes 63 are electrically conductive via the first electrically conductive portions 65. Thus, the first electrode 56 is supplied with the common potential from the first connection electrodes 61, which are continuous from each of the four first lines 59 surrounding the entire periphery of the first electrode 56, via the first electrically conductive portions 65 and the third connection electrodes 63. With such a configuration, the resistance distribution in the first electrode 56 is less likely to be irregular. Therefore, potential fluctuation is less likely to be caused in the first electrode 56. The first electrically conductive portions 65 that overlap the first connection electrodes 61 and the third connection electrodes 63 do not overlap the second electrode 57. According to such a configuration, even with the number of portions (the first connection electrodes 61, the first electrically conductive portions 65, the third connection electrodes 63) that electrically connect the first lines 59 and the first electrode 56 being increased, a short circuit is less likely to be caused between the third connection electrodes 63 and the second electrode 57 with the first electrically conductive portions 65. This improves connection reliability. End portions of the third connection electrodes 63 that are opposite from the active area 413AA do not overlap the sealing member 54 but are covered with the insulation film 58. The end portions of the third connection electrodes 63 that are on an outer side with respect to the sealing member 54 are protected by the insulation film 58.

Figure 31:
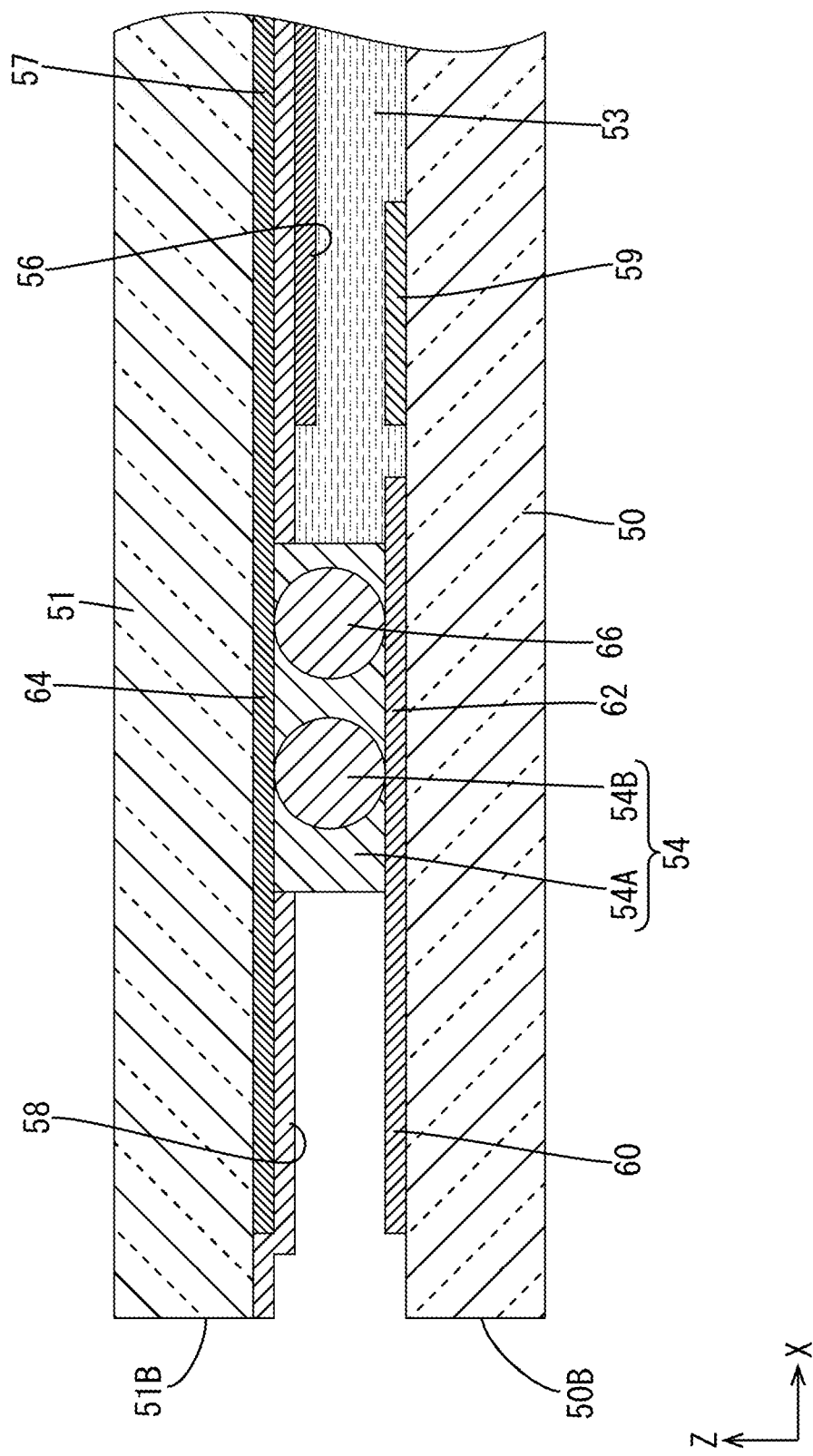
FIG. 31 is a cross-sectional view of the liquid crystal panel along line xxxi-xxxi in FIGS. 28 and 29.

Next, relation between the second connection electrodes 62 and the fourth connection electrodes 64 will be described with reference to FIG. 31. As illustrated in FIG. 31, the fourth connection electrodes 64 are disposed to overlap the second connection electrodes 62, respectively. Namely, the fourth connection electrodes 64 are opposite and spaced from the second connection electrodes 62 with respect to the Z-axis direction, respectively. The fourth connection electrodes 64 are included in a lower layer than the insulation film 58 and in the same layer as the second electrode 57. The fourth connection electrodes 64 are portions of the transparent electrode film a portion of which is configured as the second electrode 57. The portions of the transparent electrode film configured as the fourth connection electrodes 64 are different from the portion of the transparent electrode film configured as the second electrode 57. Therefore, the fourth connection electrodes 64 are formed in the process of forming the second electrode 57 in producing the second substrate 51. End portions of the fourth connection electrodes 64 that are close to the active area 413AA are continuous to edge portions of the second electrode 57. Accordingly, the fourth connection electrodes 64 and the second electrode 57 are electrically connected. The end portions of the fourth connection electrodes 64 that are close to the active area 413AA overlap the first electrode 56 but the rest portions of the fourth connection electrodes 64 are disposed on an outer side with respect to the edges of the first electrode 56 (on an opposite side from the active area 413AA) and do not overlap the first electrode 56.

As illustrated in FIG. 31, most of the portions of the fourth connection electrodes 64 that do not overlap the first electrode 56 are disposed to overlap the sealing member 54. Some of the electrically conductive particles 54B included in the sealing member 54 overlap the second connection electrodes 62 and the fourth connection electrodes 64. The electrically conductive particles 54B overlapping the second connection electrodes 62 and the fourth connection electrodes 64 are configured as second electrically conductive portions 66 that are contacted with the second connection electrodes 62 and the fourth connection electrodes 64. The second connection electrodes 62 and the fourth connection electrodes 64 are electrically conductive via the second electrically conductive portions 66. Thus, the second electrode 57 is supplied with the ground potential from the second connection electrodes 62, which are continuous to each of the four second lines 60 surrounding the entire periphery of the second electrode 57, via the second electrically conductive portions 66 and the fourth connection electrodes 64. With such a configuration, the resistance distribution in the second electrode 57 is less likely to be irregular. Therefore, potential fluctuation is less likely to be caused in the second electrode 57. The second electrically conductive portions 66 that overlap the second connection electrodes 62 and the fourth connection electrodes 64 do not overlap the first electrode 56. According to such a configuration, even with the number of portions (the second connection electrodes 62, the second electrically conductive portions 66, the fourth connection electrodes 64) that electrically connect the second lines 60 and the second electrode 57 being increased, a short circuit is less likely to be caused between the fourth connection electrodes 64 and the first electrode 56 with the second electrically conductive portions 66. This improves connection reliability. End portions of the fourth connection electrodes 64 that are opposite from the active area 413AA do not overlap the sealing member 54 but are covered with the insulation film 58. The end portions of the fourth connection electrodes 64 that are on an outer side with respect to the sealing member 54 are protected by the insulation film 58.

As illustrated in FIGS. 30 and 31, the third connection electrodes 63 and the fourth connection electrodes 64 are disposed in the same layer as the second electrode 57. The first connection electrodes 61 and the second connection electrodes 62 are disposed in the same layer. Therefore, a distance between the first connection electrodes 61 and the third connection electrodes 63 that are opposite each other with respect to the Z-axis direction is about equal to a distance between the second connection electrodes 62 and the fourth connection electrodes 64 that are opposite each other with respect to the Z-axis direction. Accordingly, a height of the first electrically conductive portions 65 that are disposed between the first connection electrodes 61 and the third connection electrodes 63 can be same as a height of the second electrically conductive portions 66 that are disposed between the second connection electrodes 62 and the fourth connection electrodes 64. As previously described, the first electrically conductive portions 65 and the second electrically conductive portions 66 are some of the electrically conductive particles 54B included in the sealing member 54. With the sealing member 54 including the electrically conductive particles 54B having one particle size, the first electrically conductive portions 65 and the second electrically conductive portions 66 can be provided. Therefore, a material cost can be reduced and connection reliability can be improved.

As previously described, the sub liquid crystal panel 413 (an electronic device) according to this embodiment includes the first substrate 50 and the second substrate 51 that is disposed opposite the first substrate 50. The first substrate 50 includes the first line 59, the second line 60, the first connection electrode 61, and the second connection electrode 62. The second line 60 is disposed away from the first line 59 and extends parallel to the first line 59. The first connection electrode 61 projects from the first line 59 toward the second line 60. The second connection electrode 62 projects from the second line 60 toward the first line 59. The first connection electrode 61 and the second connection electrode 62 are arranged in the extending direction in which the second line 60 extends. The second substrate 51 includes the first electrode 56, the third connection electrode 63, the second electrode 57, and the fourth connection electrode 64. The third connection electrode 63 is electrically connected to the first electrode 56 and disposed to overlap the first connection electrode 61. The fourth connection electrode 64 is electrically connected to the second electrode 57 and disposed to overlap the second connection electrodes 62. The third connection electrodes 63 and the fourth connection electrodes 64 are arranged in the extending direction. The sub liquid crystal panel 413 further includes the first electrically conductive portions 65 and the second electrically conductive portions 66 between the first substrate 50 and the second substrate 51. The first electrically conductive portions 65 are disposed to overlap the first connection electrodes 61 and the third connection electrodes 63 and contacted with the first connection electrodes 61 and the third connection electrodes 63. The second electrically conductive portions 66 are disposed to overlap the second connection electrodes 62 and the fourth connection electrodes 64 and contacted with the second connection electrodes 62 and the fourth connection electrodes 64.

The first electrode 56 is supplied with the potential of the first line 59 via the first connection electrode 61, the first electrically conductive portion 65, and the third connection electrode 63. The second electrode 57 is supplied with the potential of the second line 60 via the second connection electrode 62, the second electrically conductive portion 66, and the fourth connection electrode 64. The first connection electrode 61, which projects from the first line 59 toward the second line 60, and the second connection electrode 62, which projects from the second line 60 toward the first line 59, are arranged in the extending direction in which the second line 60 extends. The third connection electrode 63 that is electrically connected to the first electrode 56 is disposed to overlap the first connection electrode 61. The fourth connection electrode 64 that is electrically connected to the second electrode 57 is disposed to overlap the second connection electrode 62. According to such a configuration, the first electrically conductive portion 65 that overlaps the first connection electrode 61 and the third connection electrode 63 does not overlap the second electrode 57. The second electrically conductive portion 66 that overlaps the second connection electrode 62 and the fourth connection electrode 64 does not overlap the first electrode 56. According to such a configuration, even with the number of portions (the first connection electrodes 61, the first electrically conductive portions 65, the third connection electrodes 63) that electrically connect the first line 59 and the first electrode 56 and the number of portions (the second connection electrodes 62, the second electrically conductive portions 66, the fourth connection electrodes 64) that electrically connect the second line 60 and the second electrode 57 being increased, a short circuit is less likely to be caused between the third connection electrode 63 and the second electrode 57 with the first electrically conductive portion 65 and a short circuit is less likely to be caused between the fourth connection electrode 64 and the first electrode 56 with the second electrically conductive portion 66. This improves connection reliability. The resistance distribution in the first electrode 56 and the second electrode 57 is less likely to be irregular. With the first connection electrode 61 and the second connection electrode 62 being sandwiched between the first line 59 and the second line 60, the space for the connection electrodes can be effectively saved and the frame width can be preferably reduced.

Sixth Embodiment

A sixth embodiment will be described with reference to FIG. 32. The sixth embodiment includes a touch panel 70 instead of the sub liquid crystal panel 13 described in the first embodiment. Configuration, operations, and effects similar to those of the first embodiment may not be described.

Figure 32:
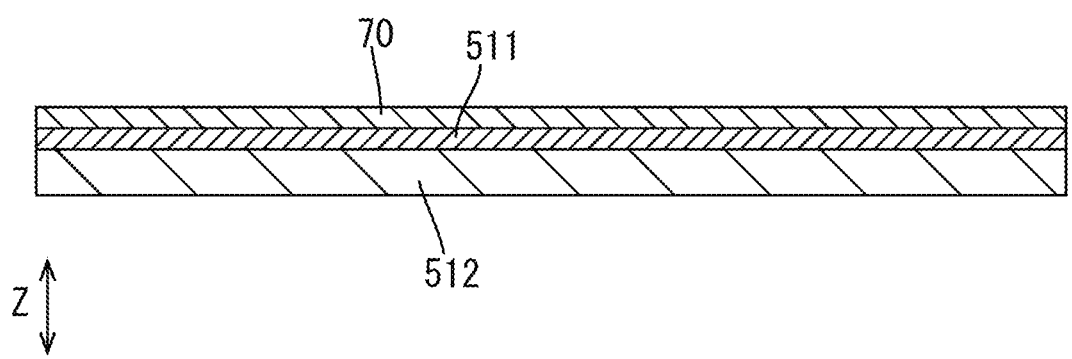
FIG. 32 is a schematic cross-sectional view of a liquid crystal display device according to a sixth embodiment.

As illustrated in FIG. 32, a liquid crystal display device 510 according to this embodiment includes the touch panel 70 that is disposed on a front side (an opposite side from a backlight device 512) with respect to a liquid crystal panel 511. The touch panel 70 has a touch panel function for detecting positions of input performed by a user based on images displayed on the liquid crystal panel 511 (input positions). The touch panel 70 includes a touch panel pattern for exerting the touch panel function. The touch panel pattern uses a projection type electrostatic capacitance method. A self-capacitance method or a mutual capacitance method is used for detection. The touch panel pattern includes touch electrodes (position detection electrodes) that are arranged in a matrix within a plate surface of the touch panel 70. An area of the plate surface of the touch panel 70 where the touch electrodes are arranged corresponds to a touch area in which input positions are detectable (a position input area). The touch panel 70 is disposed such that the touch area overlaps the display area AA (refer to FIG. 1) of the liquid crystal panel 511. According to such a configuration, when the user intends to input a position based on a displayed image that is displayed in the display area AA of the liquid crystal panel 511 and recognized by the user and the user brings the user's finger (a position input body), which is an electrically conductive member, to the surface of the liquid crystal panel 511, the finger and the touch electrode create a capacitor. A capacitance measured at the touch electrode close to the finger changes as the finger approaches the touch electrode and is different from a capacitance at the touch electrodes farther from the finger. Based on the difference in capacitance, the input position can be detected.

In such a touch panel 70, touch signals are inputted to the touch electrodes when detecting input positions. With the input of the touch signals, noise may be inputted to the liquid crystal panel 511 from the front side. As described in the first embodiment, the opposed substrate 11A of the liquid crystal panel 511 includes the second electrode 24 (refer to FIG. 5). Therefore, the noise that may be inputted from the touch panel 70 is blocked by the second substrate 24 and potential fluctuation is less likely to be caused in the first electrode 23. Furthermore, since an electrostatic capacitance is created between the first electrode 23 and the second electrode 24, which are overlapped with each other, potential fluctuation is less likely to be caused in the first electrode 23. With suppressing potential fluctuation in the first electrode 23, display quality of images displayed on the liquid crystal panel 511 can be improved. Furthermore, the first electrically conductive portions 32 that are disposed to overlap the first connection electrode 28 and the third connection electrodes 30 do not overlap the second electrode 24 (refer to FIG. 10). The second electrically conductive portions 33 that are disposed to overlap the second connection electrodes 29 and the fourth connection electrodes 31 do not overlap the first electrode 23 (refer to FIG. 11). With such a configuration, a short circuit is less likely to be caused between the third connection electrodes 30 and the second electrode 24 with the first electrically conductive portions 32 and a short circuit is less likely to be caused between the fourth connection electrodes 31 and the first electrode 23 with the second electrically conductive portions 33. This improves connection reliability.

Other Embodiments

The technology described herein is not limited to the embodiments described above and illustrated by the drawings. For example, the following embodiments will be included in the technical scope of the present technology.

(1) The plan-view positions of the first lines 26, 59, 126, 226, 326 and the second lines 27, 60, 127, 227, 327 may be reversed from those described in the drawings. Specifically, the first lines 26, 59, 126, 226, 326 may be disposed on an opposite side from the display area AA (the active area 413AA) with respect to the second lines 27, 60, 127, 227, 327. The second lines 27, 60, 127, 227, 327 may be disposed closer to the display area (the active area 413AA) than the first lines 26, 59, 126, 226, 326 (the sealing member 11D, 54, 211D, 311D) are. With the fourth embodiment including such a configuration, the first lines 326 are disposed between the third lines 42 and the second lines 327, respectively.

(2) The third connection electrodes 30 may be disposed in the same layer as the first electrode 23 as a modification of the first embodiment. In such a configuration, the contact holes 25A are not necessary in the insulation film 25. Similarly, the third connection electrodes 63 may be disposed in the same layer as the first electrode 56 as a modification of the fifth embodiment. In such a configuration, the contact holes 58A are not necessary in the insulation film 58.

(3) As modifications of the second and third embodiments, the lower layer lines 38, 238 may be electrically connected to the first lower layer electrode portions 34, 234, respectively, and the upper layer lines 39, 239 may be electrically connected to the first upper layer electrode portions 35, 235, respectively. Namely, the first electrode 123, 223 may be supplied with the common potential via the lower layer lines 38, 238 and the upper layer lines 39, 239.

(4) As modifications of the second and third embodiments, the lower layer lines 38, 238 or the upper layer lines 39, 239 may not be included.

(5) As a modification of the third embodiment, the overlapping lines 41 may be electrically connected to the second electrode 224. Namely, the second electrode 224 may be supplied with the ground potential via the overlapping lines 41.

(6) As a modification of the third embodiment, the overlapping lines 41 may be formed by patterning the transparent electrode film made of transparent electrode material.

(7) As a modification of the fourth embodiment, the third lines 42 may be disposed closer to the display area AA than the first lines 326 and the second lines 327 are.

(8) As a modification of the fourth embodiment, the third connection electrodes 330 may be disposed in the same layer as the first electrode 323. In such a configuration, the sixth contact holes 47B are not necessary in the insulation film 325 and the third insulation film 47. Further, the fourth connection electrodes 331 and the sixth connection electrodes 48 may be disposed in the same layer as the third connection electrodes 330 and the first electrode 323.

(9) As a modification of the fourth embodiment, the fourth connection electrodes 331 may be disposed in the same layer as the second electrode 324. In such a configuration, the fifth contact holes 47A are not necessary in the third insulation film 47. Further, the third connection electrodes 330 and the sixth connection electrodes 48 may be disposed in the same layer as the fourth connection electrodes 331 and the second electrode 324.

(10) As a modification of the fourth embodiment, the sixth connection electrodes 48 may be disposed in the same layer as the first electrode 323. In such a configuration, the insulation film 325 and the third insulation film 47 may include additional contact holes such that the sixth connection electrodes 48 and the third electrode 46 are electrically connected via the additional contact holes.

(11) As a modification of the fourth embodiment, the sixth connection electrodes 48 may be disposed in the same layer as the second electrode 324. In such a configuration, the third insulation film 47 may include additional contact holes such that the sixth connection electrodes 48 and the third electrode 46 are electrically connected via the additional contact holes.

(12) The configuration of the second embodiment or the third embodiment may be combined with the configuration of the fourth embodiment.

(13) The first lines 26, 59, 126, 226, 326 and the second lines 27, 60, 127, 227, 327 may extend in a non-linear form (such as a curved form) or extend with meandering as long as they extend parallel to each other. The third lines 42 of the fourth embodiment may extend similarly.

(14) At least two of the first connection electrodes 28, 61, 228, 328 or at least two of the second connection electrodes 29, 62, 329 may be arranged next to each other in the extending direction of the first lines 26, 59, 126, 226, 326 and the second lines 27, 60, 127, 227, 327.

(15) The first electrode 23, 56, 123, 223, 323 and the second electrode 24, 57, 124, 224, 324 may be disposed not to overlap. In such a configuration, the insulation film 25, 58, 125, 225, 325 is not necessary. Specifically, in the first to fourth embodiments and the sixth embodiment, with a gate circuit for supplying scan signals to the gate lines 16 being mounted monolithically in the non-display area NAA of the array substrate 11B, 111B, 311B, the second electrode 24, 124, 224, 324 may be disposed in the non-display area NAA so as to overlap the gate circuit and the first electrode 23, 123, 223, 323 may be disposed in the display area AA so as not to overlap the second electrode 24, 124, 224, 324 and the gate circuit.

(16) The second electrode 24, 57, 124, 224, 324 may be disposed to partially overlap the first electrode 23, 56, 123, 223, 323. Specifically, in the first to fourth embodiment and the sixth embodiment, with a gate circuit for supplying scan signals to the gate lines 16 being mounted monolithically in the non-display area NAA of the array substrate 11B, 111B, 311B, the second electrode 24, 124, 224, 324 may be disposed in the non-display area NAA so as to overlap the gate circuit and a portion of the first electrode 23, 123, 223, 323 may be disposed to overlap the second electrode 24, 124, 224, 324 and the gate circuit in the display area AA and a rest of the first electrode 23, 123, 223, 323 may be disposed in the display area AA not to overlap the second electrode 24, 124, 224, 324 and the gate circuit.

(17) A potential supplied to the first electrode 23, 123, 223, 323 via the first lines 26, 59, 126, 226, 326 may be other than the common potential. A potential supplied to the second electrode 24, 57, 124, 224, 324 via the second lines 27, 60, 127, 227, 327 may be other than the ground potential. A potential supplied to the third electrode 46 via the third lines 42 may be other than the touch panel driving signal potential.

(18) The specific configuration of the electrically conductive particles 11D2, 54B may be altered as appropriate.

(19) The first electrically conductive portions 32, 65, 332 and the second electrically conductive portions 33, 66, 333 may not be necessarily the electrically conductive particles 11D2, 54B included in the sealing member 11D, 54, 211D, 311D. The first electrically conductive portions 32, 65, 332 and the second electrically conductive portions 33, 66, 333 may be disposed outside the sealing member 11D, 54, 211D, 311D. In such a configuration, the first connection electrodes 28, 61, 228, 328, the second connection electrodes 29, 62, 329, the third connection electrodes 30, 63, 130, 230, 330, and the fourth connection electrodes 31, 64, 131, 231, 331 may be disposed not to overlap the sealing member 11D, 54, 211D, 311D. The third electrically conductive portions 49, the fifth connection electrodes 43, and the sixth connection electrodes 48 may be disposed similarly.

(20) In the first to fourth embodiments and the sixth embodiment, the number of electrodes included in the opposed substrate 11A, 111A, 211A, 311A may be four or more. In the fifth embodiment, the number of electrodes included in the second substrate 51 may be three or more.

(21) The display mode of the liquid crystal panel 11, 511 may be the twisted nematic (TN) mode.

(22) The liquid crystal display device 10 may not include the sub liquid crystal panel 13.

(23) The sub liquid crystal panel 13, 413 may be disposed on a back side of the liquid crystal panel 11, 511. In such a configuration, the sub liquid crystal panel 13, 413 is disposed between the liquid crystal panel 11, 511 and the backlight device 12.

(24) In the fifth embodiment, the liquid crystal panel 11 man not include the second electrode 24, the insulation film 25, the first lines 26, the second lines 27, the first connection electrodes 28, the second connection electrodes 29, the third connection electrodes 30, the fourth connection electrodes 31, the first electrically conductive portions 32, and the second electrically conductive portions 33.

(25) In the fifth embodiment, the liquid crystal panel 11 may be a display panel such as an organic EL display panel. With the display panel being a light emitting type display panel such as an organic EL display panel, the backlight device 12 may be omitted.

(26) The configuration of the fifth embodiment may be combined with the configuration of each of the second to fourth embodiments. The configuration of the sixth embodiment may be combined with the configuration of each of the second to fifth embodiments.

The invention claimed is:

1. A display device comprising:
a first substrate including
   a first line,
   a second line disposed at a distance from the first line and extending in an extending direction and parallel to the first line,
   a first connection electrode projecting from the first line toward the second line, and
   a second connection electrode projecting from the second line toward the first line and being disposed such that the second connection electrode and the first connection electrode are arranged in the extending direction;
a second substrate disposed opposite the first substrate and including
   a first electrode,
   a third connection electrode that is electrically connected to the first electrode and disposed to overlap the first connection electrode,
   a second electrode, and
   a fourth connection electrode that is electrically connected to the second electrode and disposed to overlap the second connection electrode and disposed such that the fourth connection electrode and the third connection electrode are arranged in the extending direction;
a first electrically conductive portion disposed between the first substrate and the second substrate to overlap the first connection electrode and the third connection electrode, the first electrically conductive portion being contacted with the first connection electrode and the third connection electrode; and
a second electrically conductive portion disposed between the first substrate and the second substrate to overlap the second connection electrode and the fourth connection electrode, the second electrically conductive portion being contacted with the second connection electrode and the fourth connection electrode.

2. The display device according to claim 1, wherein
the first substrate has side edges,
the first line includes first lines that extend along the side edges, respectively,
the second line includes second lines that extend along the side edges, respectively,
the first connection electrode includes first connection electrodes that project from each of the first lines,
the second connection electrode includes second connection electrodes that project from each of the second lines,
the third connection electrode includes third connection electrodes that are disposed to overlap the first connection electrodes, respectively,
the first electrically conductive portion includes first electrically conductive portions that are disposed to overlap the first connection electrodes, respectively,
the fourth connection electrode includes fourth connection electrodes that are disposed to overlap the second connection electrodes, respectively, and
the second electrically conductive portion includes second electrically conductive portions that are disposed to overlap the second connection electrodes, respectively.

3. The display device according to claim 2, further comprising:
a liquid crystal layer sandwiched between the first substrate and the second substrate; and
a sealing member disposed between the first substrate and the second substrate to surround and seal the liquid crystal layer, wherein
the first lines and the second lines extend parallel to the sealing member,
the first connection electrodes, the second connection electrodes, the third connection electrodes, and the fourth connection electrodes are disposed to overlap the sealing member, and
the first electrically conductive portions and the second electrically conductive portions are included in the sealing member.

4. The display device according to claim 2, wherein the first connection electrodes and the second connection electrodes are alternately arranged in the extending direction.

5. The display device according to claim 1, wherein
the first substrate and the second substrate include a display area in which an image is displayed and a non-display area that surrounds the display area,
the first electrode and the second electrode partially overlap in the display area,
the second substrate includes an insulation film at least between a portion of the first electrode and a portion of the second electrode that are overlapped with each other, the first line is supplied with a common potential, and the second line is supplied with a ground potential.

6. The display device according to claim 5, wherein the first electrode is disposed in an upper layer than the second electrode via the insulation film,
the third connection electrode is disposed in a same layer as the second electrode and a portion of the third connection electrode overlaps the first electrode,
the insulation film includes a contact hole at a portion that overlaps the portion of the first electrode and the portion of the third connection electrode that are overlapped with each other, and the first electrode and the third connection electrode are electrically connected via the contact hole, and
the fourth connection electrode is disposed in a same layer as the second electrode and continuous to an edge of the second electrode.

7. The display device according to claim 6, wherein the third connection electrode includes a non-overlapping portion that does not overlap the first electrically conductive portion,
the fourth connection electrode includes a non-overlapping portion that does not overlap the second electrically conductive portion, and
the insulation film covers at least the non-overlapping portion of the third connection electrode and the non-overlapping portion of the fourth connection electrode.

8. The display device according to claim 5, wherein the first electrode is disposed in an upper layer than the second electrode via the insulation film,
the third connection electrode includes
a first lower layer electrode portion that is disposed in a same layer as the second electrode, and
a first upper layer electrode portion that is disposed in a same layer as the first electrode and continuous to the first electrode and disposed to overlap the first lower layer electrode portion,
the fourth connection electrode includes
a second lower layer electrode portion that is disposed in a same layer as the second electrode and continuous to the second electrode, and
a second upper layer electrode portion that is disposed in a same layer as the first electrode and disposed to overlap the second lower layer electrode portion,
the insulation film includes a first contact hole at a portion that overlaps the first lower layer electrode portion and the first upper layer electrode portion, and the first lower layer electrode portion and the first upper layer electrode portion are electrically connected via the first contact hole, and
the insulation film includes a second contact hole at a portion that overlaps the second lower layer electrode portion and the second upper layer electrode portion, and the second lower layer electrode portion and the second upper layer electrode portion are electrically connected via the second contact hole.

9. The display device according to claim 8, wherein the second substrate includes
a lower layer line that is disposed in a same layer as the second electrode and extends in the extending direction and is continuous to an end portion of the second lower layer electrode portion, and
an upper layer line that is disposed in a same layer as the first electrode and extends in the extending direction and is continuous to an end portion of the second upper layer electrode portion and disposed to overlap the lower layer line, and
the insulation film includes a third contact hole at a portion that overlaps the lower layer line and the upper layer line, and the lower layer line and the upper layer line are electrically connected via the third contact hole.

10. The display device according to claim 8, wherein the second substrate includes
a lower layer insulation film that is disposed in a lower layer than the second electrode and is thicker than the insulation film, and
an overlapping line that is disposed in a lower layer than the lower layer insulation film and extends in the extending direction and is disposed to overlap the third connection electrode and the fourth connection electrode, and
the lower layer insulation film includes a fourth contact hole at a portion that overlaps the overlapping line and the first lower layer electrode portion, and the overlapping line and the first lower layer electrode portion are electrically connected via the fourth contact hole.

11. The display device according to claim 1, wherein the first substrate includes
a third line disposed such that the second line is sandwiched between the third line and the first line or the first line is sandwiched between the third line and the second line, the third line extending parallel to the first line and the second line, and
a fifth connection electrode that projects from the third line toward the first line and the second line,
the fifth connection electrode, the first connection electrode, and the second connection electrode are arranged at intervals in the extending direction, and
the second substrate includes
a third electrode, and
a sixth connection electrode that is electrically connected to the third electrode and disposed to overlap the fifth connection electrode,
the sixth connection electrode, the third connection electrode, and the fourth connection electrode are arranged at intervals in the extending direction, and
the display device further comprises a third electrically conductive portion that is disposed between the first substrate and the second substrate to overlap the fifth connection electrode and the sixth connection electrode and is contacted with the fifth connection electrode and the sixth connection electrode.

12. An electronic device comprising:
a first substrate including
a first line,
a second line disposed at a distance from the first line and extending parallel to the first line and in an extending direction,
a first connection electrode projecting from the first line toward the second line, and
a second connection electrode projecting from the second line toward the first line and being disposed such that the second connection electrode and the first connection electrode are arranged in the extending direction;
a second substrate disposed opposite the first substrate and including
a first electrode,
a third connection electrode that is electrically connected to the first electrode and disposed to overlap the first connection electrode,
a second electrode, and
a fourth connection electrode that is electrically connected to the second electrode and disposed to overlap the second connection electrode and disposed such that the fourth connection electrode and the third connection electrode are arranged in the extending direction;

a first electrically conductive portion disposed between the first substrate and the second substrate to overlap the first connection electrode and the third connection electrode, the first electrically conductive portion being contacted with the first connection electrode and the third connection electrode; and a second electrically conductive portion disposed between the first substrate and the second substrate to overlap the second connection electrode and the fourth connection electrode, the second electrically conductive portion being contacted with the second connection electrode and the fourth connection electrode.

* * * * *